(12) United States Patent
Fangrow et al.

(10) Patent No.: US 11,674,614 B2
(45) Date of Patent: Jun. 13, 2023

(54) FLUID TRANSFER DEVICE AND METHOD OF USE FOR SAME

(71) Applicant: ICU Medical, Inc., San Clemente, CA (US)

(72) Inventors: Thomas F. Fangrow, Mission Viejo, CA (US); Amanda Punim, Dana Point, CA (US); David Nelson, Irvine, CA (US); Erik Scott Shauver, Tustin, CA (US); Christopher James Hughes, Dana Point, CA (US)

(73) Assignee: ICU Medical, Inc., San Clemente, CA (US)

( * ) Notice: Subject to any disclaimer, the term of this patent is extended or adjusted under 35 U.S.C. 154(b) by 0 days.

(21) Appl. No.: 17/497,733

(22) Filed: Oct. 8, 2021

(65) Prior Publication Data
US 2022/0112966 A1 Apr. 14, 2022

Related U.S. Application Data

(60) Provisional application No. 63/090,086, filed on Oct. 9, 2020.

(51) Int. Cl.
*F16K 35/02* (2006.01)
*A61J 1/20* (2006.01)
(Continued)

(52) U.S. Cl.
CPC ............... *F16K 35/022* (2013.01); *A61J 1/10* (2013.01); *A61J 1/201* (2015.05); *A61J 1/2037* (2015.05); *A61J 1/2089* (2013.01); *F16K 21/00* (2013.01)

(58) Field of Classification Search
CPC . F16K 35/022; F16K 21/00; A61J 1/10; A61J 1/201; A61J 1/2037; A61J 1/2089; A61J 1/2013; A61J 1/2055; A61J 1/2062
(Continued)

(56) References Cited

U.S. PATENT DOCUMENTS 762,011 A * 6/1904 Schlittenhardt ........... B60P 7/13
410/67
812,021 A * 2/1906 Dahl ....................... F16K 35/10
70/180
(Continued)

FOREIGN PATENT DOCUMENTS

CN 201426880 Y 3/2010
CN 201719627 U 1/2011
(Continued)

OTHER PUBLICATIONS

US 8,460,266 B2, 06/2013, Okiyama (withdrawn)
(Continued)

*Primary Examiner* — Craig J Price
*Assistant Examiner* — Andrew J Rost
(74) *Attorney, Agent, or Firm* — Knobbe, Martens, Olson & Bear, LLP

(57) ABSTRACT

A fluid transfer device can include a first attachment portion configured to engage a first port of a source container and a second attachment portion configured to engage a second port of an intermediate container. The first attachment portion can include a first projection defining a first fluid passage and the second attachment portion can include a second projection defining a second fluid passage. The fluid transfer device can further include a selector portion for selectively transitioning the fluid transfer device from a first configuration in which a flow path between the first and second fluid passages is closed to a second configuration in which the flow path between the first and second fluid passages is open. The fluid transfer device can further include a limiter configured to inhibit the selector portion from selectively transitioning the fluid transfer device from the first configuration to the second configuration.

31 Claims, 37 Drawing Sheets

(51) Int. Cl.
*A61J 1/10* (2006.01)
*F16K 21/00* (2006.01)

(58) Field of Classification Search
USPC .............................. 251/90–93, 101, 102, 310
See application file for complete search history.

(56) References Cited

U.S. PATENT DOCUMENTS

| | | | |
|---|---|---|---|
| 1,473,774 A * | 11/1923 | Leech, Jr. | F16K 35/10 251/90 |
| 1,569,252 A * | 1/1926 | Barnes | F16K 5/222 251/161 |
| 1,605,351 A * | 11/1926 | King | F16K 35/02 251/92 |
| 2,818,864 A | 1/1958 | Hudson | |
| 3,047,178 A | 7/1962 | Poitras et al. | |
| 4,020,839 A | 5/1977 | Klapp | |
| 4,333,505 A | 6/1982 | Jones et al. | |
| D265,508 S | 7/1982 | Rusteberg | |
| 4,581,014 A | 4/1986 | Millerd et al. | |
| D283,918 S | 5/1986 | Jacobson | |
| 4,863,454 A | 9/1989 | LaBove | |
| 4,869,720 A | 9/1989 | Chernack | |
| 4,898,209 A | 2/1990 | Zbed | |
| D308,011 S | 5/1990 | Norris | |
| 4,936,841 A | 6/1990 | Aoki et al. | |
| 4,997,430 A | 3/1991 | Van Der Heiden et al. | |
| 5,129,426 A | 7/1992 | Boehmer | |
| 5,289,858 A | 3/1994 | Grabenkort | |
| 5,334,179 A | 8/1994 | Poli et al. | |
| 5,472,434 A | 12/1995 | Lechleiter | |
| 5,501,676 A | 3/1996 | Niedospial et al. | |
| 5,526,853 A | 6/1996 | McPhee et al. | |
| 5,533,983 A | 7/1996 | Haining | |
| 5,590,782 A | 1/1997 | Haber et al. | |
| D379,509 S | 5/1997 | Macko | |
| 5,647,845 A | 7/1997 | Haber et al. | |
| 5,785,701 A | 7/1998 | Sams et al. | |
| 5,826,713 A | 10/1998 | Sunago et al. | |
| 5,839,715 A | 11/1998 | Leinsing | |
| 5,897,526 A | 4/1999 | Vaillancourt | |
| D410,740 S | 6/1999 | Molina | |
| 5,957,898 A | 9/1999 | Jepson et al. | |
| 5,989,237 A | 11/1999 | Fowles et al. | |
| 6,063,068 A | 5/2000 | Fowles et al. | |
| D427,308 S | 6/2000 | Zinger | |
| 6,090,071 A | 7/2000 | Kriesel | |
| 6,022,339 A | 8/2000 | Fowles et al. | |
| 6,105,442 A | 8/2000 | Kriesel et al. | |
| 6,113,008 A | 9/2000 | Arsenault et al. | |
| 6,113,583 A | 9/2000 | Fowles et al. | |
| 6,159,184 A | 12/2000 | Perez et al. | |
| 6,159,192 A | 12/2000 | Fowles et al. | |
| 6,193,697 B1 | 2/2001 | Jepson et al. | |
| 6,213,996 B1 | 4/2001 | Jepson et al. | |
| 6,217,568 B1 | 4/2001 | Jepson et al. | |
| 6,221,041 B1 | 4/2001 | Russo | |
| 6,238,372 B1 | 5/2001 | Zinger et al. | |
| 6,261,266 B1 | 7/2001 | Jepson et al. | |
| 6,293,921 B1 | 9/2001 | Shinmoto et al. | |
| 6,343,629 B1 | 2/2002 | Wessman et al. | |
| 6,375,640 B1 | 4/2002 | Teraoka | |
| 6,379,340 B1 | 4/2002 | Zinger et al. | |
| 6,485,472 B1 | 11/2002 | Richmond | |
| 6,485,483 B1 | 11/2002 | Fujii | |
| 6,491,658 B1 | 12/2002 | Miura et al. | |
| 6,558,365 B2 | 5/2003 | Zinger et al. | |
| 6,582,415 B1 | 6/2003 | Fowles et al. | |
| 6,575,955 B2 | 7/2003 | Azzolini | |
| 6,591,876 B2 | 7/2003 | Safabash | |
| 6,629,005 B2 | 9/2003 | Yoshinaga et al. | |
| 6,685,692 B2 | 2/2004 | Fathallah | |
| 6,699,229 B2 | 3/2004 | Zinger et al. | |
| 6,726,672 B1 | 4/2004 | Hanly et al. | |
| 6,729,370 B2 | 5/2004 | Norton et al. | |
| D495,416 S | 8/2004 | Dimeo et al. | |
| 6,821,421 B2 | 11/2004 | Murakami | |
| 6,851,448 B2 | 2/2005 | Fujii | |
| 6,874,522 B2 | 4/2005 | Anderson et al. | |
| 6,889,104 B2 | 5/2005 | Yoshinaga et al. | |
| 6,911,025 B2 | 6/2005 | Miyahara | |
| 6,918,500 B2 | 7/2005 | Okiyama | |
| 6,948,522 B2 | 9/2005 | Newbrough et al. | |
| 6,971,680 B2 | 12/2005 | Nakanishi et al. | |
| 6,986,757 B1 | 1/2006 | Kumasaki et al. | |
| 7,069,788 B2 | 7/2006 | Teugels | |
| 7,083,605 B2 | 8/2006 | Miyahara | |
| 7,140,401 B2 | 11/2006 | Wilcox et al. | |
| 7,152,845 B2 * | 12/2006 | Carrez | F16K 35/04 251/297 |
| 7,163,114 B2 | 1/2007 | Okiyama | |
| D540,466 S | 4/2007 | Homra et al. | |
| D561,348 S | 2/2008 | Zinger et al. | |
| 7,326,194 B2 | 2/2008 | Zinger et al. | |
| D573,250 S | 7/2008 | Macrae et al. | |
| 7,452,349 B2 | 11/2008 | Miyahara | |
| 7,470,257 B2 | 12/2008 | Norton et al. | |
| 7,491,197 B2 | 2/2009 | Jansen et al. | |
| 7,507,226 B2 | 3/2009 | Stanus et al. | |
| 7,516,665 B2 | 4/2009 | Teugels | |
| 7,559,530 B2 | 7/2009 | Korogi et al. | |
| 7,632,261 B2 | 12/2009 | Zinger et al. | |
| 7,743,799 B2 | 6/2010 | Mosier et al. | |
| 7,744,581 B2 | 6/2010 | Wallen et al. | |
| 7,758,560 B2 | 7/2010 | Connell et al. | |
| 7,780,644 B2 | 8/2010 | Miyajima | |
| 7,799,009 B2 | 9/2010 | Niedospial, Jr. et al. | |
| 7,867,215 B2 | 1/2011 | Akerlund et al. | |
| 7,879,018 B2 | 2/2011 | Zinger et al. | |
| 7,882,863 B2 | 2/2011 | Pestotnik et al. | |
| 7,905,873 B2 | 3/2011 | Rondeau et al. | |
| 7,984,739 B2 | 7/2011 | Hongo et al. | |
| 8,016,809 B2 | 9/2011 | Zinger et al. | |
| 8,021,325 B2 | 9/2011 | Zinger et al. | |
| 8,025,653 B2 | 9/2011 | Capitaine et al. | |
| D647,787 S | 11/2011 | Duval | |
| D649,241 S | 11/2011 | Kunishige et al. | |
| 8,066,688 B2 | 11/2011 | Zinger et al. | |
| 8,070,739 B2 | 12/2011 | Zinger et al. | |
| 8,075,508 B2 | 12/2011 | Mosler et al. | |
| 8,105,312 B2 | 1/2012 | Uematsu et al. | |
| D655,017 S | 2/2012 | Mosler et al. | |
| 8,122,923 B2 | 2/2012 | Kraus et al. | |
| 8,123,736 B2 | 2/2012 | Kraushaar et al. | |
| D657,460 S | 4/2012 | Uhlenkamp et al. | |
| D657,869 S | 4/2012 | Mammen | |
| 8,162,013 B2 | 4/2012 | Rosenquist et al. | |
| 8,172,823 B2 | 5/2012 | Rondeau et al. | |
| 8,172,824 B2 | 5/2012 | Pfeifer et al. | |
| 8,177,768 B2 | 5/2012 | Leinsing | |
| 8,197,459 B2 | 6/2012 | Jansen et al. | |
| 8,231,596 B2 | 7/2012 | Okiyama | |
| 8,231,642 B2 | 7/2012 | Koyama et al. | |
| 8,266,967 B2 | 9/2012 | Kitani et al. | |
| 8,316,898 B2 | 11/2012 | Zinger et al. | |
| 8,317,741 B2 | 11/2012 | Kraushaar | |
| 8,317,743 B2 | 11/2012 | Denenburg | |
| 8,333,751 B2 | 12/2012 | Kobashi et al. | |
| 8,336,587 B2 | 12/2012 | Rosenquist et al. | |
| D681,230 S | 4/2013 | Mosler et al. | |
| 8,419,705 B2 | 4/2013 | Omori et al. | |
| 8,435,210 B2 | 5/2013 | Zinger et al. | |
| 8,460,930 B2 | 6/2013 | Hirai et al. | |
| 8,475,404 B2 | 7/2013 | Foshee et al. | |
| 8,506,548 B2 | 8/2013 | Okiyama | |
| D691,874 S | 10/2013 | Ganski | |
| 8,551,067 B2 | 10/2013 | Zinger et al. | |
| 8,556,879 B2 | 10/2013 | Okiyama | |
| 8,608,723 B2 | 12/2013 | Lev et al. | |
| 8,636,703 B2 | 1/2014 | Foshee et al. | |
| D701,303 S | 3/2014 | Cook | |
| 8,684,994 B2 | 4/2014 | Lev et al. | |
| D704,829 S | 5/2014 | McAtamney et al. | |
| 8,752,598 B2 | 6/2014 | Denenburg et al. | |

(56) References Cited

U.S. PATENT DOCUMENTS

| | | |
|---|---|---|
| 8,753,325 B2 | 6/2014 | Lev et al. |
| 8,821,436 B2 | 9/2014 | Mosier et al. |
| D715,427 S | 10/2014 | Jovet-Hug et al. |
| 8,858,532 B2 | 10/2014 | Tsunematsu et al. |
| 8,864,725 B2 | 10/2014 | Ranalletta et al. |
| D719,013 S | 12/2014 | St. John et al. |
| 8,905,994 B1 | 12/2014 | Lev et al. |
| D724,724 S | 3/2015 | McAtamney et al. |
| 8,979,792 B2 | 3/2015 | Lev et al. |
| 8,998,875 B2 | 4/2015 | Lev et al. |
| 9,011,678 B2 | 4/2015 | Fujii et al. |
| D733,535 S | 7/2015 | Egami |
| 9,144,646 B2 | 9/2015 | Barron, III et al. |
| 9,205,026 B2 | 12/2015 | Moy et al. |
| 9,226,875 B2 | 1/2016 | Foshee et al. |
| D749,209 S | 2/2016 | Uhlenkamp et al. |
| 9,254,361 B2 | 2/2016 | Rahimy et al. |
| 9,283,324 B2 | 3/2016 | Lev et al. |
| 9,283,366 B2 | 3/2016 | Okiyama et al. |
| D757,258 S | 5/2016 | Weißhaupt et al. |
| 9,339,438 B2 | 5/2016 | Lev et al. |
| 9,345,640 B2 | 5/2016 | Mosier et al. |
| 9,345,642 B2 | 5/2016 | Heath et al. |
| 9,345,643 B2 | 5/2016 | Okiyama |
| D758,175 S | 6/2016 | Symons |
| 9,375,340 B2 | 6/2016 | Batterson et al. |
| D763,068 S | 8/2016 | Symons |
| 9,452,261 B2 | 9/2016 | Alon |
| D769,444 S | 10/2016 | Mosler et al. |
| 9,485,391 B2 | 11/2016 | Tsukada |
| 9,486,391 B2 | 11/2016 | Shemesh |
| 9,532,927 B2 | 1/2017 | Kraus et al. |
| 9,541,227 B2 | 1/2017 | Okiyama |
| 9,554,967 B2 | 1/2017 | Moia et al. |
| 9,579,495 B2 | 2/2017 | Tachizaki |
| 9,585,812 B2 | 3/2017 | Browka et al. |
| 9,636,277 B2 | 5/2017 | Foshee et al. |
| 9,642,775 B2 | 5/2017 | Sanders et al. |
| 9,656,019 B2 | 5/2017 | Cabiri et al. |
| 9,662,271 B2 | 5/2017 | Holt et al. |
| 9,724,269 B2 | 8/2017 | Sjogren et al. |
| 9,744,102 B2 | 8/2017 | Kubo |
| D798,136 S | 9/2017 | Pittman |
| 9,775,778 B2 | 10/2017 | Qiu et al. |
| 9,775,979 B2 | 10/2017 | Okiyama |
| 9,795,536 B2 | 10/2017 | Lev et al. |
| 9,795,736 B2 | 10/2017 | Okiyama |
| 9,801,786 B2 | 10/2017 | Lev et al. |
| 9,839,580 B2 | 12/2017 | Lev et al. |
| 9,861,555 B2 | 1/2018 | Tennican et al. |
| 9,895,288 B2 | 2/2018 | Augustini et al. |
| D815,735 S | 4/2018 | Aliberti |
| 9,937,292 B2 | 4/2018 | Ail et al. |
| 9,943,463 B2 | 4/2018 | Marks et al. |
| D817,153 S | 5/2018 | Harogolige et al. |
| D820,978 S | 6/2018 | Koehler |
| 9,995,405 B2 | 6/2018 | Duncan |
| D822,202 S | 7/2018 | Roth |
| 10,022,298 B2 | 7/2018 | Marici et al. |
| D826,034 S | 8/2018 | Feng |
| D826,399 S | 8/2018 | Smith et al. |
| 10,085,866 B2 | 10/2018 | Wojcik et al. |
| 10,123,938 B2 | 11/2018 | Akerlund et al. |
| 10,137,293 B2 | 11/2018 | Jahromi et al. |
| D836,428 S | 12/2018 | Pittman |
| 10,143,580 B2 | 12/2018 | Batterson et al. |
| 10,206,853 B2 | 2/2019 | Sanders et al. |
| 10,238,787 B2 | 3/2019 | Takuwa et al. |
| 10,278,897 B2 | 5/2019 | David et al. |
| 10,285,907 B2 | 5/2019 | David et al. |
| 10,299,990 B2 | 5/2019 | Lev et al. |
| D852,354 S | 6/2019 | Wrangmark et al. |
| 10,357,429 B2 | 7/2019 | David et al. |
| 10,391,031 B2 | 8/2019 | Yevmenenko et al. |
| 10,420,880 B2 | 9/2019 | Degtiar et al. |
| 10,426,703 B2 | 10/2019 | Russo et al. |
| 10,434,297 B2 | 10/2019 | Penny et al. |
| D884,885 S | 5/2020 | Hu et al. |
| 10,646,404 B2 | 5/2020 | Denenburg et al. |
| 10,688,295 B2 | 6/2020 | Lev et al. |
| 10,716,890 B2 | 7/2020 | Degtiar et al. |
| D892,607 S | 8/2020 | Boscarello |
| D896,372 S | 9/2020 | Julian et al. |
| 10,765,604 B2 | 9/2020 | Denenburg et al. |
| 10,772,797 B2 | 9/2020 | Denenburg |
| 10,772,798 B2 | 9/2020 | Lev et al. |
| 10,806,667 B2 | 10/2020 | Denenburg et al. |
| 10,813,837 B2 | 10/2020 | Mosler et al. |
| 10,945,920 B2 | 3/2021 | Marici et al. |
| 10,945,921 B2 | 3/2021 | Denenburg |
| 10,960,131 B2 | 3/2021 | Cabiri et al. |
| 11,027,062 B2 | 6/2021 | Fabrikant et al. |
| D930,824 S | 9/2021 | Punim, Jr. |
| D931,441 S | 9/2021 | Punim, Jr. |
| 11,311,458 B2 * | 4/2022 | Panick ............... A61J 1/2055 |
| D957,630 S | 7/2022 | Punim |
| 2001/0021820 A1 | 9/2001 | Lynn |
| 2002/0127150 A1 | 9/2002 | Sasso |
| 2003/0107628 A1 | 6/2003 | Fowles et al. |
| 2003/0199847 A1 | 10/2003 | Akerlund et al. |
| 2003/0231545 A1 | 12/2003 | Seaton et al. |
| 2004/0199139 A1 | 10/2004 | Fowles et al. |
| 2005/0137523 A1 | 6/2005 | Wyatt et al. |
| 2007/0244463 A1 | 10/2007 | Warren et al. |
| 2008/0103484 A1 | 5/2008 | Hishikawa et al. |
| 2009/0177177 A1 | 7/2009 | Zinger et al. |
| 2015/0157536 A1 | 6/2015 | Qui et al. |
| 2016/0136412 A1 | 5/2016 | McKinnon et al. |
| 2016/0166824 A1 | 6/2016 | Lev et al. |
| 2017/0007501 A1 | 1/2017 | Schuldt-Lieb et al. |
| 2017/0354571 A1 | 12/2017 | David et al. |
| 2018/0133451 A1 | 5/2018 | Takeuchi |
| 2018/0280238 A1 | 10/2018 | Fuchs |
| 2019/0046402 A1 | 2/2019 | Desbrosses et al. |
| 2019/0076324 A1 | 3/2019 | Naygauz |
| 2019/0083359 A1 | 3/2019 | Knudsen et al. |
| 2020/0133594 A1 | 4/2020 | Parthasarathy et al. |
| 2020/0214937 A1 | 7/2020 | Pipelka |
| 2021/0022421 A1 | 1/2021 | Mosler et al. |
| 2021/0038476 A1 | 2/2021 | Mosler et al. |
| 2021/0128411 A1 | 5/2021 | Kato et al. |
| 2021/0236385 A1 | 8/2021 | Fraites, Jr. et al. |
| 2022/0133594 A1 | 5/2022 | Korogi et al. |

FOREIGN PATENT DOCUMENTS

| | | |
|---|---|---|
| CN | 201987971 U | 9/2011 |
| CN | 205612811 U | 10/2016 |
| CN | 106860003 A | 6/2017 |
| CN | 107198658 A | 9/2017 |
| CN | 108210332 A | 6/2018 |
| DE | 19931771 A1 | 1/2001 |
| DE | 102005015504 A1 | 10/2006 |
| DE | 102009004459 A1 | 7/2010 |
| DE | 102009004461 A1 | 7/2010 |
| EP | 521 460 B1 | 1/1993 |
| EP | 1584347 B1 | 6/2006 |
| EP | 2349404 31 | 11/2013 |
| EP | 3 375 427 A1 | 9/2018 |
| JP | H07124264 A | 5/1995 |
| JP | 2003047663 A | 2/2003 |
| KR | 101095961 B1 | 3/2011 |
| KR | 101574194 B1 | 12/2015 |
| WO | WO 1995/13785 A1 | 5/1995 |
| WO | WO 1996/00053 A1 | 1/1996 |
| WO | WO 2000/002617 A1 | 1/2000 |
| WO | WO 2001/030416 A1 | 5/2001 |
| WO | WO 2002/005158 A1 | 1/2002 |
| WO | WO 2002/075200 A1 | 9/2002 |
| WO | WO 2004/073764 A2 | 9/2004 |
| WO | WO 2004/073764 A3 | 9/2004 |
| WO | WO 2004/086971 A1 | 10/2004 |
| WO | WO 2005/004973 A1 | 1/2005 |
| WO | WO 2005/011798 A1 | 2/2005 |

(56) References Cited

FOREIGN PATENT DOCUMENTS

| | | |
|---|---|---|
| WO | WO 2005/030304 A1 | 4/2005 |
| WO | WO 2005/049129 A1 | 6/2005 |
| WO | WO 2005/094663 A1 | 10/2005 |
| WO | WO 2005/099791 A1 | 10/2005 |
| WO | WO 2006/025366 A1 | 3/2006 |
| WO | WO 2006/028137 A1 | 3/2006 |
| WO | WO 2006/057401 A1 | 6/2006 |
| WO | WO 2006/064753 A1 | 6/2006 |
| WO | WO 2006/003960 A1 | 12/2006 |
| WO | WO 2007/046355 A1 | 4/2007 |
| WO | WO 2007/091438 A1 | 8/2007 |
| WO | WO 2007/097334 A1 | 8/2007 |
| WO | WO 2007/103998 A3 | 9/2007 |
| WO | WO 2007/114157 A1 | 10/2007 |
| WO | WO 2005/049129 A1 | 11/2007 |
| WO | WO 2007/131183 A2 | 11/2007 |
| WO | WO 2008/002370 A2 | 1/2008 |
| WO | WO 2008/018484 A1 | 2/2008 |
| WO | WO 2006/003960 A1 | 4/2008 |
| WO | WO 2006/011475 A1 | 5/2008 |
| WO | WO 2006/061895 A1 | 6/2008 |
| WO | WO 2008/065950 A1 | 6/2008 |
| WO | WO 2008/152871 A1 | 12/2008 |
| WO | WO 2009/017041 A1 | 2/2009 |
| WO | WO 2009/081671 A1 | 7/2009 |
| WO | WO 2009/107737 A1 | 9/2009 |
| WO | WO 2009/130147 A1 | 10/2009 |
| WO | WO 2009/147837 A1 | 12/2009 |
| WO | WO 2010/024407 A1 | 3/2010 |
| WO | WO 2010/029853 A1 | 3/2010 |
| WO | WO 2010/029892 A1 | 3/2010 |
| WO | WO 2010/044353 A1 | 4/2010 |
| WO | WO 2010/061742 A1 | 6/2010 |
| WO | WO 2010/061743 A1 | 6/2010 |
| WO | WO 2010/087283 A1 | 8/2010 |
| WO | WO 2010/122988 A1 | 10/2010 |
| WO | WO 2010/140063 A2 | 12/2010 |
| WO | WO 2010/140630 A1 | 12/2010 |
| WO | WO 2010/140687 A1 | 12/2010 |
| WO | WO 2010/141632 A2 | 12/2010 |
| WO | WO 2010/141632 A3 | 12/2010 |
| WO | WO 2010/143693 A1 | 12/2010 |
| WO | WO 2011/043336 A1 | 4/2011 |
| WO | WO 2011/046210 A1 | 4/2011 |
| WO | WO 2011/052123 A1 | 5/2011 |
| WO | WO 2011/139921 A2 | 11/2011 |
| WO | WO 2011/139921 A3 | 11/2011 |
| WO | WO 2011/145395 A1 | 11/2011 |
| WO | WO 2012/002003 A1 | 1/2012 |
| WO | WO 2012/008285 A1 | 1/2012 |
| WO | WO 2010/029853 A1 | 2/2012 |
| WO | WO 2012/046567 A1 | 4/2012 |
| WO | WO 2012/046568 A1 | 4/2012 |
| WO | WO 2012/066865 A1 | 5/2012 |
| WO | WO 2012/101982 A1 | 8/2012 |
| WO | WO 2012/137286 A1 | 10/2012 |
| WO | WO 2012/140768 A1 | 10/2012 |
| WO | WO 2013/119823 A1 | 8/2013 |
| WO | WO 2013/122148 A1 | 8/2013 |
| WO | WO 2013/123028 A1 | 8/2013 |
| WO | WO 2013/141137 A1 | 9/2013 |
| WO | WO 2013/150956 A1 | 10/2013 |
| WO | WO 2013/154049 A1 | 10/2013 |
| WO | WO 2013/154050 A1 | 10/2013 |
| WO | WO 2013/161979 A1 | 10/2013 |
| WO | WO 2013/183583 A1 | 12/2013 |
| WO | WO 2014/021390 A1 | 2/2014 |
| WO | WO 2014/034412 A1 | 3/2014 |
| WO | WO 2014/061661 A1 | 4/2014 |
| WO | WO 2014/092115 A1 | 6/2014 |
| WO | WO 2014/104027 A1 | 7/2014 |
| WO | WO 2014/156965 A1 | 10/2014 |
| WO | WO 2014/177347 A1 | 11/2014 |
| WO | WO 2015/025912 A1 | 2/2015 |
| WO | WO 2015/034045 A1 | 3/2015 |
| WO | WO 2015/045688 A1 | 4/2015 |
| WO | WO 2015/087880 A1 | 6/2015 |
| WO | WO 2015/087881 A1 | 6/2015 |
| WO | WO 2015/134777 A1 | 9/2015 |
| WO | WO 2015/146831 A1 | 10/2015 |
| WO | WO 2015/166993 A1 | 11/2015 |
| WO | WO 2016/035788 A1 | 3/2016 |
| WO | WO 2016/117544 A1 | 7/2016 |
| WO | WO 2016/117545 A1 | 7/2016 |
| WO | WO 2016/133139 A1 | 8/2016 |
| WO | WO 2016/152801 A1 | 9/2016 |
| WO | WO 2016/158937 A1 | 10/2016 |
| WO | WO 2016/159100 A1 | 10/2016 |
| WO | WO 2016/159101 A1 | 10/2016 |
| WO | WO 2016/185972 A1 | 11/2016 |
| WO | WO 2017/022741 A1 | 2/2017 |
| WO | WO 2017/094873 A1 | 6/2017 |
| WO | WO 2017/104689 A1 | 6/2017 |
| WO | WO 2017/135358 A1 | 8/2017 |
| WO | WO 2017/141858 A1 | 8/2017 |
| WO | WO 2017/150398 A1 | 9/2017 |
| WO | WO 2017/217105 A1 | 12/2017 |
| WO | WO 2018/003923 A1 | 1/2018 |
| WO | WO 2018/030496 A1 | 2/2018 |
| WO | WO 2018/030497 A1 | 2/2018 |
| WO | WO 2018/062268 A1 | 4/2018 |
| WO | WO 2018/074294 A1 | 4/2018 |
| WO | WO 2018/084260 A1 | 5/2018 |
| WO | WO 2018/139665 A | 8/2018 |
| WO | WO 2018/181502 A1 | 10/2018 |
| WO | WO 2018/193965 A | 10/2018 |
| WO | WO 2018/221441 A1 | 12/2018 |
| WO | WO 2019/016904 A1 | 1/2019 |
| WO | WO 2019/018197 A1 | 1/2019 |
| WO | WO 2019/018198 A1 | 1/2019 |
| WO | WO 2019/021985 A1 | 1/2019 |
| WO | WO 2019/026796 A1 | 2/2019 |
| WO | WO 2019/146666 A1 | 8/2019 |
| WO | WO 2022/098385 A1 | 5/2022 |

OTHER PUBLICATIONS

US 8,480,644 B2, 07/2013, Okiyama (withdrawn)
US 8,480,644, 8/1996, Price (withdrawn)
AMT Clamp Feeding Tube Clamp, Date Visited: May 4, 2021, Vitality Medical, Date Available Jul. 8, 2011, https://www.vitalitymedical.com/applied-medical-tech-amt-clamp-feeding-tube-clamp-connector.html (Year: 2011).
Medical Disposable Product, Date Visited: May 4, 2021, Alibaba, Date Available: May 4, 2021, https://www.alibab.com/product-detail/medical-disposable-products-parts-of-iv_60715891761.html (Year: 2021).
International Search Report and Written Opinion, re PCT Application No. PCT/US2021/054299, dated Mar. 30, 2022.

\* cited by examiner

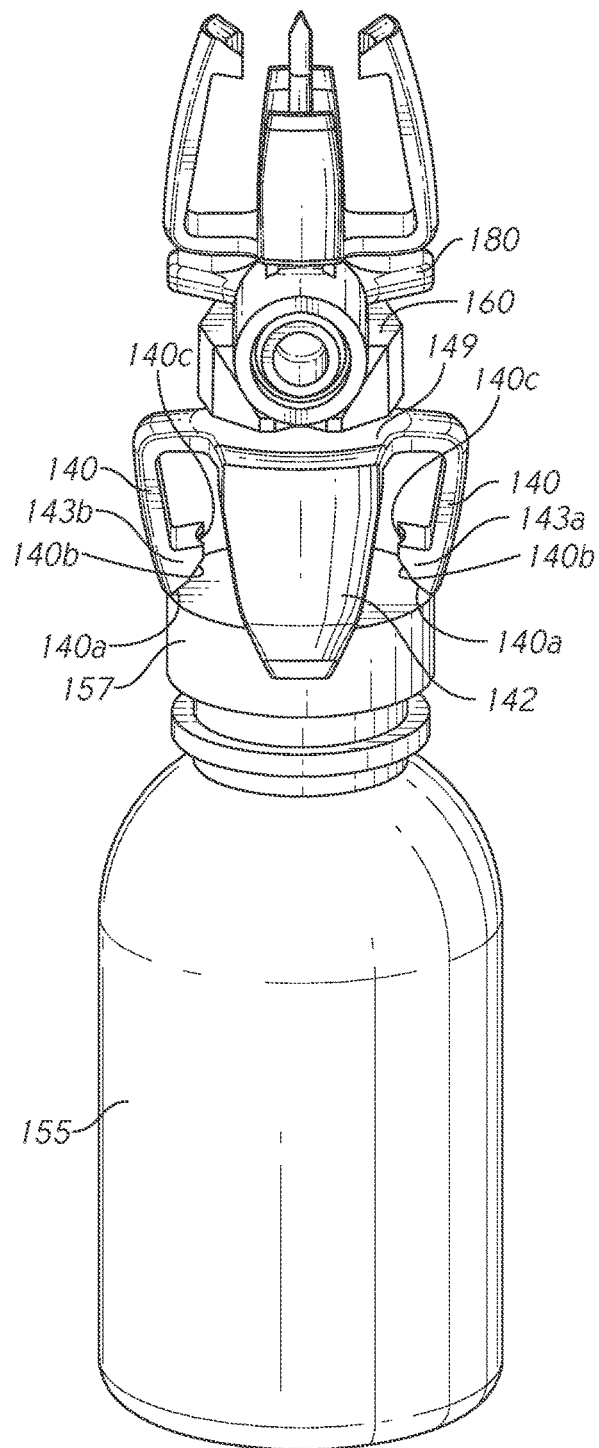
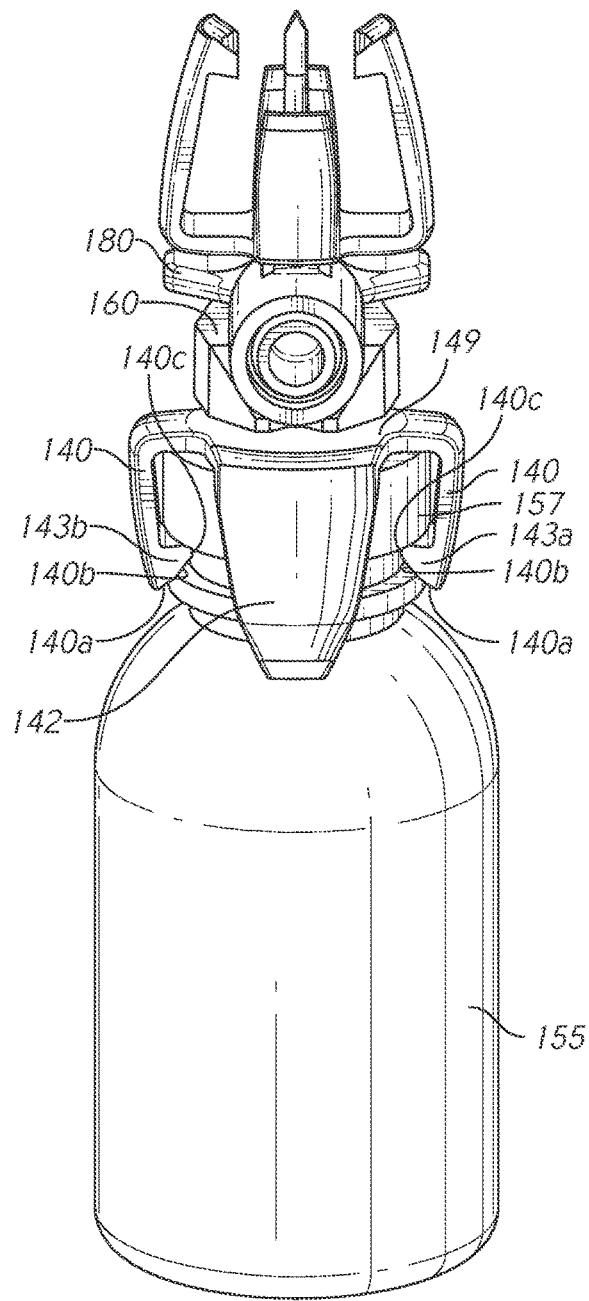
FIG. 10A
FIG. 10B

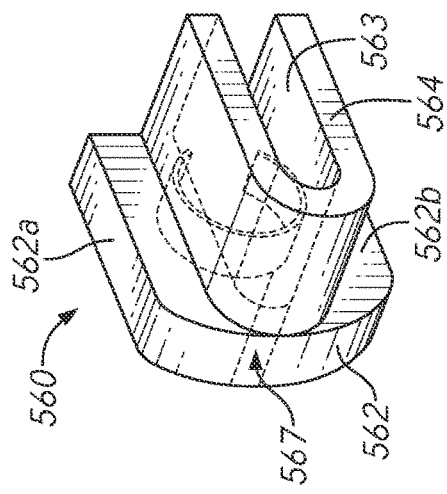
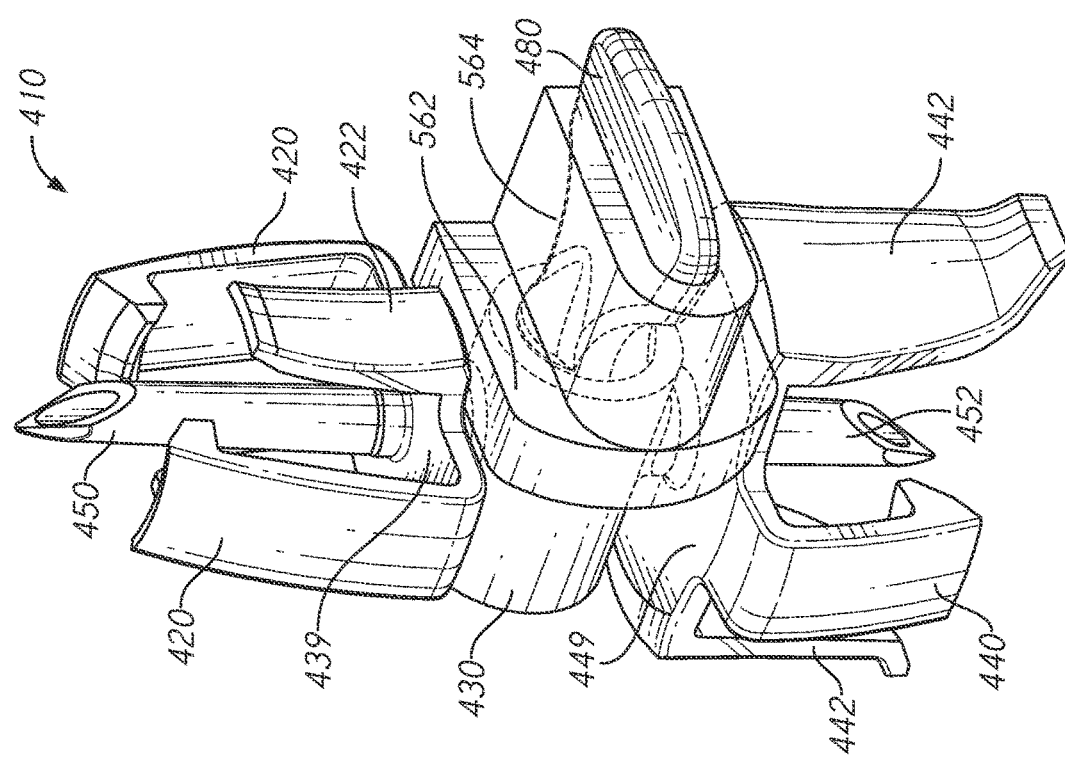
FIG. 14B
FIG. 14A

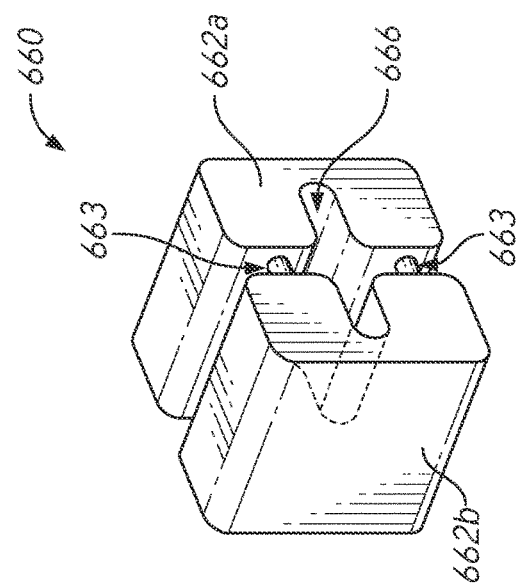
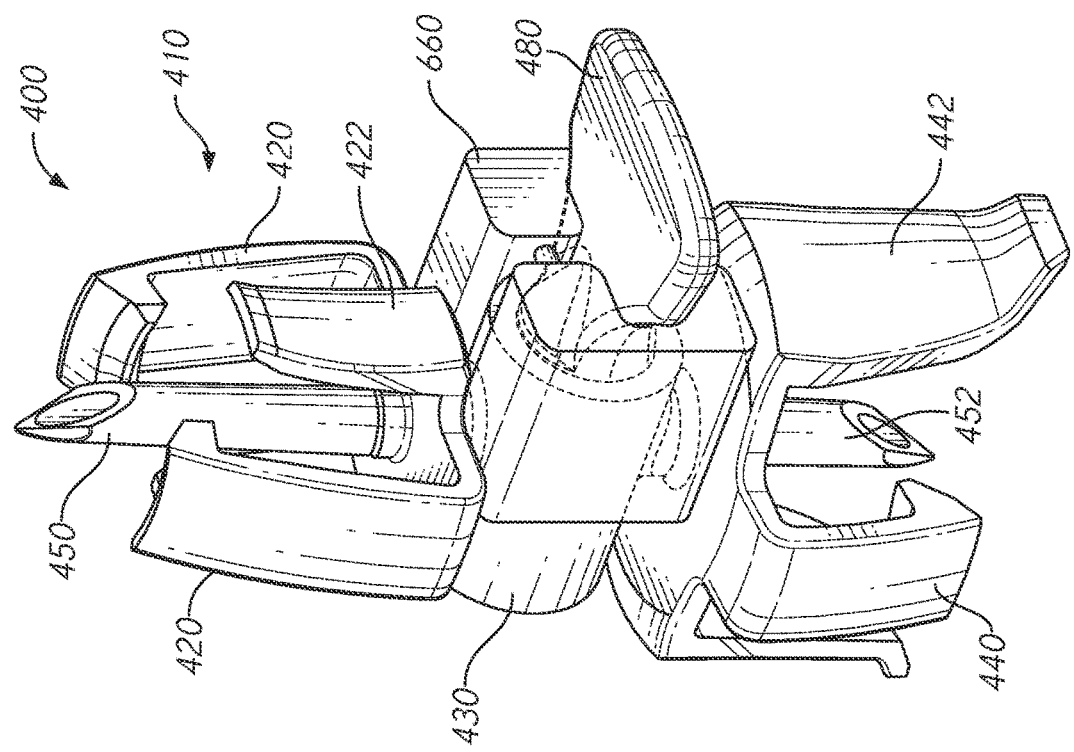
FIG. 15B
FIG. 15A

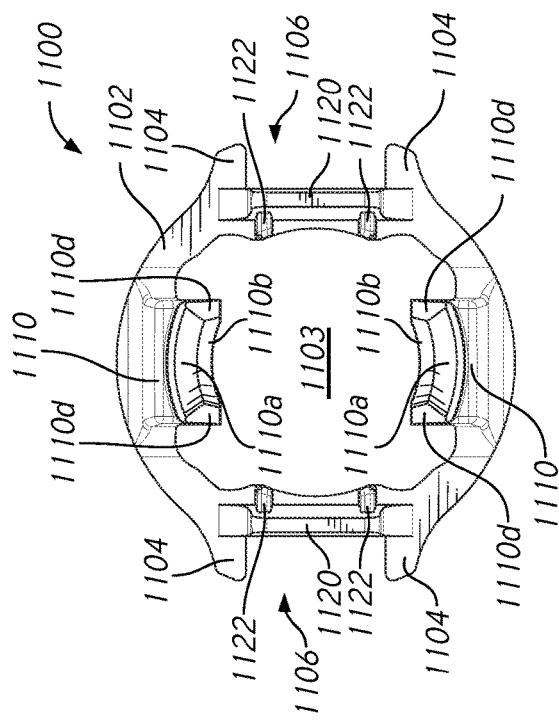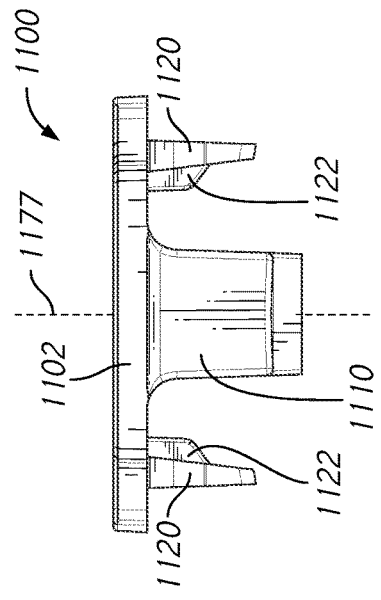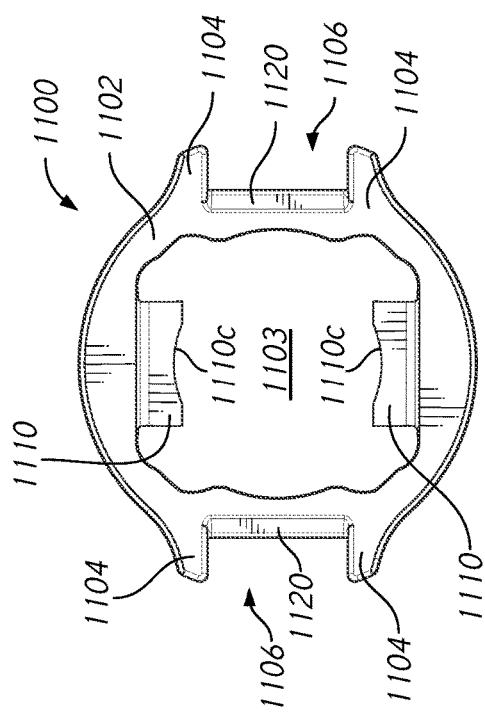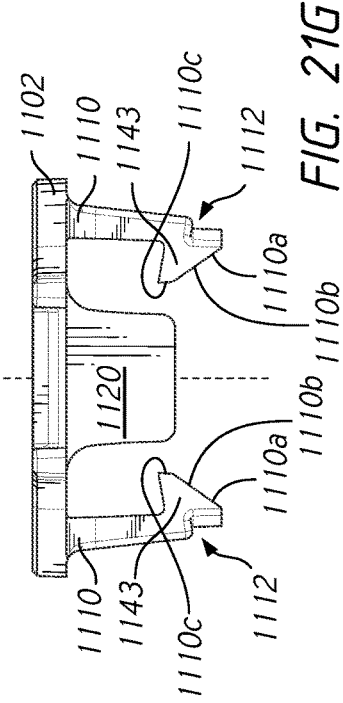

FLUID TRANSFER DEVICE AND METHOD OF USE FOR SAME

RELATED APPLICATIONS

This application claims the benefit of U.S. Provisional Application No. 63/090,086, filed Oct. 9, 2020, titled "Fluid Transfer Device and Method of Use for Same", the entire contents of which is incorporated by reference herein and made a part of this specification.

BACKGROUND

Field of the Disclosure

The present disclosure relates in general to devices for transferring medical fluids, and in particular, to devices for selectively transferring fluids between a medical vial and an intravenous (IV) fluid bag.

Description of the Related Art

A variety of devices and techniques exist for the addition of medicine from a medical vial to an IV fluid bag. Current devices and techniques have various limitations and disadvantages and a need exists for further improvement.

SUMMARY OF THE DISCLOSURE

Intravenous (IV) fluid replacement is an important part of maintaining patient health and/or assisting with patient recovery. IV treatments can provide patients with life-sustaining fluids, electrolytes, and medications. Medications are commonly added to IV fluid bags via medical vials, and a variety of devices and techniques exist for transferring medicine from the vial to the IV fluid bag. For example, a common approach involves extracting medicine from the vial with a syringe and injecting such medicine into a port of the IV fluid bag. Some liquid transfer devices exist which secure to a portion of the medical vial and include a spike that penetrates through a seal of the vial. Typically, the devices and techniques available require shaking of the IV fluid bag in order to mix the medicine appropriately.

In certain situations, it may be desirable to have a fluid transfer device capable of securing to both a port of an IV fluid bag and a port of a medical vial and also capable of selectively opening and closing a fluid flow path between each port.

Various embodiments described herein provide devices and techniques that can be used to selectively transfer fluid between a source container (such as a medical vial) and an intermediate container (such as an IV fluid bag). For example, some embodiments of fluid transfer devices described herein include attachment portions which can secure to ports of a source container and an intermediate container, and which include projections capable of penetrating seals on such ports to allow the source container and intermediate container to be in fluid communication. Additionally, some embodiments of fluid transfer devices described herein include a selector portion configured to allow the fluid transfer device to be selectively transitioned so as to block or provide a flow path between fluid passages defined within the projections of the attachment portions. Various embodiments described herein limit or restrict the fluid transfer device from transitioning from and/or between a first configuration where such flow path is blocked to a second configuration where such flow path is open. Various embodiments described herein can provide an indication that the fluid transfer device has been used, for example, has been transitioned from and/or between such first and second configurations.

In various embodiments, a fluid transfer device for connecting a source container to an intermediate container includes: a first attachment portion configured to engage a first port of the source container, the first attachment portion comprising a first projection defining a first fluid passage; a second attachment portion configured to engage a second port of the intermediate container, the second attachment portion comprising a second projection defining a second fluid passage; a selector portion for selectively transitioning the fluid transfer device from a first configuration in which a flow path between the first and second fluid passages is closed to a second configuration in which the flow path between the first and second fluid passages is open; and a limiter configured to inhibit the selector portion from selectively transitioning the fluid transfer device from the first configuration to the second configuration.

In some embodiments, the limiter is moveable from a first position to a second position, wherein, in the first position, the limiter inhibits the selector portion from transitioning the fluid transfer device from the first configuration to the second configuration, and wherein, in the second position, the limiter allows the selector portion to transition the fluid transfer device from the first configuration to the second configuration. In some embodiments, the limiter is moveable from the second position to the first position, and a smaller force is required to transition the limiter from the first position to the second position than from the second position to the first position.

In some embodiments, the selector portion includes a chamber and a valve configured to fit at least partially within the chamber, and wherein, when the limiter is in the first position, the limiter can inhibit the valve from moving relative to the chamber to selectively transition the fluid transfer device from the first configuration to the second configuration. In some embodiments, the valve is configured to rotate within the chamber to open and close the flow path. In some embodiments, the chamber includes a first aperture aligned with the first fluid passage and a second aperture aligned with the second fluid passage, and wherein, when the valve is in a closed position, the valve blocks at least one of the first and second apertures.

In some embodiments, the valve includes a body and an opening extending through the body, and wherein, when the valve is in the closed position, the opening does not align with the first and second apertures of the chamber. In some embodiments, the valve includes a body and a recess extending along a portion of a perimeter of the body. In some embodiments, when the valve is in the closed position, at least one of the first and second apertures of the chamber is not positioned adjacent to the recess. In some embodiments, the recess has a first end and a second end, and when the valve is in the closed position, at least one of the first and second ends of the recess is not positioned adjacent to one of the first and second apertures of the chamber. In some embodiments, the fluid transfer device further includes a first stem connected to the chamber and to one of the first or second attachment portions, the first stem providing fluid communication between one of the first and second fluid passages and an interior of the chamber, and wherein the limiter is configured to secure to the first stem when in the first and second positions. In some embodiments, the limiter is configured to secure to the first stem in a snap-fit configuration.

In some embodiments, the limiter includes an opening, the opening having a first portion and a second portion spaced from the first portion, the first and second portions sized and shaped to match a size and shape of the first stem, and wherein: when the limiter is in the first position, the first stem is positioned within the first portion of the opening; and when the limiter is in the second position, the first stem is positioned within the second portion of the opening. In some embodiments, the limiter has a first end and a second end opposite the first end, wherein the second portion of the opening is near the second end of the limiter. In some embodiments, the second end of the limiter includes one or more tapered surfaces proximate the second portion of the opening. In some embodiments, the opening of the limiter comprises a third portion positioned between the first and second portions and having a different size and shape than the first and second portions, wherein, when the limiter is moved from the first position to the second position, the first stem passes through the third portion. In some embodiments, the third portion of the opening has a width that is smaller than a width of the first stem such that the first stem contacts portions of the limiter when passing through the third portion of the opening.

In some embodiments, the first stem connects the chamber to the first attachment portion and provides fluid communication between the first fluid passage and the interior of the chamber, and wherein the fluid transfer device includes a second stem that connects the chamber to the second attachment portion and provides fluid communication between the second fluid passage and the interior of the chamber. The second stem can include one or more protrusions configured to prevent the opening of the limiter from securing to the second stem. In some embodiments, the limiter at least partially conforms to a shape of an outer surface of the chamber such that, when the limiter is secured to the first stem in the second position, the limiter surrounds at least a portion of a perimeter of the chamber.

In some embodiments, the valve includes a body configured to fit at least partially within and rotate relative to the chamber and a handle extending away from the body, and wherein a first portion of the limiter is configured to engage the handle to provide tactile feedback when the valve transitions the fluid transfer device from the first configuration to the second configuration. In some embodiments, the limiter includes a first end and a second end opposite the first end, the first end having a chamfered region, and wherein the first portion of the limiter includes a first protrusion extending outward from the chamfered region. In some embodiments, the first end of the limiter includes a second protrusion extending outward from the chamfered region. Ends of the first and second protrusions can be spaced from one another by a gap, the valve having a first rotational position in which at least a portion of the handle is positioned within the gap and a second rotational position in which the handle is not positioned within the gap. The valve can block the flow path when in the second rotational position and open the flow path when in the first rotational position. In some embodiments, the chamfered region of the first end of the limiter is shaped to conform to at least a portion of a shape of the handle such that, when the valve rotates relative to the chamber, the handle passes through at least a portion of a space defined by the chamfered region. In some embodiments, the chamfered region is curved.

In some embodiments, the selector portion includes a chamber and a valve configured to fit at least partially within the chamber. The limiter can be positioned on the chamber such that, when the valve moves relative to the chamber to open the flow path, a portion of the valve contacts and bypasses at least a portion of the limiter. In some embodiments, the valve includes a body and a tab extending outwardly from the body, wherein the portion of the valve that contacts and bypasses the limiter is the tab. In some embodiments, the limiter is configured to detach from the chamber when the portion of the valve contacts the limiter. In some embodiments, the limiter extends outward from an end of the chamber. In some embodiments, the chamber comprises a cylindrical shape and wherein the limiter extends outward from an end of the chamber. In some embodiments, the fluid transfer device further comprises at least one stop extending outward from a portion of the chamber, wherein the at least one stop is configured to contact the portion of the valve and at least partially define first and second rotational positions of the valve, and wherein, the valve blocks the flow path when in the second rotational position and does not block the flow path when in the first rotational position. In some embodiments, the at least one stop comprises two stops. In some embodiments: the chamber comprises a cylindrical shape; the limiter extends outward from an end of the chamber; and the at least one stop extends outward from the end of the chamber and is spaced away from the limiter.

In some embodiments, the first attachment portion includes a first plurality of arms spaced from each other and configured to secure to the first port of the source container. In some embodiments, the first plurality of arms includes a first arm having a free end configured to secure to a portion of the first port of the source container, the free end comprising a latch portion extending towards the first projection in a first direction and having a first chamfered region and a second chamfered region. The first and second chamfered regions can have different chamfer angles. In some embodiments, each of the first and second chamfered regions are curved. In some embodiments, the first projection of the first attachment portion comprises a spike. In some embodiments, the source container can be a medicine vial and the intermediate container can be an intravenous (IV) fluid bag.

In some embodiments, the first attachment portion comprises a pair of latch arms configured to secure to the first port of the source container and a pair of guide arms spaced from the pair of latch arms and configured to at least partially align the first attachment portion with the first port of the source container. In some embodiments, the pair of latch arms are positioned opposite one another relative to an axis extending through the first projection, and wherein the pair of guide arms are positioned opposite one another relative to said axis.

Disclosed herein is a system comprising a fluid transfer device and an adapter configured to connect to one another. The fluid transfer device can comprise an attachment portion configured to connect to a portion of a first container, the attachment portion comprising: a base; a projection extending outward from the base and defining a fluid passage, the projection configured to puncture a seal of the first container to provide fluid communication between the fluid passage and an interior of the first container; and a pair of latch arms extending outward from the base, the pair of latch arms spaced from one another and spaced from the first projection, the pair of latch arms configured to secure to the portion of the first container. The adapter can be secured to the fluid transfer device and can allow the attachment portion of the fluid transfer device to connect to a portion of a second container that is different than the first container. In some embodiments, the adapter comprises: a base; an opening extending through the base; a pair of support arms extending outward from the base of the adapter and spaced from one another; and a pair of latch arms extending outward from the base of the adapter, the pair of latch arms of the adapter spaced from one another and spaced from the pair of support arms, the pair of latch arms of the adapter configured to secure to the portion of the second container. In some embodiments, when the adapter is secured to the fluid transfer device: the projection of the fluid transfer device extends through the opening of the adapter; and each of the pair of support arms of the adapter extends along one of the pair of latch arms.

In some embodiments, when the adapter is secured to the fluid transfer device, each of the pair of support arms of the adapter extends along a portion of a length of the one of the pair of latch arms. In some embodiments, when the adapter is secured to the fluid transfer device, each of the pair of support arms of the adapter extends along less than an entire length of the one of the pair of latch arms. In some embodiments, when the adapter is secured to the fluid transfer device, the base of the adapter contacts the base of the attachment portion of the fluid transfer device. In some embodiments, when the adapter is secured to the fluid transfer device, each of the pair of support arms of the adapter engages the one of the pair of latch arms. In some embodiments, when the adapter is secured to the fluid transfer device, each of the pair of support arms of the adapter is aligned with the one of the pair of latch arms.

In some embodiments, when the adapter is secured to the fluid transfer device, each of the pair of support arms of the adapter is positioned between a portion of the one of the latch arms and a portion of the base of the attachment portion of the fluid transfer device. In some embodiments: each of the pair of latch arms of the attachment portion of the fluid transfer device comprises a latch portion extending toward the projection of the adapter; and when the adapter is secured to the fluid transfer device, each of the pair of support arms of the adapter is positioned between the latch portion and the portion of the base of the attachment portion of the fluid transfer device. In some embodiments, when the adapter is secured to the fluid transfer device, each of the pair of support arms of the adapter contacts the latch portion. In some embodiments, when the adapter is secured to the fluid transfer device, the base of the adapter contacts the base of the attachment portion of the fluid transfer device.

In some embodiments, the pair of support arms of the adapter are positioned opposite one another relative to an axis extending through a center of the opening of the adapter. In some embodiments, the pair of latch arms of the adapter are positioned opposite one another relative to the axis extending through the center of the opening of the adapter. In some embodiments, when the adapter is secured to the fluid transfer device, the axis extending through the center of the opening of the adapter is substantially parallel to an axis extending through a center of the projection. In some embodiments, when the adapter is secured to the fluid transfer device, the axis extending through the center of the opening of the adapter aligns with an axis extending through a center of the projection. In some embodiments, the pair of latch arms of the fluid transfer device are positioned opposite one another relative to an axis extending through a center of the projection.

In some embodiments: each of the pair of latch arms of the fluid transfer device comprises a first end connected to the base and a second end opposite the first end; each of the pair of latch arms of the adapter comprises a first end connected to the base and a second end opposite the first end; the second ends of the pair of latch arms of the fluid transfer device are positioned a first distance from each other; the second ends of the pair of latch arms of the adapter are positioned a second distance from each other; and the first and second distances are different. In some embodiments, the first distance is greater than the second distance.

In some embodiments: the pair of latch arms of the fluid transfer device are positioned approximately 180 degrees from one another relative to an axis extending through a center of the projection; and each of the pair of latch arms of the adapter is positioned approximately 90 degrees from each of the pair of latch arms of the fluid transfer device relative to said axis when the adapter is secured to the fluid transfer device.

In some embodiments, the attachment portion of the fluid transfer device further comprises a pair of guide arms extending outward from the base, the pair of guide arms spaced from one another and spaced from the pair of latch arms of the fluid transfer device. In some embodiments, when the adapter is secured to the fluid transfer device, each of the pair of latch arms of the adapter extends along one of the pair of guide arms of the fluid transfer device. In some embodiments, when the adapter is secured to the fluid transfer device, each of the pair of latch arms of the adapter extends along less than an entire length of the one of the pair of guide arms of the fluid transfer device. In some embodiments, when the adapter is secured to the fluid transfer device, each of the pair of latch arms of the adapter is aligned with the one of the pair of guide arms of the fluid transfer device. In some embodiments, the pair of latch arms of the adapter have a neutral position in which each of the pair of latch arms of the adapter is spaced from one of the pair of guide arms by a first distance and a flexed position in which each of the pair of latch arms of the adapter is spaced from the one of the pair of guide arms by a second distance that is less than the first distance, and wherein the pair of latch arms of the adapter transition from the neutral position to the flexed position when the adapter is secured to the portion of the second container.

In some embodiments, the pair of latch arms of the adapter are configured to flex outward from each other when the adapter is secured the portion of the second container.

In some embodiments, each of the pair of latch arms of the adapter comprises a latch portion extending toward the projection when the adapter is secured to the fluid transfer device. In some embodiments, said latch portion comprises a chamfered region. In some embodiments, the adapter is permanently secured to the fluid transfer device.

BRIEF DESCRIPTION OF THE DRAWINGS

FIG. 10A illustrates the fluid transfer device of FIG. 2A being secured to a portion of a medical vial in accordance with aspects of this disclosure.

FIG. 10B illustrates the fluid transfer device of FIG. 2A secured to the portion of a medical vial of FIG. 10A in accordance with aspects of this disclosure.

FIGS. 14A-14B illustrate another embodiment of a limiter in accordance with aspects of this disclosure.

FIGS. 15A-15B illustrate another embodiment of a limiter in accordance with aspects of this disclosure.

FIGS. 17A-18B illustrate embodiments of caps for the fluid transfer device in accordance with aspects of this disclosure.

FIGS. 21E-21F illustrate top and bottom views (respectively) of the adapter of FIGS. 20A-20F in accordance with aspects of this disclosure.

FIGS. 21G-21H illustrate side and front views (respectively) of the adapter of FIGS. 20A-20F in accordance with aspects of this disclosure.

DETAILED DESCRIPTION

With reference to the attached figures, certain embodiments and examples of fluid transfer devices and components thereof will now be described. Various embodiments of fluid transfer devices described herein are described with reference to an IV fluid bag or a medical vial, but they are not so limited. In some aspects, they can be applied to any fluid flow system to provide for two-way flow between a source container and an intermediate container. As used herein, the term "fluid" refers to either gases or liquids.

Figure 1:
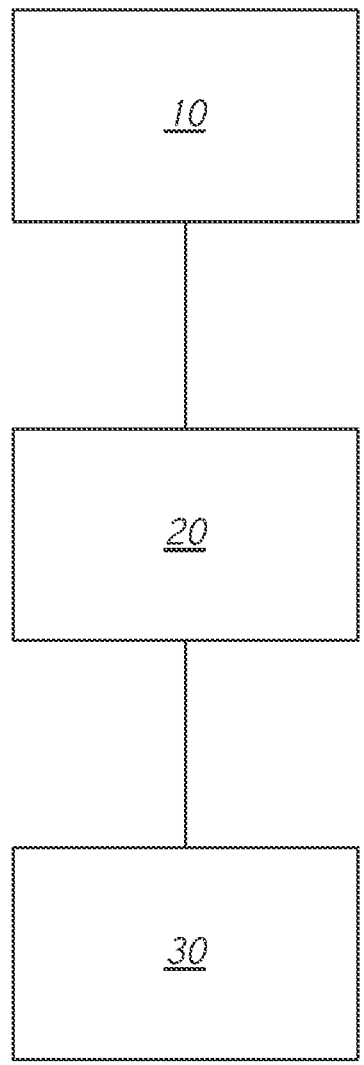
FIG. 1 is a schematic diagram of a fluid transfer device for connecting a source container to an intermediate container.

FIG. 1 illustrates a schematic view of a fluid transfer device 20, a source container 30, and an intermediate container 10. The fluid transfer device 20 can secure to a portion of the source container 30 and a portion of the intermediate container 10. Additionally, the fluid transfer device 20 can allow the source container 30 to be in fluid communication with the intermediate container 10. The fluid transfer device 20 can be positioned between the source container 30 and the intermediate container 10. The fluid transfer device 20 can prevent, limit, and/or provide for fluid communication between the source container 30 and the intermediate container 10. The source container 30 can be, for example, a medical vial or another container holding medical or other fluids. The intermediate container 10 can be, for example, an IV fluid bag or another container configured to hold or store fluids which are intended to be administered to a patient. The intermediate container 10 can be connected to tubing which connects to a catheter line that can be inserted within a vein of a patient, for example. The intermediate container 10 can be, for example an IV bag such as the IV fluid bag 290 shown in FIG. 10D.

In some embodiments, the fluid transfer device 20 includes a first attachment portion configured to attach to a portion of the intermediate container 10 (for example, a port of the intermediate container 10) and a second attachment portion configured to attach to a portion of the source container 30 (for example, a port of the source container 30). In some embodiments, the fluid transfer device 20 includes a first projection configured to penetrate the portion of the intermediate container 10 and a second projection configured to penetrate the portion of the source container 30. For example, the first and second projections of the fluid transfer device 20 can penetrate a seal of the ports of the intermediate container 10 and/or the source container 30. Such penetration can occur, for example, during the securement of the first and/or second attachment portions of the fluid transfer device 20 to the intermediate container 10 and/or the source container 30. The first and second projections can be, by way of non-limiting example, spikes having hollow interiors which each define a fluid passage therein. For example, the first projection can define a first fluid passage and the second projection can define a second fluid passage. In some embodiments, the fluid transfer device 20 includes a selector portion for selectively transitioning the fluid transfer device 20 between a first configuration (or "position") in which a flow path between the first and second fluid passages of the first and second projections are closed, and a second configuration (or "position") in which such flow path is open.

In some embodiments, the fluid transfer device 20 includes one or more limiters which can inhibit the selector portion from selectively transitioning the fluid transfer device 20 from the first configuration to the second configuration. In some embodiments, the one or more limiters are movable from a first position to a second position, wherein, in the first position, the one or more limiters inhibit or prevent the selector portion from transitioning the fluid transfer device 20 from the first configuration to the second configuration, and wherein, in the second position, the one or more limiters allow the selector portion to transition the fluid transfer device 20 from the first configuration to the second configuration. In some embodiments, the one or more limiters can provide an indication that the selector portion has transitioned the fluid transfer device 20 from the first configuration to the second configuration. For example, movement of the one or more limiters from the first position to the second position can provide an indication that the selector portion has transitioned the fluid transfer device 20 from the first configuration to the second configuration. As another example, in some embodiments where the one or more limiters are detachable from the fluid transfer device 20 or a portion thereof (for example, the selector portion), the one or more limiters can be detached when the selector portion transitions the fluid transfer device 20 from the first configuration to the second configuration and such detachment can provide an indication that the selector portion has transitioned the fluid transfer device 20 from the first configuration to the second configuration. In some embodiments, the one or more limiters can limit or restrict a movement of the selector portion (or a portion or component thereof).

Figure 2A:
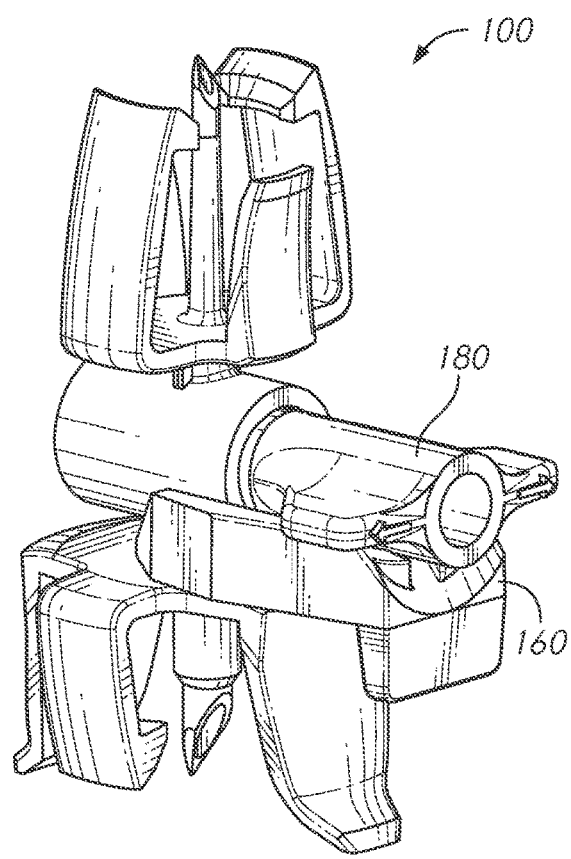
FIG. 2A illustrates a perspective view of an embodiment of a fluid transfer device for connecting a source container to an intermediate container in accordance with aspects of this disclosure.

FIG. 2A illustrates a perspective view of an embodiment of a fluid transfer device 100, which can be the same in some or many respects as fluid transfer device 20 previously described. As described elsewhere herein, the fluid transfer device 100 can interact with a source container and/or an intermediate container in a similar manner as that described above with reference to the fluid transfer device 20, source container 30, and intermediate container 10. The fluid transfer device 100 can include a first attachment portion configured to attach to a portion of an intermediate container (for example, a port of the intermediate container) and a second attachment portion configured to attach to a portion of a source container (for example, a port or rim of the source container). In some embodiments, the first attachment portion can include and/or be defined by the arms 120, arms 122, and/or base 139, each of which are described in more detail below. The second attachment portion can include and/or be defined by the arms 140, arms 142, and/or base 149, each of which are described in more detail below. In some embodiments, the fluid transfer device 100 includes a first projection configured to penetrate the portion of the intermediate container and a second projection configured to penetrate the portion of the source container. The first projection can be connected to or a part of the first attachment portion and the second projection can be connected to or a part of the second attachment portion. The first and second projections can penetrate a seal of the ports of the intermediate container and/or the source container. Such penetration can occur, for example, during the securement of the first and/or second attachment portions of the fluid transfer device 100 to the intermediate container and/or the source container. The first projection can define a first fluid passage and the second projection can define a second fluid passage. The first and second projections can be the projections 150, 152 illustrated in at least FIGS. 2C-3B and described in more detail below.

Similar to the fluid transfer device 20 described above, the fluid transfer device 100 can include a selector portion for selectively transitioning the fluid transfer device 100 between a first configuration (or "position") in which a flow path between the first and second fluid passages of the first and second projections are closed, and a second configuration (or "position") in which such flow path is open. In some embodiments, the selector portion is defined by a chamber and a valve configured to move relative to the chamber to open and close a flow path between the first and second fluid passages of the first and second projections. The chamber can be, for example, the chamber 130 discussed in more detail below. The valve can be, for example, any of valves 180, 280, 280' discussed in more detail below. In some embodiments, the fluid transfer device 100 includes one or more limiters which can inhibit the selector portion from transitioning the fluid transfer device 100 from the first configuration to the second configuration. In some embodiments, the one or more limiters can provide an indication that the selector portion has transitioned the fluid transfer device 100 from the first configuration to the second configuration. For example, the one or more limiters can be moveable between two positions and/or detachable from portions of the fluid transfer device 100 and can provide an indication that the selector portion has transitioned the fluid transfer device 100 from the first configuration to the second configuration when the one or more limiters are moved and/or detached. In some embodiments, the one or more limiters can limit or restrict a movement of the selector portion (or a portion or component thereof). For example, in some embodiments where the selector portion comprises a chamber 130 (discussed below) and a valve 180, 280, 280' (discussed below), the one or more limiters can limit movement (for example, rotation) of the valve 180, 280, 280' relative to the chamber 130 so as to define an open and/or closed position of the valve 180, 280, 280' relative to the chamber 130, which can in turn indicate that the fluid transfer device 100 is in the first or second configuration.

Figure 2B:
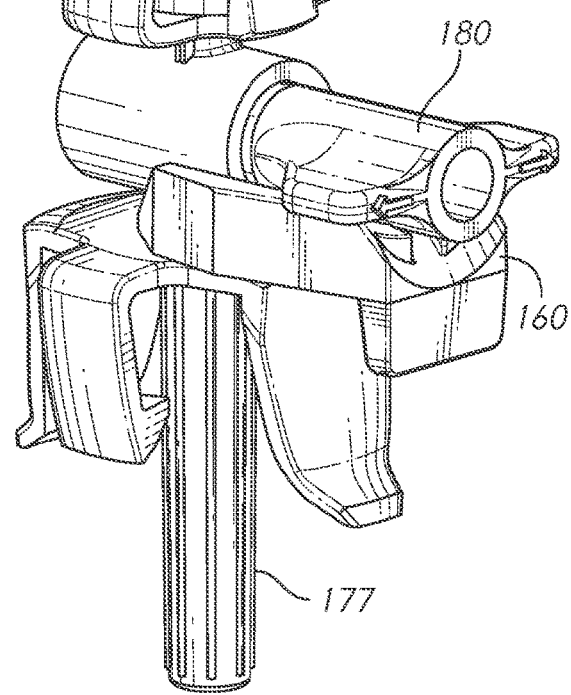
FIG. 2B illustrates a perspective view of the fluid transfer device of FIG. 2A with two caps positioned over projections of the device in accordance with aspects of this disclosure.
Figure 2C:
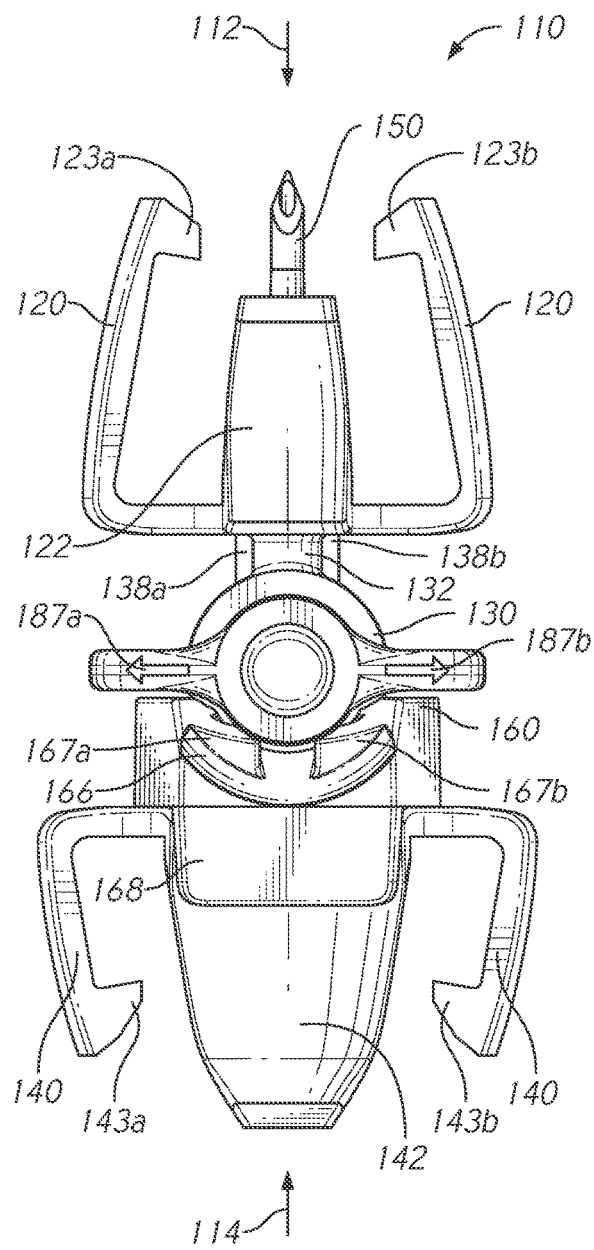
FIG. 2C illustrates a front view of the fluid transfer device of FIG. 2A.
Figure 2D:
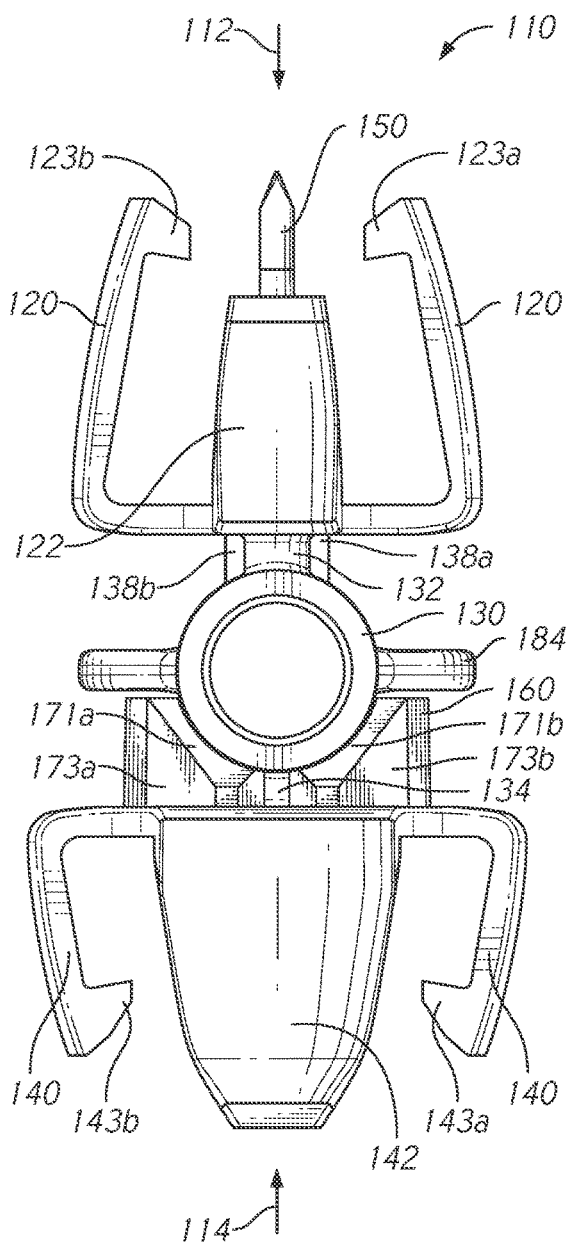
FIG. 2D illustrates a back view of the fluid transfer device of FIG. 2A.
Figure 2E:
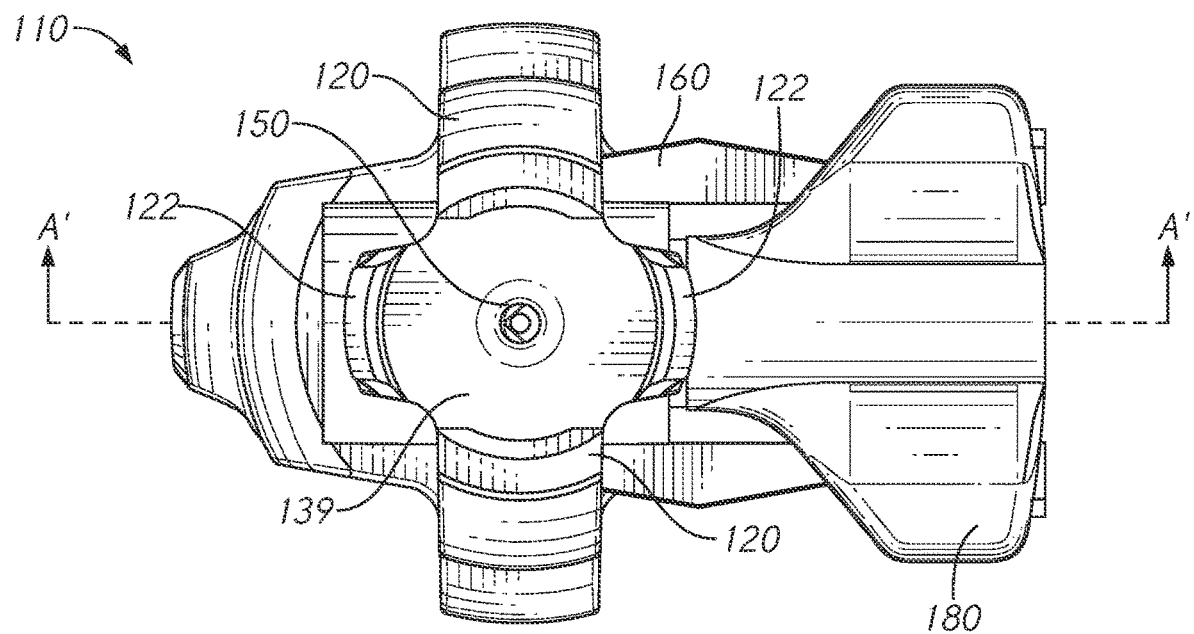
FIG. 2E illustrates a top view of the fluid transfer device of FIG. 2A.
Figure 2F:
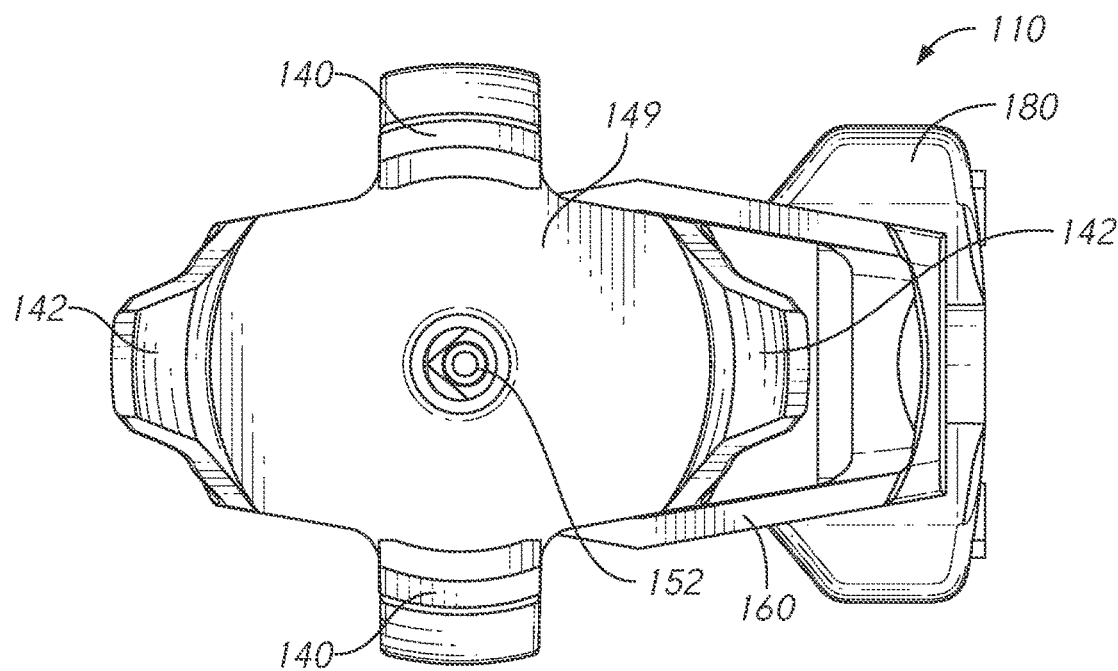
FIG. 2F illustrates a bottom view of the fluid transfer device of FIG. 2A.
Figure 2G:
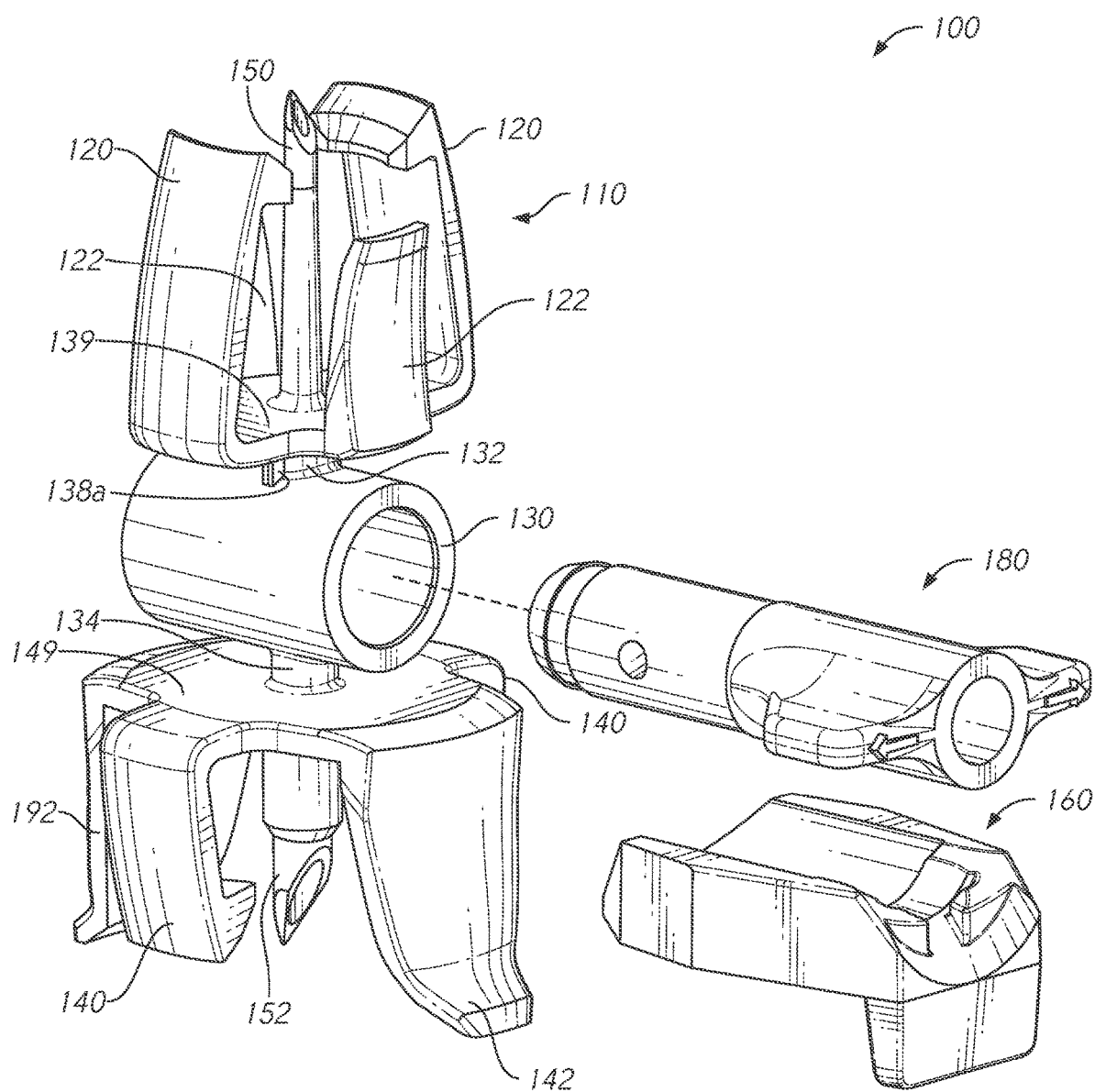
FIG. 2G illustrates an exploded view of the fluid transfer device of FIG. 2A.

FIGS. 2A-2F illustrate various views of the fluid transfer device 100 in an assembled state, whereas FIG. 2G illustrates an exploded view of the fluid transfer device 100. As shown in FIG. 2G, the fluid transfer device 100 can include an adapter 110, a valve 180, and a limiter 160. The valve 180 can be removably secured to the adapter 110 (or a portion thereof) and/or can be configured to move (for example, rotate) within a portion of adapter 110 (such as chamber 130), as explained further below. As discussed above, the fluid transfer device 100 can include first and second attachment portions configured to attach to a source container and an intermediate container. The first attachment portion can be defined by the arms 120, 122, and base 139 and the second attachment portion can be defined by the arms 140, 142 and/or base 149 described below. The first and second attachment portions can be part of and/or defined by the adapter 110. As also discussed above, the fluid transfer device 100 can include first and second projections, such as projections 150, 152 described below, which can be part of and/or defined by adapter 110.

FIG. 2B illustrates caps 175, 177 which can be secured to the fluid transfer device 100, or portions thereof. The cap 175 can cover projection 150 of the adapter 110 and can secure to a portion of the adapter 110, such as to one or more of arms 120, 122, the base 139, and/or projection 150 (see FIGS. 2B and 2G). The cap 177 can cover the projection 152 of the adapter 110 and can secure to a portion of the adapter 110, such as to one or more of arms 140, 142, the base 149, and/or to projection 152. In some embodiments, the cap 175 is sized and/or shaped to contact and be held in place (for example, around projection 150) by one or more of arms 120, 122. In some embodiments, the cap 177 is sized and/or shaped to contact and be held in place (for example, around projection 152) by one or more of arms 140, 142. In some embodiments, the cap 175 includes one or more recesses 179 positioned around a perimeter of an outer surface of the cap 175 which can provide for better gripping by a user. In some embodiments, the cap 177 includes one or more ribs extending from an outer surface of the cap 177 and extending along a length of the cap 177 (or a portion of such length) which can provide for better gripping by a user. In some embodiments, the cap 175 secures to the adapter 110 (for example, to base 139, projection 150, and/or arms 120, 122) around projection 150 in a snap-fit, press-fit, or friction-fit arrangement. In some embodiments, the cap 177 secures to the adapter 110 (for example, to base 149, projection 152, and/or arms 140, 142) around projection 152 in a snap-fit, press-fit, or friction-fit arrangement.

The adapter 110 can be sized, shaped, and/or otherwise configured to secure (for example, removably secure) to a portion of a source container (such as a vial) and/or a portion of an intermediate container (such as an IV fluid bag). With reference to FIGS. 2C-2D and 3A-3B, the adapter 110 can include a first end 112 configured to attach to a portion of an IV fluid bag (such as port 292 of IV bag 290 as shown in FIG. 10D) and a second end 114 configured to attach to a portion of a vial, such as vial cap 157 of vial 155 which can have a puncturable portion (see FIG. 10D). As shown, the first end 112 can be opposite the second end 114. The first end 112 can include a one or more arms (such as one, two, three, four, five, or six or more arms) configured to secure to, interact with, accommodate, and/or cooperate with a portion of an IV bag and the second end 114 can include one or more arms (such as one, two, three, four, five, or six or more arms) configured to secure to, interact with, accommodate, and/or cooperate with a portion of a vial. For example, the adapter 110 can include four arms on the first end 112 and four arms on the second end 114.

The first end 112 of the adapter 110 can include one or more latch arms 120. The latch arms 120 can latch or otherwise secure to a portion an intermediate container. With reference to at least FIGS. 3A-3B (which illustrate side views of latch arms 120) and as further discussed below, the latch arms 120 can extend from the base 139. As shown, the latch arms 120 can be cantilevered and can have free ends that include latch portions 123a, 123b which extend toward the projection 150. Such configuration can allow the latch arms 120 to latch around a portion of the intermediate container, for example, a rim around a perimeter of a port of an IV bag (see FIG. 10D) by pivoting (for example, flexing) relative to a fixed portion or end of the latch arms 120. In some embodiments, the fixed portion of the latch arm 120 is at an opposite end from the free end of the latch arm 120 along a length of the latch arm 120. Alternatively or additionally, the base 139 itself can flex to facilitate lateral movement of the arms 120.

The first end 112 of the adapter 110 can include one or more guide arms 122 as an alternative to or in addition to the latch arms 120. The guide arms 122 can guide and/or partially secure a portion of the intermediate container before, during, and/or after the first end 112 is secured to the intermediate container. As shown in FIGS. 2C-2D, 6B, and 7B and as discussed in more detail below, the guide arms 122 can extend from the base 139. In some embodiments, the guide arms 122 are curved and/or angled with respect to an axis extending through a height of the adapter 110 (for example, an axis extending through the projection 150). In some embodiments, the guide arms 122 curve and/or flare outward away from the projection 150 at or near a free (cantilevered) end thereof (see FIGS. 6B and 7B). Such configuration can allow the guide arms 122 to help align and/or guide a portion of the intermediate container when the first end 112 of the adapter 110 is secured to the portion of the intermediate container. The guide arms 122 can also restrict and/or limit movement of the first end 112 with respect to the portion of the intermediate container in a direction non-parallel (for example, perpendicular) to an axis extending through and/or along a height of the adapter 110, such as an axis extending through the projection 150 of the adapter 110.

While FIGS. 2A-3B, 6B, and 7B illustrate the adapter 110 having two latch arms 120 and two guide arms 122, an alternative number of latch arms 120 and/or guide arms 122 are possible. Further, while ones of the latch arms 120 and/or ones of the guide arms 122 can be spaced apart from each other as shown in these figures, other configurations are possible. In some embodiments, the latch arms 120 are longer than the guide arms 122, which can be advantageous when the latch arms 120 engage onto a rim portion of an IV bag which is positioned a distance away from an end of the port of the IV bag (see FIG. 10D). Alternatively, the latch arms 120 can be shorter or equal in length with the guide arms 122.

The adapter 110 can include a base (for example, a plate) connected to and/or joining the one or more arms 120, 122 of the first end 112. For example, as shown in at least FIGS. 2E-2G and 3A-3B, the adapter 110 can include a base 139 from which the one or more arms 120, 122 extend. The base 139 can have a variety of sizes and/or shapes. For example, the base 139 can be square, rectangular, circular, or elliptical, among other shapes. In some embodiments, the adapter 110 includes a projection 150 that extends from the base 139 in a direction that is non-parallel (for example, perpendicular) with respect to a plane of the base 139. The projection 150 can extend outwardly and/or upwardly (when adapter 110 is in the orientation of FIGS. 2G-3B) from an interior (for example, a center) of the base 139. The projection 150 can be, for example a spike or other projection capable of penetrating a seal or other portion of an intermediate container (for example, on a port thereof). The projection 150 can include and/or at least partially define a fluid passage 150a (see FIGS. 8A-8B) that can align with and/or be defined at least partially by an aperture in the base 139 (for example, an aperture in the base 139 that is proximate to and/or aligned with a center of stem 132). In some embodiments, one or both of the projections 150, 152 have a tapered end.

With reference to FIGS. 2C-2D, the latch arms 120 can extend outward from the base 139 in a direction that is non-parallel with respect to a plane of the base 139. For example, the latch arms 120 can extend from the base 139 and at least a portion of the latch arms 120 can be angled towards the projection 150 and/or toward an axis extending through a center of the adapter 110 along a height thereof. Additionally, as shown in FIGS. 2C-2D and 3A-3B, free ends of the latch arms 120 can include latch portions 123a, 123b that extend inwardly toward the projection 150 and/or towards an axis extending through a center of the adapter 110. Such configuration can allow the latch arms 120 to better engage and/or secure to the intermediate container (or a portion thereof). Further, when securing to a portion of the intermediate container, the latch arms 120 can flex outward to accommodate a size and/or shape of such portion of the intermediate container.

With reference to FIGS. 2C-2D, 6B, and 7B, the guide arms 122 can extend outward from the base 139 in a direction that is non-parallel with respect to a plane of the base 139. In some embodiments, the guide arms 122 extend from the base 139 and angle and/or curve away from the projection 150 and/or away from an axis extending through a center of the adapter 110. For example, the guide arms 122 can extend perpendicular from the base 139 in a first direction and can flare or otherwise extend outward from the projection 150 at or near a free end of the guide arms 122. Such angle, curvature, and/or direction of the guide arms 122 can allow the guide arms 122 to align and/or guide a portion of the intermediate container (when the first end 112 is secured thereto) without latching.

As discussed above, the adapter 110 can include a second end 114 configured to attach to a portion of a vial. The second end 114 of the adapter 110 can include one or more latch arms 140. The latch arms 140 can latch or otherwise secure to a portion of a source container. With reference to at least FIGS. 3A-3B (which illustrate side views of the latch arms 140) and as further discussed below, the latch arms 140 can extend from the base 149. As shown, the latch arms 140 can be cantilevered and can have free ends that include latch portions 143a, 143b which extend toward the projection 152. Such configuration can allow the latch arms 140 to latch around a portion of a source container, for example, a rim around a perimeter of a port of a vial (see FIGS. 10A-10D) by pivoting (for example, flexing) relative to a fixed portion or end of the latch arms 140. In some embodiments, the fixed portion of the latch arm 140 is at an opposite end from the free end of the latch arm 140 along a length of the latch arm 140. Alternatively, or additionally, the base 149 itself can flex to facilitate lateral movement of the arms 140.

The second end 114 of the adapter 110 can include one or more guide arms 142 as an alternative to or in addition to the latch arms 140. The guide arms 142 can guide and/or partially secure a portion of the source container before, during, and/or after the second end 114 is secured to the source container. As shown in at least FIGS. 6B and 7B, the guide arms 142 can extend from the base 149. In some embodiments, the guide arms 142 are curved and/or angled with respect to an axis extending through a height of the adapter 110 (for example, an axis extending through the projection 152). In some embodiments, the guide arms 142 curve and/or flare outward away from the projection 152 at or near a free (cantilevered) end thereof (see FIGS. 6B and 7B). Such configuration can allow the guide arms 142 to help align and/or guide a portion of the source container when the second end 114 of the adapter 110 is secured to the portion of the source container. The guide arms 142 can also restrict and/or limit movement of the second end 114 with respect to the portion of the source container in a direction non-parallel (for example, perpendicular) to an axis extending through and/or along a height of the adapter 110, such as an axis extending through the projection 152 of the adapter 110.

Figure 6A:
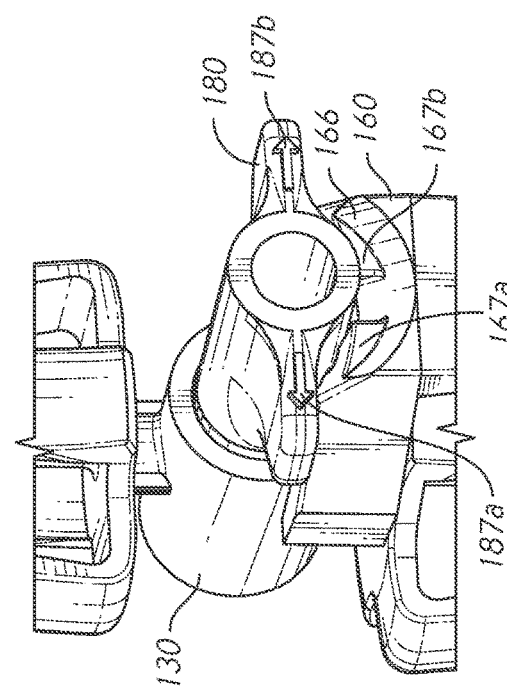
FIG. 6A illustrates an enlarged view of a portion of the fluid transfer device of FIG. 2A in which the limiter is in a first position in accordance with aspects of this disclosure.
Figure 7A:
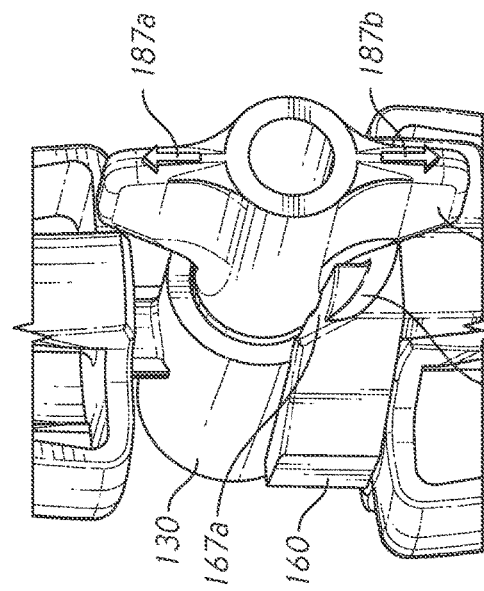
FIG. 7A illustrates an enlarged view of a portion of the fluid transfer device of FIG. 2A in which the limiter of the fluid transfer device is in a second position in accordance with aspects of this disclosure.
Figure 6B:
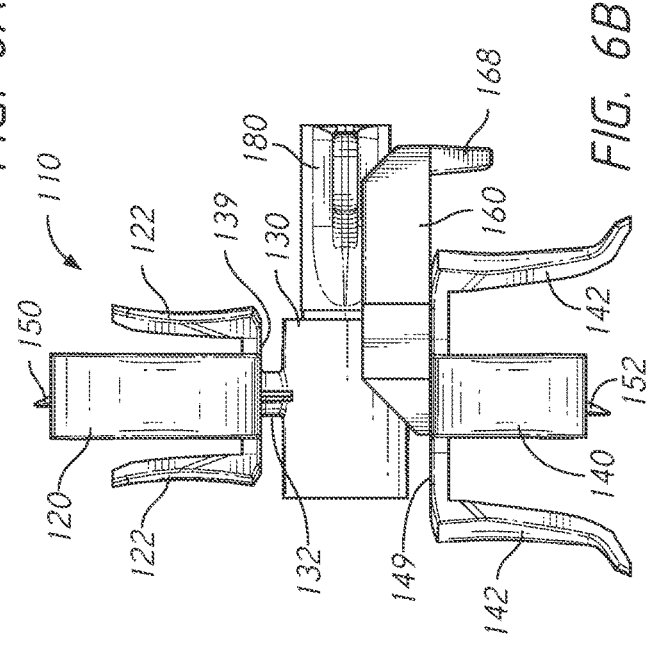
FIG. 6B illustrates a side view of the fluid transfer device of FIG. 2A in which the limiter of the fluid transfer device is in the first position as shown in FIG. 6A.
Figure 7B:
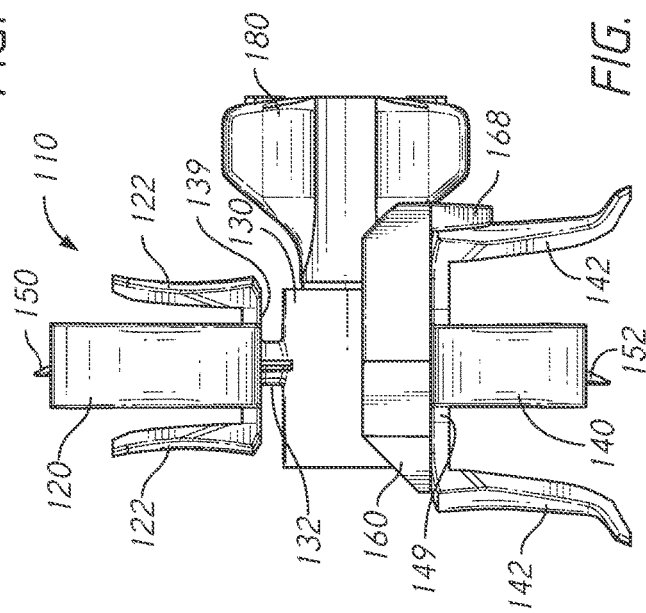
FIG. 7B illustrates a side view of the fluid transfer device of FIG. 2A in which the limiter of the fluid transfer device is in the second position as shown in FIG. 7A.

While FIGS. 2A-3B, 6B, and 7B illustrate the adapter 110 having two latch arms 140 and two guide arms 142, an alternative number of latch arms 140 and/or guide arms 142 are possible. Further, while ones of the latch arms 140 and/or ones of the guide arms 142 can be spaced apart from each other, other configurations are possible. The latch arms 140 can be longer, shorter, or equal in length to the guide arms 142. In some embodiments, the guide arms 142 are longer than the latch arms 140, which can advantageously allow the guide arms 142 to contact sides of a vial and help guide or align securement of the latch arms 142 to a rim of the vial (see FIGS. 10A-10D). With reference to FIGS. 6B and 7B, in some embodiments, the guide arms 142 are longer than the guide arms 122 and/or the latch arms 140 are shorter than the latch arms 120.

The adapter 110 can include a base (for example, a plate) connected to and/or joining the one or more arms 140, 142 of the second end 114. For example, as shown in at least FIGS. 2E-2G, 3A-3B, 6B, and 7B, the second end 114 can include a base 149 from which the one or more arms 140, 142 extend. The base 149 can have a variety of sizes and/or shapes. For example, the base 149 can be square, rectangular, circular, or elliptical, among other shapes. In some embodiments, the adapter 110 includes a projection 152 that extends from the base 149 in a direction that is non-parallel (for example, perpendicular) with respect to a plane of the base 149. The projection 152 can extend outwardly and/or downwardly (when adapter 110 is in the orientation of FIGS. 2G-3B) from an interior (for example, a center) of the base 149. The projection 152 can be, for example a spike or other projection capable of penetrating a seal or other portion of a medical vial. The projection 152 can include and/or at least partially define a fluid passage 152a (see FIGS. 8A-8B) that can align with and/or be defined at least partially by an aperture in the base 149 (for example, an aperture in the base 149 that is proximate to and/or aligned with a center of stem 134). In some embodiments, the projection 152 is aligned with the projection 150. For example, in some embodiments, an axis extending through the projection 150 aligns with an axis extending through the projection 152. The axes extending through projections 150, 152 can align with a center axis extending along a height of the adapter 110. The base 149 can be wider and/or longer than the base 139, for example, where the second end 114 secures to a portion of a source container that has a larger cross-section and/or area than a portion of an intermediate container that the first end 112 secures to.

With reference to FIGS. 2C-2D, the latch arms 140 can extend outward from the base 149 in a direction that is non-parallel with respect to a plane of base 149. For example, the latch arms 140 can extend from the base 149 and at least a portion of the latch arms 140 can be angled towards the projection 152 and/or toward an axis extending through a center of adapter 110. Additionally, as shown in FIGS. 2C-2D and 3A-3B, free ends of latch arms 140 can include latch portions 143a, 143b that extend inwardly toward the projection 152 and/or towards an axis extending through a center of adapter 110. Such configuration can allow the latch arms 140 to better engage and/or secure to the source container. Further, when securing to a portion of the source container, the latch arms 140 can flex outward to accommodate a size and/or shape of a portion of the source container (for example, a rim and/or cap of the source container).

With reference to FIGS. 2C-2D, 6B, and 7B, the guide arms 142 can extend outward from the base 149 in a direction that is non-parallel with respect to a plane of base 149. In some embodiments, the guide arms 142 extend from the base 149 and angle and/or curve away from the projection 152 and/or away from an axis extending through a center of the adapter 110. For example, the guide arms 142 can extend perpendicular from the base 149 in a first direction and can flare or otherwise extend outward from the projection 152 at or near a tip of the guide arms 142. Such angle, curvature, and/or direction of the guide arms 142 can allow the guide arms 142 to align and/or guide a portion of the source container without latching when the second end 114 is secured to the source container. For example, the guide arms 142 can prevent or reduce movement of a portion of the source container in a direction non-parallel (for example, perpendicular) to an axis extending through a center of the adapter 110.

Figure 3A:
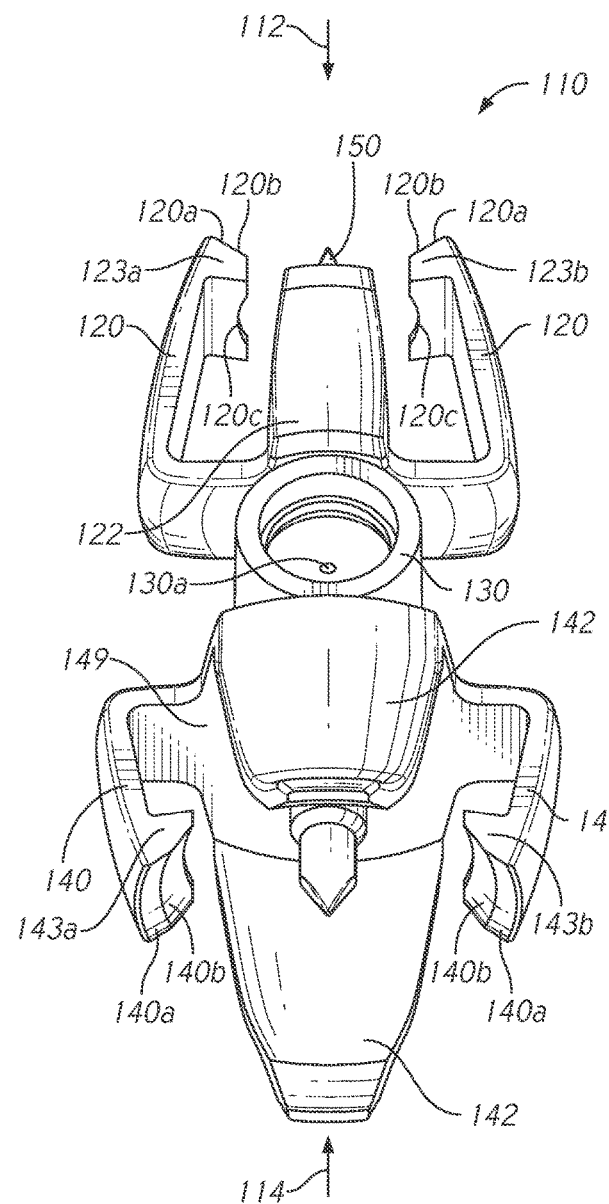
FIG. 3A illustrates a bottom perspective view of an adapter of the fluid transfer device of FIG. 2A.
Figure 3B:
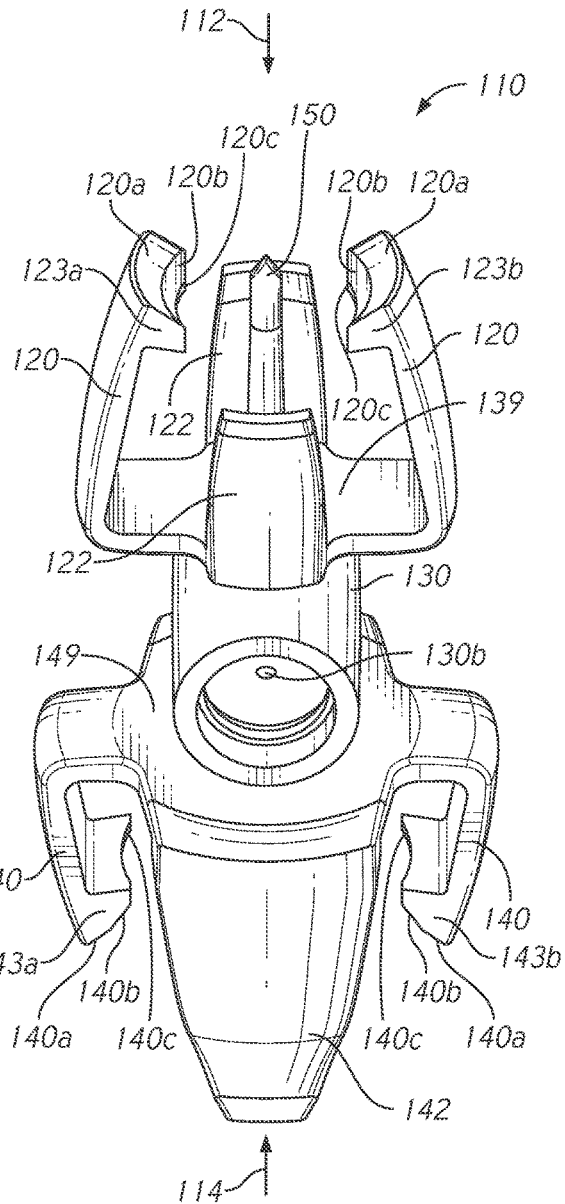
FIG. 3B illustrates a top perspective view of the adapter of FIG. 2A.

The adapter 110 (for example, one or both of first and second ends 112, 114) can include features that facilitate a smooth transition and/or maintain a relatively constant installation force when the adapter 110 is secured to the intermediate container and/or source container (or portions thereof). For example, with reference to FIGS. 3A-3B, the latch arms 120 of adapter 110 can include one or more chamfered regions on free ends thereof (for example, at the latch portions 123a, 123b) which help allow portions of the intermediate container to smoothly pass over when the first end 112 is secured thereto. As discussed above, the latch portions 123a, 123b of the latch arms 120 can extend inwardly toward the projection 150. The latch portions 123a, 123b can be recessed and/or chamfered to facilitate engagement with a portion of the intermediate container (for example a port of an IV bag). With reference to FIGS. 3A-3B, the latch portions 123a, 123b can have chamfered regions 120a, 120b. For example, the latch portions 123a, 123b can include a first region 120a chamfered at a first angle with respect to, for example, a plane of the base 139 (and/or a plane parallel to such plane of the base 139), and can have a second region 120b chamfered at a second angle with respect to the plane of the base 139 (and/or a plane parallel to such plane of the base 139). In some embodiments, the two chamfered regions 120a, 120b are adjacent to one another. The first angle of chamfered region 120a can be smaller than the second angle of chamfered region 120b with respect to a plane of base 139 (and/or another plane parallel to the plane of base 139). The first and second chamfered regions 120a, 120b, can have a curved chamfer along a width of the latch portions 123a, 123b of the latch arm 120. The width of the latch portions 123a, 123b extends along an axis parallel to that defined by A'-A' in FIG. 2E. The latch portions 123a, 123b can have a recessed edge 120c that is curved to accommodate a portion of a perimeter of the intermediate container. For example, the recessed edge 120c can have a curvature that matches a curvature of a perimeter of a port for an IV bag (or a portion thereof), with reference to FIG. 10D.

Including one or more of the chamfered regions 120a, 120b on the latch portions 123a, 123b can advantageously facilitate a smooth securement of the adapter 110 to the intermediate container when a portion of the intermediate container engages and passes by and/or through the latch arms 120. The chamfered regions 120a, 120b can direct forces laterally to pivot (for example, flex) the arms 120 to allow movement onto the intermediate container. Further, such chamfered regions 120a, 120b keep installation forces relatively constant when the adapter 110 is secured to the intermediate container, which can help reduce possibility of leakage or excessive puncturing of seals of the intermediate container. Because these chamfered regions 120a, 120b provide such smooth, controlled securement, the securement of the adapter 110 to an intermediate container can be performed with one hand in some situations.

Similar to the latch arms 120 of the first end 112 of the adapter 110, the latch arms 140 can include chamfered regions on free ends thereof (for example, on the latch portions 143a, 143b) which help allow portions of a source container to smoothly pass over when the second end 114 of the adapter 110 is secured thereto. As discussed above, the latch portions 143a, 143b of the latch arms 140 can extend inwardly toward the projection 152. The latch portions 143a, 143b can be recessed and/or chamfered to facilitate engagement of a portion of the source container (for example a port of a vial). With reference to FIGS. 3A-3B, the latch portions 143a, 143b can have chamfered regions 140a, 140b. The latch portions 143a, 143b can have a first region 140a chamfered at a first angle with respect to, for example, a plane of the base 149 (and/or a plane parallel to the plane of the base 149), and can have a second region 140b chamfered at a second angle with respect to the plane of the base 149 (and/or a plane parallel to the plane of the base 149). In some embodiments, the two chamfered regions 140a, 140b are adjacent to one another. The first angle of chamfered region 140a can be smaller than the second angle of chamfered region 140b with respect to a plane of base 149 (and/or another plane parallel to the plane of base 149, for example). The first and second chamfered regions 140a, 140b can have a curved chamfer along a width of the free end of the latch arm 140. The width of the latch portions 143a, 143b extends along an axis parallel to that defined by A'-A' in FIG. 2E. The latch portions 143a, 143b can have a recessed edge 140c that is curved to accommodate a portion of a perimeter of the source container. For example, the recessed edge 140c can have a curvature that matches a curvature of a perimeter of a port for vial (or portion thereof). Such recessed edge 140c can help facilitate alignment and/or positioning of the latch arms 140 during securement with the vial.

Including one or more of the chamfered regions 140a, 140b on the latch portions 143a, 143b can advantageously facilitate a smooth securement of the adapter 110 to the source container when a portion of the source container engages and passes by and/or through the latch arms 140. The chamfered regions 140a, 140b can direct forces laterally to pivot (for example, flex) the arms 120 to allow movement onto the source container. Further, such chamfered regions 140a, 140b keep installation forces relatively constant when the adapter 110 is secured to the source container, which can help reduce possibility of leakage or excessive puncturing to seals of the source container. Because these chamfered regions 140a, 140b provide such smooth, controlled securement, the securement of the adapter 110 to a source container can be performed with one hand in some situations.

In some embodiments, the guide arms 142 have a greater length and/or width than the latch arms 140. Such configuration can be beneficial when the second end 114 of adapter 110 secures to a vial. For example, when the second end 114 secures to a vial, the shorter latch arms 140 can advantageously secure to a cap and/or end of the vial while the longer guide arms 142 engage a lower portion of the vial container (for example, a side of the vial container) as illustrated in FIGS. 10A-10D.

As shown in at least FIGS. 2C-2D and 2G, the adapter 110 can include a chamber 130. As discussed in more detail below, the chamber 130 can be sized and/or shaped to receive at least a portion of a valve 180. The chamber 130 can be non-integral or integral with one or more portions of the adapter 110. For example, the chamber 130 can be integral with the one or more arms 120, 122 and/or the base 139, and/or can be integral with the one or more arms 140, 142 and/or the base 149. As shown in at least FIG. 2G, the chamber 130 can be connected to the base 139 via stem 132 and/or can be connected to the base 149 via stem 134. The stems 132, 134 can be non-integral or integral with the chamber 130, the base 139, and/or the base 149. The stems 132, 134 can have a height which allows for gaps to exist between the chamber 130 and one or both of the bases 139, 149. As discussed in more detail below, the stems 132, 134 can allow the one or more arms 120, 122, one or more arms 140, 142, the base 139, and/or the base 149 to flex with respect to one or more of each other when forces are applied to the adapter 110 (see discussion with reference to FIG. 10C below).

FIGS. 3A-3B illustrate top and bottom angled perspective views of the adapter 110 without the valve 180 or the limiter 160. As shown, the chamber 130 can include a first aperture 130a (FIG. 3A) and a second aperture 130b (FIG. 3B). The first aperture 130a can be aligned with an axis of projection 150 and/or the fluid passage 150a (see FIGS. 8A-8B). Similarly, the second aperture 130b can be aligned with an axis of the projection 152 and/or the fluid passage 152b (see FIGS. 8A-8B). In some embodiments, the first aperture 130a is aligned with the second aperture 130b. Where the adapter 110 includes the stems 132, 134, such stems 132, 134 can include openings extending through heights thereof, and such openings can align with the axes of the projections 150, 152 and/or openings 130a, 130b in chamber 130. Fluid passageway 150a can be defined by an opening extending through projection 150, an opening extending through base 139, an opening extending through stem 132, and/or opening 130a in chamber 130. Fluid passageway 152a can be defined by an opening extending through projection 152, an opening extending through base 149, and opening extending through stem 134, and/or opening 130b in chamber 130. While the apertures 130a, 130b are illustrated having a circular cross-section, the apertures 130a, 130b can have a different cross-sectional shape in some embodiments.

As discussed above, the chamber 130 can be sized and/or shaped to receive a portion of a valve 180. For example, the chamber 130 can include a hollow interior that is sized and/or shaped to receipt a portion of valve 180. The chamber 130 can have a circular, square, rectangular, pentagonal, hexagonal, heptagonal, octagonal, nonagonal, or decagonal cross-section, for example. In some embodiments, the chamber 130 is cylindrical.

Figure 4A:
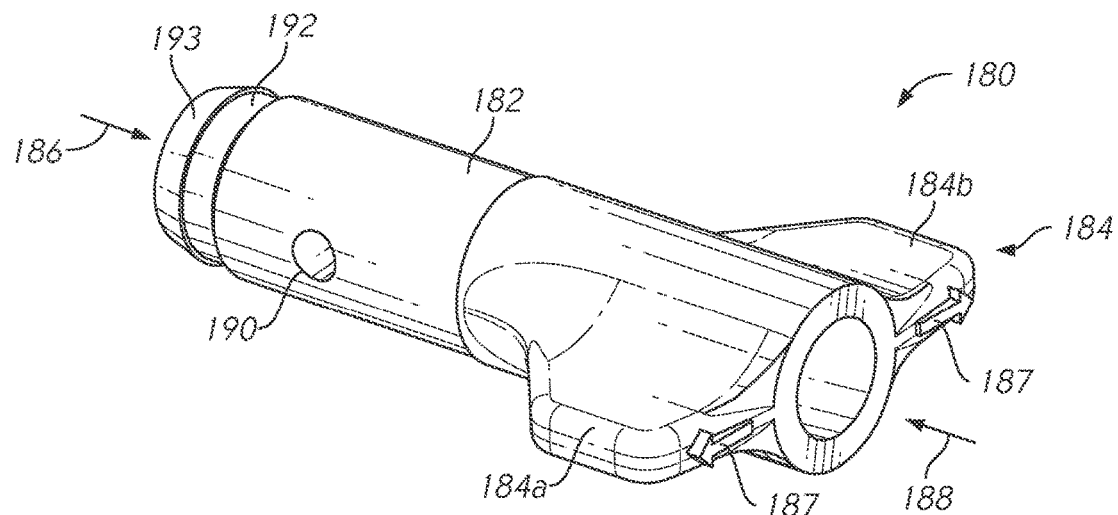
FIG. 4A illustrates a perspective view of a valve of the fluid transfer device of FIG. 2A.
Figure 4B:
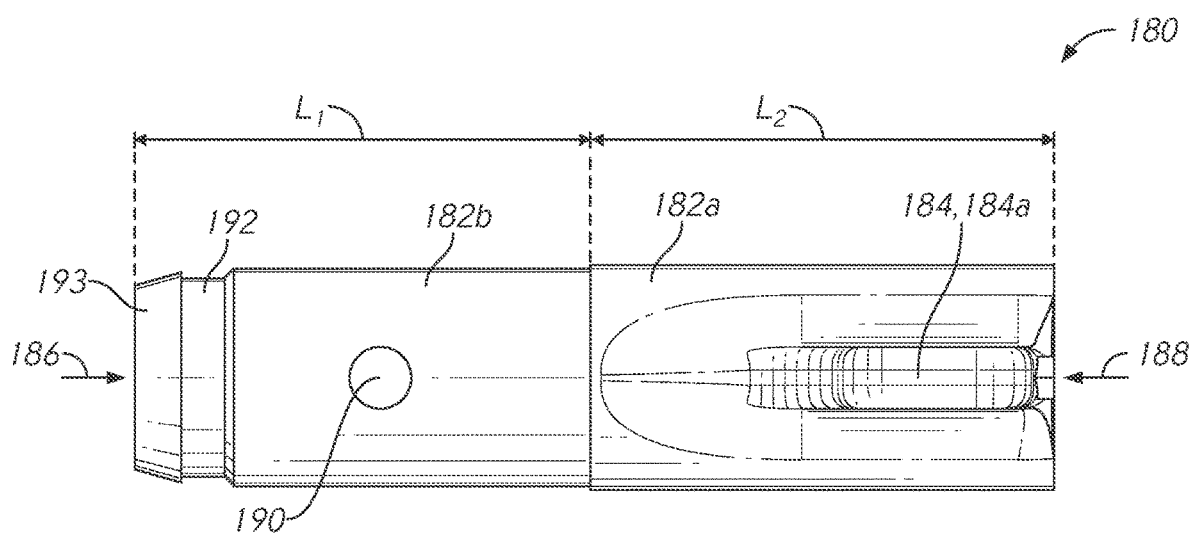
FIG. 4B illustrates a side view of the valve of FIG. 4A.

FIGS. 4A-4B illustrate various views of a valve 180. The valve 180 can be sized and/or shaped to at least partially fit within a portion of the chamber 130. As shown, the valve 180 can include a body 182 and a handle 184 which can be defined by one or more wings 184a, 184b. The body 182 can be sized and/or shaped to fit within at least a portion of the chamber 130. The body 182 can have a circular cross-section, for example. The body 182 can be cylindrical. In some embodiments, at least a portion of the body 182 has a cross-section matching or corresponding to a cross-section of an interior of the chamber 130. As shown, the valve 180 has a first end 188 and a second end 186 opposite the first end 188. The second end 186 of the valve 180 can include one or more features that allow the second end 186 to be secured to and/or within the chamber 130 of the adapter 110. For example, the body 182 can include a tapered portion 193 at the second end 186 and a recessed portion 192 having a cross-section that is smaller than a cross-section of the body 182 and/or a portion of the tapered portion 193. When the body 182 is inserted into the chamber 130, the tapered portion 193 can slide past a protruding inner rim 191 of chamber 130 (see FIGS. 8A-8B) so as to position inner rim 191 at least partially within the recessed portion 192 of the body 182. Such positioning of the inner rim 191 of chamber 130 within the recessed portion 192 can prevent or limit movement of the valve 180 within the chamber 130 along an axis extending through a center of the chamber 130 (for example, with reference to FIGS. 8A-8B, in the "left" or "right" direction). This can in turn prevent a user from removing the valve 180 from the chamber 130 whether intentional or unintentional (for example, during operation of the fluid transfer device 100). In some embodiments, the valve 180 is a stopcock.

As mentioned above and as shown in FIGS. 4A-4B, the valve 180 can include a handle 184 which, in some embodiments, is defined by one or more wings 184a, 184b. The wings 184a, 184b can extend away from body 182, for example, in a direction perpendicular to an axis running through a length of the body 182. In some embodiments, each of the wings 184a, 184b extend outward from the body 182 and along a portion of a length of the body 182. As shown in FIG. 4A, the wings 184a, 184b can extend in two, opposite directions perpendicular to the axis extending through the length of body 182. Such configuration can facilitate interaction (for example, rotation) by a user. Edges of the wings 184a, 184b can be rounded to increase comfort when a user grasps, moves, and/or rotates the valve 180.

As discussed above, a portion of the valve 180 can be positioned within the chamber 130. As shown in FIG. 4B, a first portion 182b of the body 182 of the valve 180 can have a length $L_1$ that is sized to match a length of the chamber 130. The first portion 182b can have a cross-sectional area that is sized to fit within a cross-sectional area defined within an interior of the chamber 130. As shown, a second portion 182a of the body 182 can have a length $L_2$ that is equal to, smaller, or greater than the length $L_1$ of the first portion 182b of the body 182. As also shown, the second portion 182a can have a larger cross-sectional area than the first portion 182b of the body 182 and/or an interior of the chamber 130 so as to prevent the second portion 182a from entering the interior of the chamber 130 when the valve 180 is secured thereto. The region where the first and second portions 182a, 182b meet can define a ledge.

As previously mentioned, the chamber 130 can include a first aperture 130a and a second aperture 130b (see FIGS. 3A-3B). When the valve 180 (for example, the first portion 182b of the valve 180) is positioned within the chamber 130, the valve 180 can be moved so as to block or not block one or both of the first and second apertures 130a, 130b. As shown in FIGS. 4A-4B, the valve 180 can include an opening 190 extending through a portion thereof (for example, portion 182b of body 182) which can allow a flow path between the first and second apertures 130a, 130b and/or the fluid passages 150a, 152a, to be open when the valve 180 is positioned within the chamber 130. As shown, the opening 190 can extend through a width of the body 182 of the valve 180 in a direction that is non-parallel (for example, perpendicular) to a length of the valve 180 and/or an axis extending through a center of the valve 180 along its length.

Figure 5A:
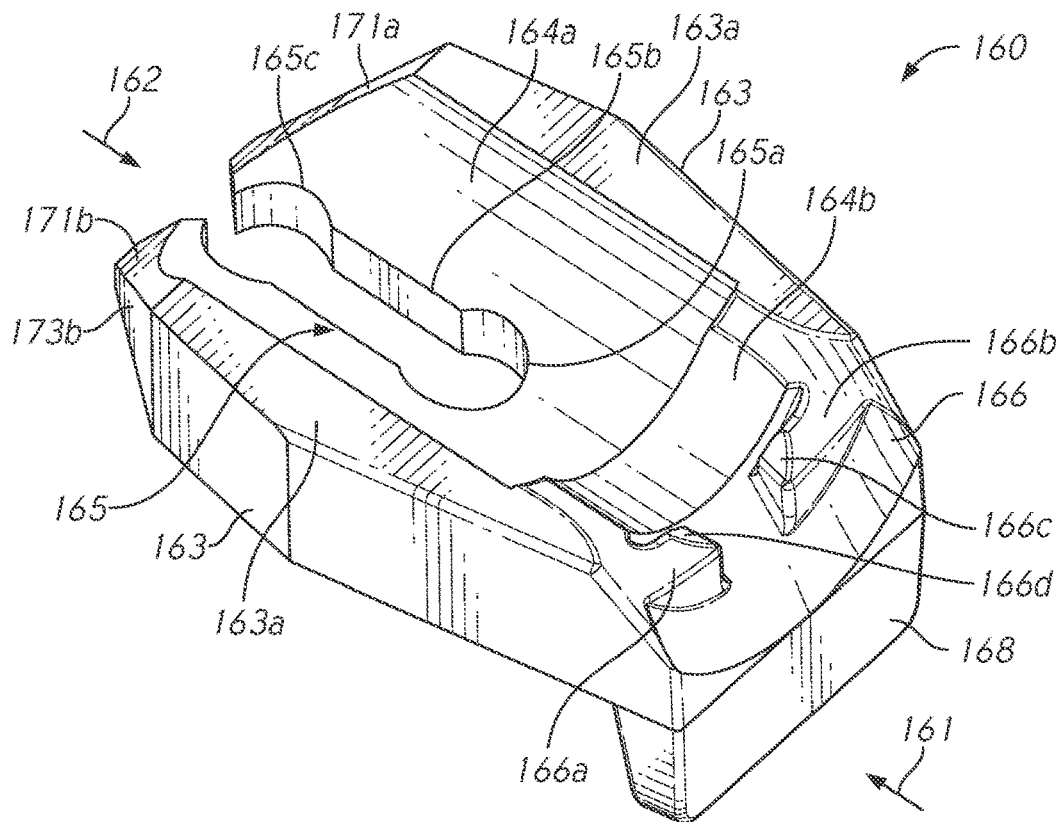
FIG. 5A illustrates a perspective view of a limiter of the fluid transfer device of FIG. 2A.
Figure 5B:
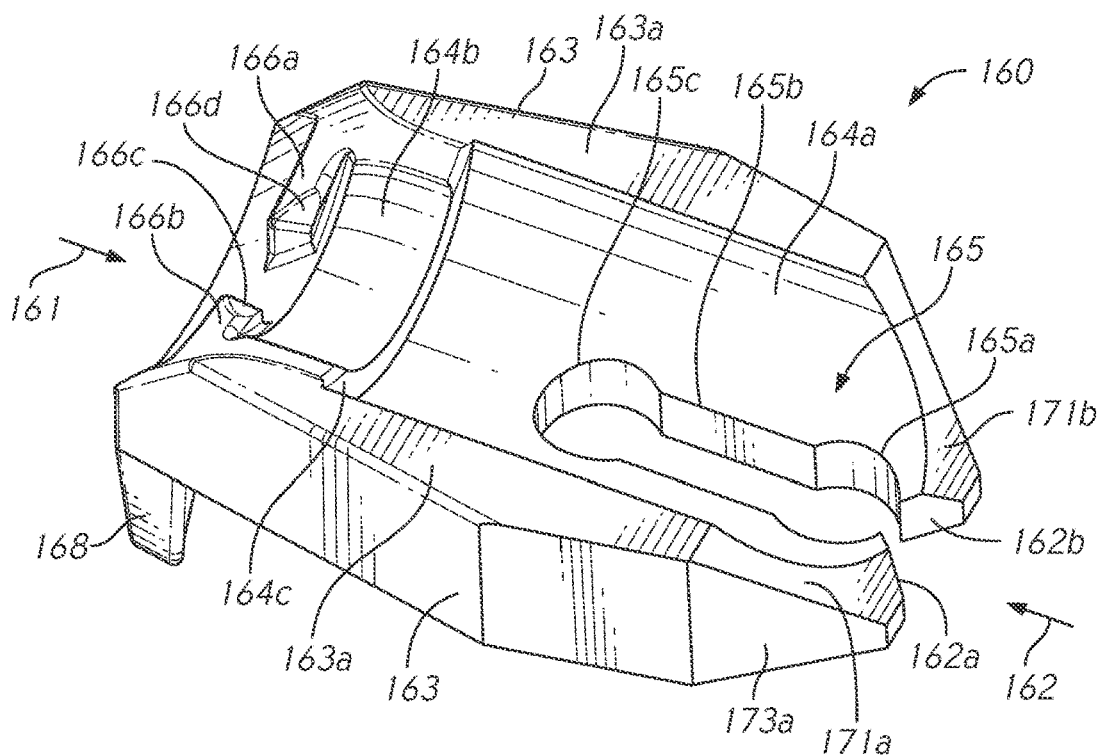
FIG. 5B illustrates another perspective view of the limiter of FIG. 5A.
Figure 5C:
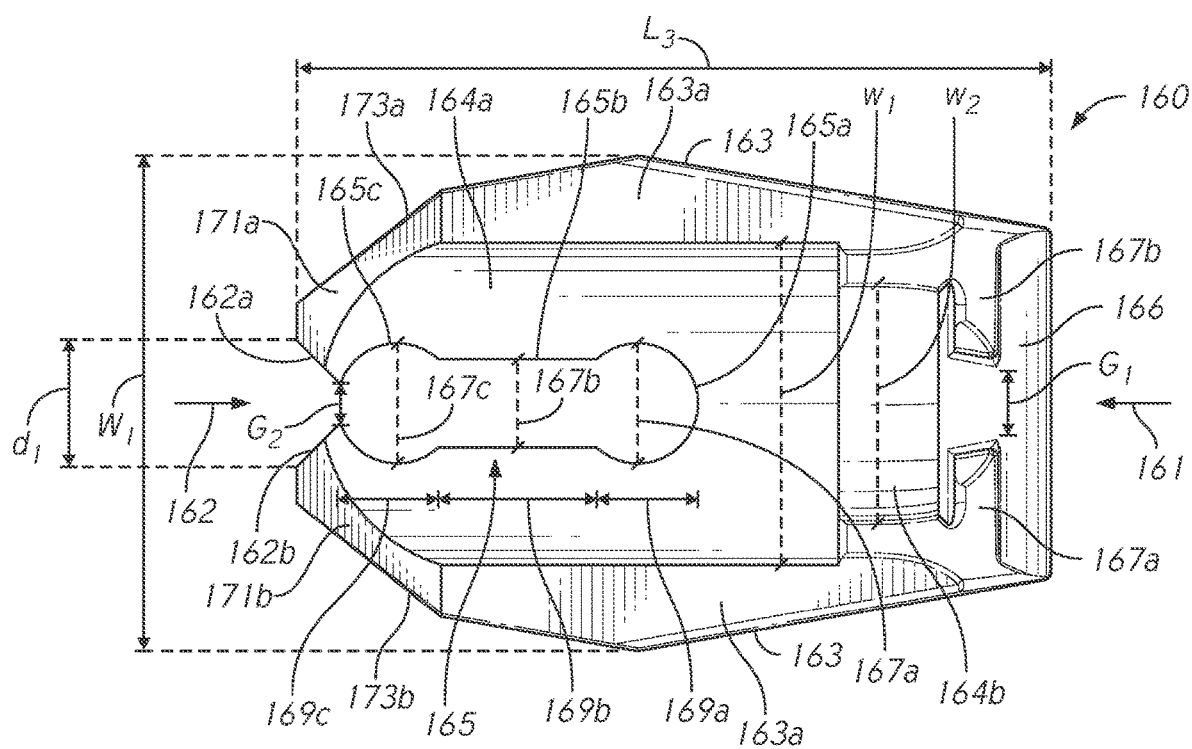
FIG. 5C illustrates a top view of the limiter of FIG. 5A.

As discussed above, the fluid transfer device 100 can include a limiter 160. FIGS. 5A-5C illustrate various views of an embodiment of the limiter 160. As shown and described with respect to FIGS. 6A-7B in more detail below, the limiter 160 can secure to a portion of the fluid transfer device 100 and can move between two positions so as to prevent or allow the valve 180 from moving (for example, rotating) relative to the chamber 130 to open or close a flow path between apertures 130a, 130b and the fluid passages 150a, 152a.

With reference to FIGS. 5A-5C, the limiter 160 can include a first end 161, a second end 162 opposite the first end 161, and an opening 165 extending through and/or along a portion of the limiter 160. In some embodiments, the opening 165 is positioned closer to the second end 162 than the first end 161. The opening 165 can be aligned with an axis extending through a center of the limiter 160 along a length thereof. In some embodiments, the opening 165 extends from the second end 162 towards the first end 161. The opening 165 can be sized and/or shaped to receive and/or secure to a portion of the fluid transfer device 100. For example, the opening 165 can be sized and/or shaped to receive and/or secure to one or more of the stems 132, 134. In some embodiments, the opening 165 is defined by one or more portions having different sizes and/or shapes. For example, as shown in FIGS. 5A-5C, the opening 165 can include a first portion 165a, a second portion 165b, and a third portion 165c. The first portion 165a and the third portion 165c of the opening 165 can be sized and/or shaped to receive and/or secure to stem 132, 134. In some embodiments, the first and third portions 165a, 165c are sized and/or shaped to secure to stem 132, 134 and the second portion 165b has a different size and/or shape than one or both of the first and third portions 165a, 165c. With reference to FIG. 5C, the first portion 165a of opening 165 can have a width 167a and a length 169a that matches a width and/or length of a cross-section of one or both of the stems 132, 134. Additionally or alternatively, the third portion 165c of opening 165 can have a width 167c and a length 169c that matches a width and/or length of a cross-section of one or both of the stems 132, 134. While FIG. 5C illustrates the first and third portions 165a, 165c having a partially circular shape, the shape of the first and third portions 165a, 165c is not so limited. For example, the first and third portions 165a, 165c can have an alternative shape that is similar to and/or matches a shape of a cross-section of one or both of the stems 132, 134 so as to allow the first and third portions 165a, 165c to receive and/or secure to the stems 132, 134. In some embodiments, the widths 167a, 167c are equal and/or the lengths 169a, 169c are equal. In some embodiments, the width 167a is equal to the length 169a and/or the width 167c is equal to the length 169c. With further reference to FIG. 5C, the second portion 165b of the opening 165 can include a width 167b and a length 169b. In some embodiments, the width 167b is smaller than one or both of widths 167a, 167c. In some embodiments, the length 169b is greater than one or more of lengths 169a, 169c. While FIG. 5C illustrates the second portion 165b of opening 165 having a rectangular shape, the shape of the second portion 165b is not so limited. As shown, a first end of opening 165 (which can be defined by portion 165c) can be positioned at or near end 162 of limiter 160 and a second end of opening 165 (which can be defined by portion 165a) can be spaced from end 161 of limiter 160.

As previously discussed, in some embodiments, the opening 165 can extend from the second end 162 inward towards the first end 161. As shown in FIGS. 5B-5C, the second end 162 can include tapered surfaces 162a, 162b near an end of the opening 165, for example, near the third portion 165c of the opening 165. A plane of the tapered surfaces 162a, 162b can be angled relative to the opening 165 or a length or width of the opening 165. With reference to FIG. 5C, the second end 162 of the limiter 160 and the tapered surfaces 162a, 162b can define a gap $G_2$ near the opening 165, for example, near the third portion 165c of opening 165. In some embodiments, the gap $G_2$ is smaller than a cross-sectional dimension (for example, a width) of the stem 132, 134. In some embodiments, the gap $G_2$ is smaller than one or more of the widths 167c, 167b, 167a. The tapered surfaces 162a, 162b can advantageously allow the stems 132, 134 to be more easily inserted within the opening 165 in order to secure the limiter 160 to the stems 132, 134. When the stems 132, 134 are inserted in such manner, contact between the stems 132, 134 and the tapered surfaces 162a, 162b can cause the limiter 160 to flex outward (for example, in "up" and/or "down" directions given the orientation shown in FIG. 5C) until the stems 132, 134 are positioned within a portion of the opening 165 (for example, the third portion 165c of the opening 165). Additionally, where the gap $G_2$ is smaller than a width of the stem 132, 134, the stem 132, 134 can be restricted or inhibited from moving out of the opening 165. Additionally, in some embodiments where the gap $G_2$ is smaller than, for example, width 167b, it can be easier for the stem 132, 134 to move further within the opening 165 in a direction toward the first end 161 than for the stem 132, 134 to move out of the opening 165 in a direction toward the second end 162.

As discussed above, the first portion 165a and the third portion 165c can be sized and/or shaped to match a size and/or shape of the stem 132, 134. The stem 132, 134 can be moved within opening 165 from the third portion 165c to the first portion 165a and vice versa. Where the opening 165 includes a second portion 165b, the stem 132, 134 can pass through the second portion 165b when moving between the first and third portions 165a, 165c. As discussed above, the second portion 165b can have a different shape than the first portion 165a, third portion 165c, and/or the stem 132, 134. For example, the second portion 165b can have a width 167b that is smaller than widths 167a, 167c and/or a width of stems 132, 134. In such embodiments, when the stem 132, 134 moves from the third portion 165c to the first portion 165a (or vice versa), stem 132, 134 contacts portions of the second portion 165b and causes the limiter 160 to flex outward (for example, in "up" and "down" directions given the orientation shown in FIG. 5C). Once the stem 132, 134 passes through the length 169b of the second portion 165b into one of the first or third portions 165a, 165c, the limiter 160 can reset back to its un-flexed position (which may also be referred to as a "neutral position). In some implementations, the limiter 160 is in the flexed position when the stem 132 or stem 134 is positioned in the second portion 165b and is in an un-flexed position when the stem 132 or stem 134 is positioned in one of first and third portions 165a, 165c. In some embodiments, the limiter 160 provides a tactile and/or audible indication when the stem 132, 134 transitions through the second portion 165b into the first or third portions 165a, 165c. In some embodiments, the securement of the stem 132, 134 into the first or third portions 165a, 165c is a snap-fit securement.

FIGS. 6A-6B illustrate views of the limiter 160 secured to the stem 134 in a first position, while FIGS. 7A-7B illustrate views of the limiter 160 secured to the stem 134 in a second position. When the limiter 160 is in the first position shown in FIGS. 6A-6B, the third portion 165c of the opening 165 of the limiter 160 is secured to the stem 134. When the limiter 160 is in the second position shown in FIGS. 7A-7B, the first portion 165a of the opening 165 of the limiter 160 is secured to the stem 134. The limiter 160 can be moveable from such first position to such second position and vice versa. As illustrated, when the limiter 160 is in the first position (FIGS. 6A-6B), the limiter 160 can inhibit the valve 180 from moving with respect to the chamber 130. For example, in some embodiments, the limiter 160 inhibits (for example, prevents) the valve 180 from rotating with respect to and/or within the chamber 130 when the limiter 160 is in the first position. In embodiments where the valve 180 includes a handle 184 (for example, defined by one or more of wings 184a, 184b), the limiter 160 can interfere with or block the handle 184 to prevent rotation of the valve 180 within the chamber 130 when the limiter 160 is in the first position.

As illustrated in FIGS. 7A-7B, when the limiter 160 is in the second position, the limiter 160 can allow the valve 180 to move (for example, rotate) with respect to the chamber 130. In some embodiments, when the limiter 160 is in the second position, the limiter 160 does not block the valve 180 from moving (for example, rotating) with respect to the chamber 130. In some embodiments, when the limiter 160 is in the second position and where the valve 180 includes a handle 184 (for example, defined by one or more of wings 184a, 184b), the limiter 160 does not block the handle 184 when the handle 184 rotates with respect to the chamber 130.

With continued reference to FIGS. 5A-5C, the limiter 160 can include a recessed portion 164a that is recessed from a top surface 163a of the limiter 160. The recessed portion 164a can have a width $w_1$ between sidewalls 163. In some embodiments, the recessed portion 164a includes the opening 165 (discussed above). The recessed portion 164a can extend along a portion of a length $L_3$ of the limiter 160. In some embodiments, the recessed portion 164a extends from or near the second end 162 of the limiter 160 and extends toward the first end 161. In some embodiments, the recessed portion 164a is sized and/or shaped to conform to at least a portion of a size and/or shape of the chamber 130 of the fluid transfer device 100. Such configuration can advantageously allow the recessed portion 164a and the sidewalls 163 of the limiter 160 to facilitate alignment of the limiter 160 relative to at least the stem 134 and the chamber 130 when the limiter 160 is secured to the stem 134 in the first position (via the third portion 165c), in the second position (via the first portion 165a), and when the limiter 160 is moved between these positions (for example, where the stem 134 is inserted through the second portion 165b of the opening 165). As shown in at least FIGS. 6A-7B, when the limiter 160 is secured to the stem 134, the sidewalls 163 can extend around at least a portion of an outer surface of the chamber 130. With reference to FIGS. 5A-5C and at least FIGS. 7A-7B, where the chamber 130 has a cylindrical shape, the recessed portion 164a can have a curvature and/or shape that matches at least a portion of an outer surface of such cylindrical shape. In some embodiments, the recessed portion 164a has a radius of curvature that matches a radius of curvature of the chamber 130. For example, in some embodiments, the recessed portion 164a has a radius of curvature that matches a radius of curvature of at least a portion of an outer surface and/or perimeter of the chamber 130.

As also shown in FIGS. 5A-5C, the limiter 160 can include a recessed portion 164b that is recessed from the top surface 163a of the limiter 160. The recessed portion 164b can have a width $w_2$ extending along a portion of the width $W_1$ of the limiter 160 between the sidewalls 163. In some embodiments, the width $w_2$ of the recessed portion 164b is smaller than the width $w_1$ of the recessed portion 164a and/or a width of the chamber 130. In some embodiments, when the limiter 160 is in the second position (FIGS. 7A-7B), the chamber 130 (or an end thereof) can contact an inner wall 164c (which may be referred to as a "ledge") defined by the different widths $w_1$, $w_2$ of the recessed portions 164a, 164b (see FIG. 5B). In some embodiments, the recessed portion 164b is sized and/or shaped to conform to a size and/or shape of at least a portion of the valve 180 (for example, a portion of the body 182 of the valve 180 proximate the handle 184). In some embodiments, the recessed portion 164b has a curvature that matches a shape of at least a portion of the body 182 of the valve 180 proximate the handle 184. In some embodiments, the recessed portion 164b has a radius of curvature that is smaller than a radius of curvature of the recessed portion 164a.

With continued reference to FIGS. 5A-5C, the limiter 160 can include a region 166 at or near the first end 161 that is beveled or chamfered (partially beveled). The region 166 can extend between the sidewalls 163 of the limiter 160 along the width $W_1$ of the limiter 160. As shown, the region 166 can be curved. In some embodiments, as shown in FIG. 5A, the region 166 has a curved chamfer extending between the sidewalls 163 of the limiter 160. The beveled or chamfered region 166 can advantageously be sized and/or shaped to accommodate a size and/or shape of a portion of the valve 180 to facilitate movement of the valve 180 with respect to the chamber 130 and allow the valve 180 to open and/or close a flow path of the fluid transfer device 100 (as discussed above). For example, with reference to FIGS. 7A-7B, when the limiter 160 is in the second position, the beveled or chamfered region 166 can be sized and/or shaped to accommodate a size and/or shape of a handle 184 (or a portion of the handle 184) of the valve 180 so that the handle 184 can pass at least partially through a space defined above and/or by the region 166 when the valve 180 rotates within the chamber 130. In some embodiments, when the valve 180 rotates within the chamber 130, the handle 184 (which can be defined by one or more wings 184a, 184b) passes through the space defined by the region 166 and does not contact the region 166.

In some embodiments, the limiter 160 includes one or more protrusions 166a, 166b extending from the region 166. The protrusions 166a, 166b can extend outward from the region 166 and extend along a portion of a width of the region 166 between the sidewalls 163. In some embodiments, the limiter 160 includes one of protrusion 166a or protrusion 166b. In some embodiments, the limiter 160 includes a protrusion 166a and a protrusion 166b. In some embodiments, the protrusion(s) 166a, 166b is/are rounded. The protrusion(s) 166a, 166b can be smooth or alternatively, rough. In some embodiments, the limiter 160 includes both of the protrusions 166a, 166b extending from or near opposite sidewalls 163 and toward each other and/or toward a center of the width $W_1$ of the limiter 160. The protrusions 166a and 166b can have the same or different widths or lengths. In some embodiments, ends of the protrusions 166a, 166b are spaced apart by a gap $G_1$ (see FIG. 5C).

As discussed above, when the limiter 160 is in the second position (FIGS. 7A-7B), the valve 180 can be moved (for example, rotated) relative to the chamber 130. In some embodiments in which the limiter 160 includes the protrusions 166a, 166b, the protrusions 166a, 166b can provide tactile feedback to a user when the valve 180 is moved between open and closed positions. For example, with reference to FIGS. 2C, 6A, and 7A, when the valve 180 is rotated from the first position (FIG. 6A) to the second position (FIG. 7A) (whether "clockwise" or "counter-clockwise"), a portion of the valve 180 (for example, the handle 184 or wing 184a, 184b) can contact the protrusion 166a, 166b. Such contact can partially inhibit the rotation of the valve 180 from the first position to the second position. Advantageously, such contact can indicate to a user that the valve 180 is transitioning from the first position (where the valve 180 blocks a flow path between fluid passages 150a, 152a) to the second position (where the valve does not block such flow path). Thus, in some embodiments, the protrusion(s) 166a, 166b can inhibit, but not prevent, the valve 180 from rotating from the first position to the second position. This can in turn reduce the risk of unintentional rotation of the valve 180 between the two positions.

As discussed previously, the limiter 160 can include two protrusions 166a, 166b having ends which are spaced apart from one another by a gap $G_1$, as shown in FIG. 5C. Such gap $G_1$ can help define the second position of the valve 180 (where the valve 180 does not block the flow path between fluid passages 150a, 152a). For example, gap $G_1$ can be sized and/or shaped to accommodate a portion of the valve 180 such that, when the valve 180 is in the second position, the portion of the valve 180 is positioned within the gap $G_1$. For example, in some embodiments, the valve 180 includes a handle 184, and a portion of the handle 184 is sized and/or shaped to fit within gap $G_1$ (see FIG. 7A). When the valve 180 is rotated from the first position to the second position, the handle 184 (or a wing 184a, 184b defining the handle 184) can slidably engage the protrusion 166a, 166b, and slide and/or snap into the space defined by the gap $G_1$. Such sliding or snapping into the space defined by the gap $G_1$ can provide a tactile and/or audible indication to a user that the valve 180 has transitioned to the second position. With reference to FIGS. 5A-5B, in some embodiments, the protrusion(s) 166a, 166b include notched portions 166c, 166d along a top surface of the protrusion(s) 166a, 166b at or near ends thereof. Such notches portions 166c, 166d can advantageously allow portions of the valve 180 (such as portions of the handle 184) to transition into and/or out of the space defined by the gap $G_1$. In some embodiments, Gap $G_1$ is greater than or equal to gap $G_2$. In some embodiments, gap $G_1$ is less than or equal to any of widths 167a, 167b, 167c, $w_1$, and/or $w_2$.

As shown in at least FIGS. 2C, 4A, 6A, and 7A, the valve 180 (for example, the handle 184) can include one or more indicators 187 which can help with positioning and/or alignment of the valve 180 within gap $G_1$. In some embodiments, the one or more indicators 187 are aligned with one another and/or extend in a direction that is parallel to an axis extending through opening 190 of valve 180 (see FIGS. 4A-4B). In some embodiments, the one or more indicators 187 are positioned along wings 184a, 184b of the handle 184 of the valve 180. In some embodiments, the one or more indicators 187 are arrows.

With reference to FIGS. 5A-5B, the limiter 160 can include a tab 168 (which may also be referred to as a "stop") at the first end 161. The tab 168 can extend non-parallel (for example, perpendicular) with respect to the width $W_1$ and/or length $L_3$ of the limiter 160 (for example, perpendicular to a plane defined along such width $W_1$ and/or length $L_3$). The tab 168 can have a width extending along a portion of the width $W_1$ of the limiter 160. As discussed above, the limiter 160 can be moveable between a first position (FIGS. 6A-6B) and a second position (FIGS. 7A-7B). When the limiter 160 is in the first position (see FIG. 6B), the tab 168 can be spaced from an arm of the fluid transfer device 100 (for example, the guide arm 142). When the limiter 160 is in the second position (see FIG. 7B), the tab 168 can be proximate to and/or contacting an arm of the fluid transfer device 100 (such as the guide arm 142). The tab 168 can be closer to an arm of the fluid transfer device 100 when the limiter 160 is in the second position than when the limiter 160 is in the first position. Accordingly, the tab 168 can provide an indication that the limiter 160 is in the second position. Additionally, the tab 168 can prevent the limiter 160 from moving beyond the second position, for example, in a direction to the "left" as illustrated in the orientation shown in FIGS. 6B and 7B. By engaging the guide arm 142 (or a different arm of adapter 110), the tab 168 can also reduce stress to the limiter 160 proximate the first portion 165a of the opening 165 which may result if excessive force is applied to the first portion 165a from the stem 134 (for example, in the "left" direction mentioned above).

With reference to FIGS. 6B and 7B, in some embodiments, the limiter 160 can provide an indication that the fluid transfer device 100 has been used, for example, that the valve 180 has been moved to open and/or close the flow path between the fluid passages 150a, 150b. For example, the limiter 160 positioned in the second position (FIG. 7B) can indicate that the limiter 160 has been moved and, potentially, that the valve 180 has been moved to open the flow path between the fluid passages 150a, 152a. The limiter's 160 positioning can thus advantageously provide evidence of "tampering" by a user with the fluid transfer device 100. In some embodiments, a greater force is required to transition the limiter 160 from the second position (FIG. 7B) to the first position (FIG. 6B) than from the first position (FIG. 6B) to the second position (FIG. 7B). This can minimize the risk of hiding evidence that the fluid transfer device 100 has been used or tampered with (for example, that the valve 180 has been moved between open and closed positions). As shown in FIGS. 5A-5C, the second end 162 of the limiter 160 can be beveled or chamfered (partially beveled) as represented by surfaces 171a, 171b of the second end 162. For example, surfaces 171a, 171b can be angled and/or tapered with respect to the top surface 163a of the limiter 160. Additionally, the sidewalls 163 can be angled at the second end 162 as represented by angled portions 173a, 173b (see FIGS. 5A-5B). Such surfaces 171a, 171b and angled portions 173a, 173b can inhibit a user's ability to move the limiter 160 from the second position (FIG. 7B) to the first position (FIG. 6B). For example, with reference to the back view of the fluid transfer device 100 shown in FIG. 2D, the surfaces 171a, 171b and/or the angled portions 173a, 173b can reduce a user's ability to contact and/or push the second end 162 of the limiter 160 to move the limiter 160 from the second position to the first position. This can also minimize the risk of hiding evidence that the fluid transfer device 100 has been used or tampered with (for example, that the valve 180 has been moved between open and closed positions).

Figure 8A:
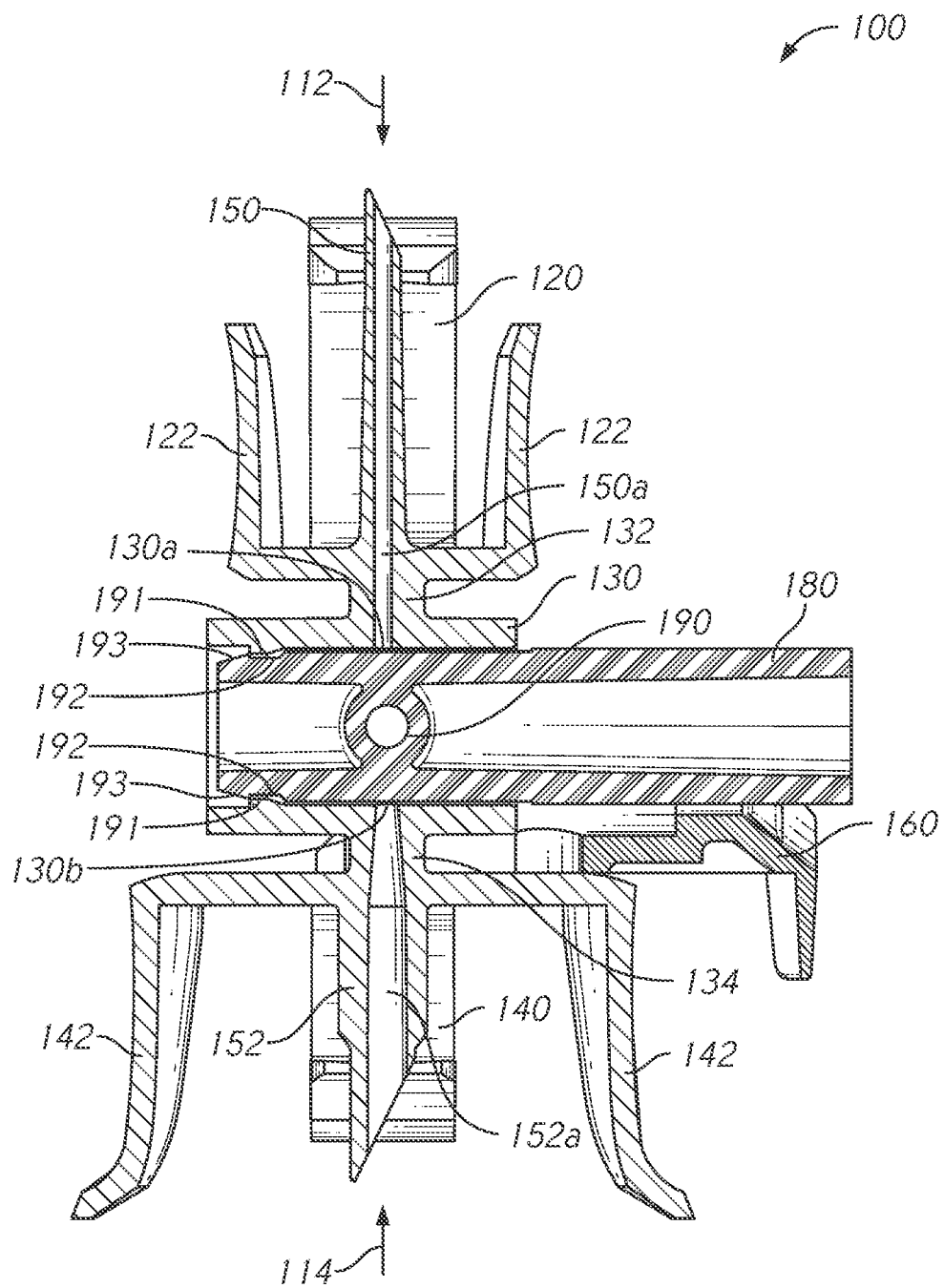
FIG. 8A illustrates a cross-section taken through the fluid transfer device as shown in FIG. 2E in which the valve is in a closed position in accordance with aspects of this disclosure.
Figure 8B:
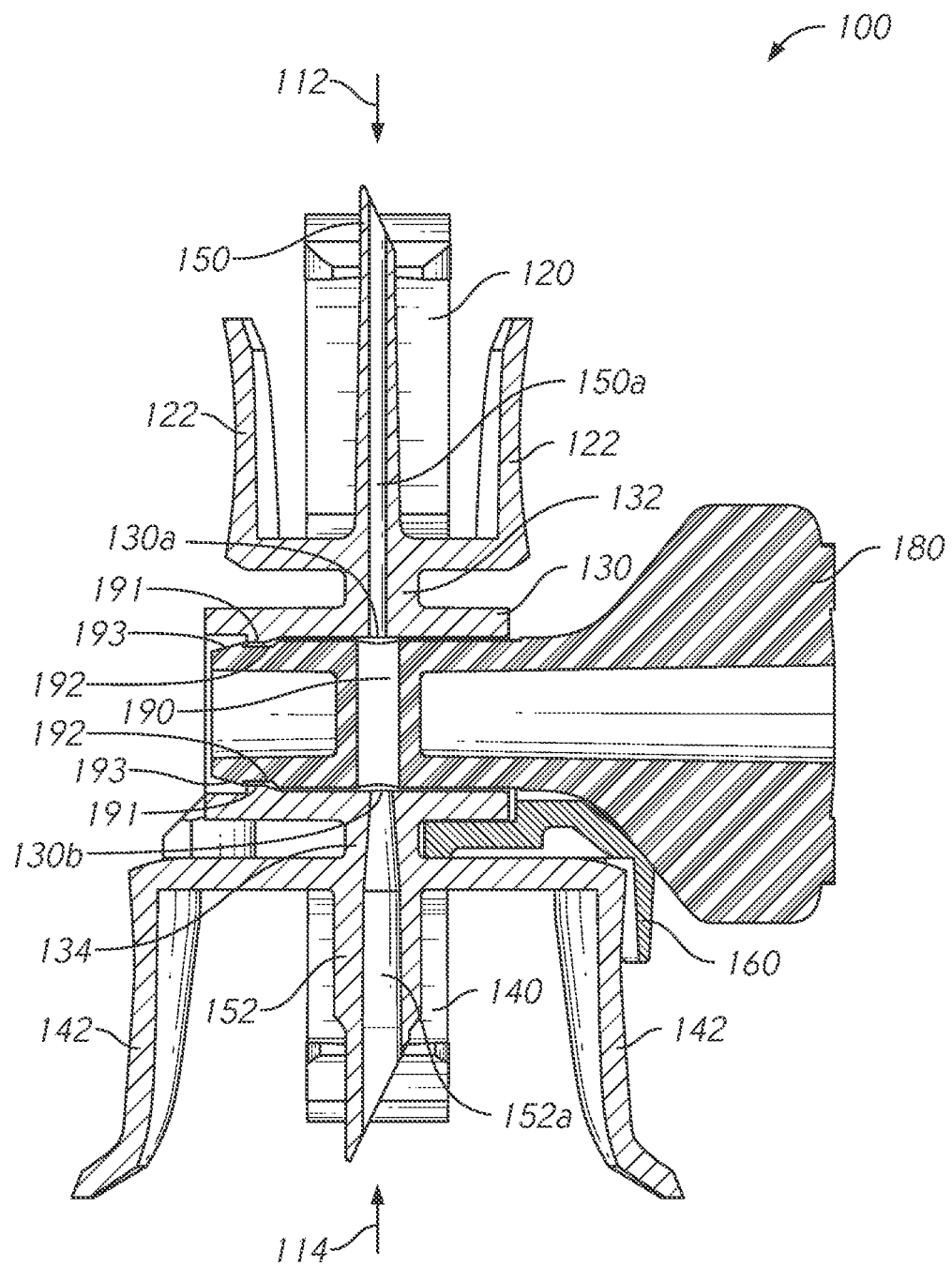
FIG. 8B illustrates the cross-section through the fluid transfer device as shown in FIG. 8A in which the valve is in an open position in accordance with aspects of this disclosure.

FIGS. 8A-8B illustrate an example of how valve 180 can be moved and/or positioned within the chamber 130 to allow a flow path between the first and second apertures 130a, 130b and/or the fluid passages 150a, 152a 152 to be open and/or closed. Specifically, FIGS. 8A-8B illustrate cross-sections through the fluid transfer device 100 along line A'-A' of FIG. 2E when the limiter 160 is in the first position (FIGS. 6A-6B) and the second position (FIGS. 7A-7B) respectively.

FIG. 8A illustrates valve 180 in a first position or configuration where the opening 190 of valve 180 is not aligned (and/or not at least partially aligned) with either of the first and second apertures 130a, 130b of chamber 130. Portions of the body 182 of the valve 180 block the first and second apertures 130a, 130b of chamber 130, and in turn, block fluid communication between the fluid passages 150a, 152a. In such configuration, the fluid transfer device 100 can prevent fluid communication between a source container (for example, a vial) connected to end 114 and an intermediate container (for example, an IV bag) connected to end 112.

FIG. 8B illustrates valve 180 in a second position or configuration where the opening 190 of the valve 180 is aligned with both of the first and second apertures 130a, 130b of chamber 130. In such configuration, the valve 180 permits fluid to flow between the first and second apertures 130a, 130b, and in turn, between the fluid passages 150a, 152a. Further, in such configuration, when the first and second ends 112, 114 are connected to an intermediate container and a source container and the projections 150, 152 are located within interiors of the intermediate container and source container, the intermediate and source containers are in fluid communication with each other.

With continued reference to FIGS. 8A-8B, in some embodiments, the projection 150 has a smaller cross-sectional area than the projection 152. In some embodiments, the projection 150 has a greater cross-sectional area than the projection 152. In some embodiments, the projections 150, 152 have cross-sectional areas that are equal. In some embodiments, the projection 152 is has a smaller length than the projection 150. In some embodiments, the projection 152 is has a greater length than the projection 150. In some embodiments, the projections 150, 152 have an equal length. In some embodiments, fluid passageway 152a includes a first portion extending through and/or along a length of projection 152 and a second portion extending through base 149, stem 134, and chamber 130 to aperture 130b, and such second portion has a cross-section that tapers from the base 149 to the aperture 130b (see FIG. 8B).

While FIGS. 2A-2D and 6A-7B illustrate the limiter 160 secured to stem 134, the fluid transfer device 100 can include an additional or alternative limiter, similar to limiter 160, that is configured to secure to stem 132 in a similar manner. Such additional or alternative limiter can be identical to limiter 160 except that it is sized and/or shaped so that it has a tab (similar to tab 168) that contacts arm 122.

As shown in at least FIGS. 2C-2D, and 2G, in some embodiments the stem 132 includes one or more protrusions 138a, 138b which extend outward from an outer surface of the stem 132. The one or more protrusions 138a, 138b can prevent or inhibit the limiter 160 from securing to the stem 132. For example, where the stem 132 includes a protrusion 138a or 138b and a user attempts to insert the stem 132 into opening 165 of the limiter 160, the protrusion 138a or 138b can block or interfere with the second end 162 of the limiter 160 and prevent the limiter 160 from flexing around the stem 132. With reference to FIGS. 2C-2D, the stem 132 can include a first protrusion 138a and a second protrusion 138b extending from an outer surface of the stem 132. In some embodiments, a combined width (extending in the "left" and "right" directions in the orientation shown in FIGS. 2C-2D) of the protrusion 138a and/or 138b and stem 132 is greater than a distance $d^1$ between ends of the tapered surfaces 162a, 162b (see FIG. 5C). Such configuration can prevent the second end 162 of the limiter 160 from securing and/or flexing around the stem 132. In some embodiments, the protrusion(s) 138a, 138b are walls. In some embodiments in which the stem 132 includes both of the protrusions 138a, 138b, the protrusions 138a, 138b can extend from the stem 132 in opposite directions. In some embodiments, the protrusions 138a, 138b extend from the stem 132 in opposite directions in the same plane.

As shown in at least FIGS. 6B and 7B, in some embodiments, a size and/or shape of the base 139 is smaller than a size and/or shape of base 149, and/or a distance between arms 122 is less than a distance between arms 142. In such embodiments, in order for the tab 168 of the limiter 160 to contact an arm 122 or arm 142 when the limiter 160 is in the second position, a distance between the tab 168 and the first portion 165a of opening 165 can be dimensioned to match a distance between the arm 122 and the stem 132 or a distance between the arm 142 and the stem 134. For example, where the limiter 160 is dimensioned to accommodate a distance between the arm 142 and the stem 134 such that the tab 168 contacts the arm 142 when in the second position (FIG. 7B), it may be desirable to include one or both of protrusion(s) 138a, 138b in order to provide an indication to a user that the limiter 160 is intended to be attached to the adapter 110 around the stem 134 as opposed to stem 132. This can advantageously aid in assembly of the fluid transfer device 100.

Figure 9A:
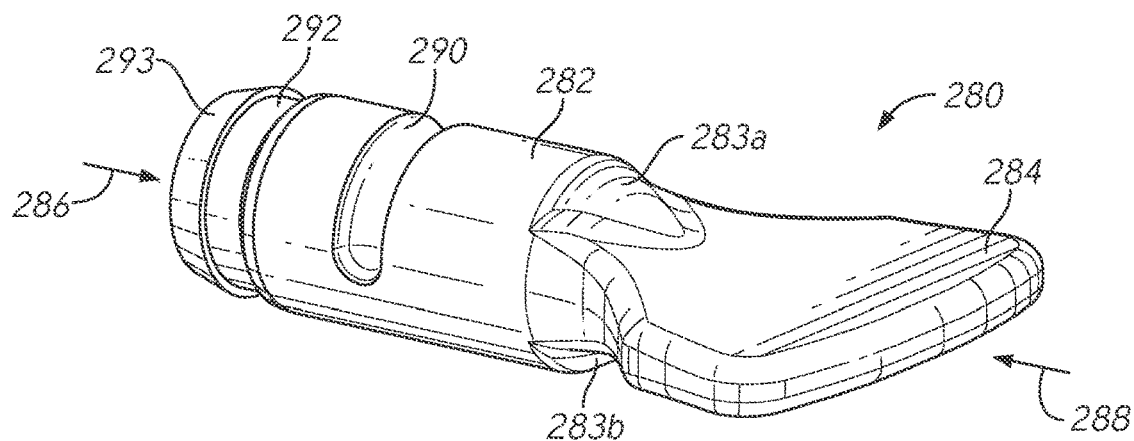
FIG. 9A illustrates a perspective view of another embodiment of a valve in accordance with aspects of this disclosure.
Figure 9B:
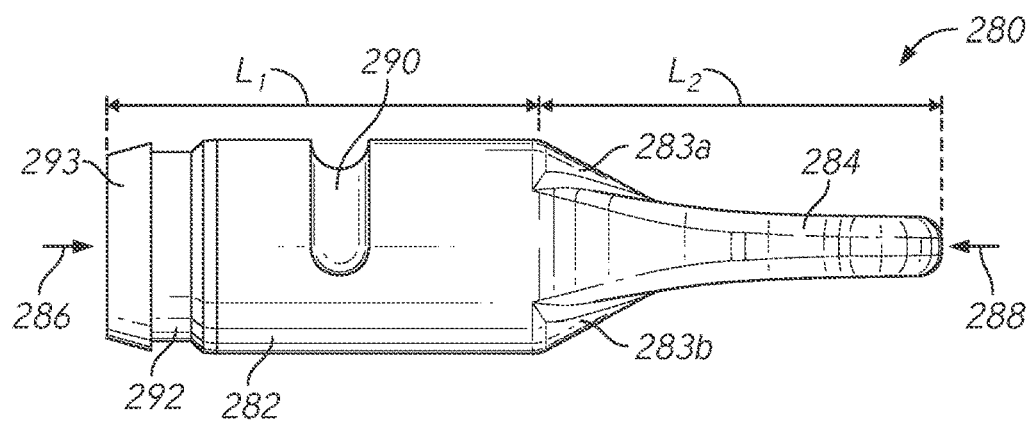
FIG. 9B illustrates a side view of the valve of FIG. 9A.
Figure 9C:
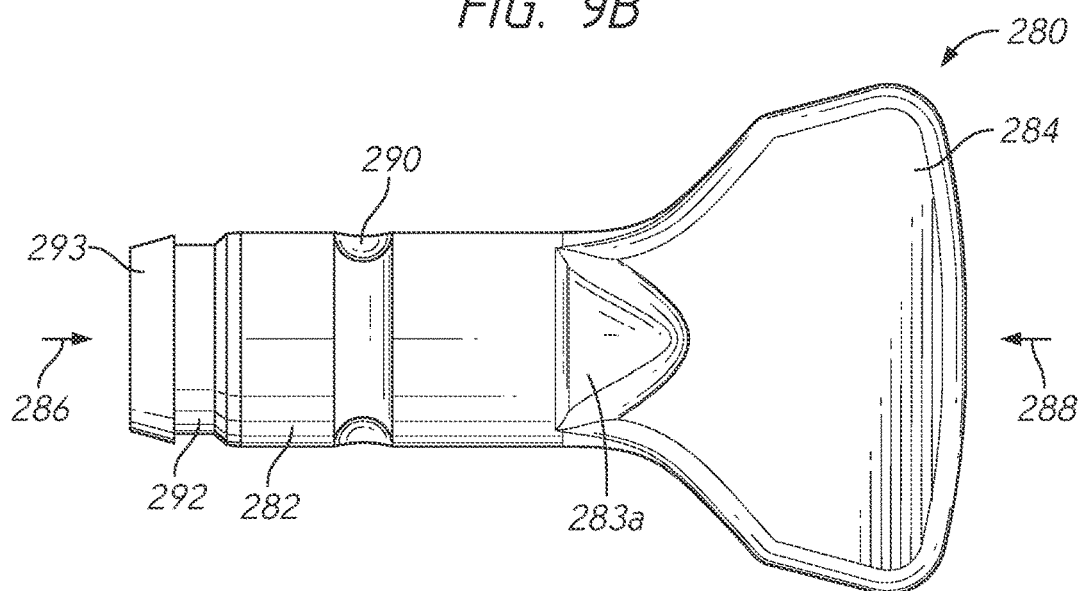
FIG. 9C illustrates a top view of the valve of FIG. 9A.

FIGS. 9A-9C illustrate another embodiment of a valve 280. The valve 280 can be similar to the valve 180 in some or many respects. The valve 280 can include a first end 288, a second end 286 opposite the first end 288, a body 282, a tapered portion 293 proximate the second end 286, and a recessed portion 292. The tapered portion 293 and recessed portion 292 can be identical to the tapered portion 193 and recessed portion 192 of valve 180. The valve 280 can include a recess 290 extending along a portion of the perimeter of the body 282. In some embodiments, the recess 290 extends around only a portion of the perimeter and/or outer surface of the body 282. The recess 290 can extend along the perimeter of the body 282 from a first end of the recess 290 to a second end of the recess 290. The first end of the recess 290 can be spaced from the second end of the recess 290 so that the ends are spaced from each other along the perimeter of the body 282. The valve 280 can be positioned within and secured to the chamber 130 in a similar manner as the valve 180 (for example, via positioning of the inner rim 191 of the chamber 130 inside the recessed portion 292 proximate an end of the tapered portion 293). Additionally, the valve 280 can be moved (for example, rotated) relative to the chamber 130 such that the recess 290 is positioned adjacent to one or both of the first and second apertures 130a, 130b of the chamber 130. For example, the valve 280 can be rotated such that the recess 290 is adjacent the first aperture 130a and the second aperture 130b. When the recess 290 (for example, first and second ends thereof) is positioned adjacent to both of the first and second apertures 130a, 130b, a flow path between the first and second apertures 130a, 130b is open. Further, in such configuration of the valve 280, the fluid passages 150a, 150b are in fluid communication with each other. In contrast, when the valve 280 is positioned such that at least one of the first and second apertures 130a, 130b is covered and/or blocked by a portion of the body 282, the flow path between the first and second apertures 130a, 130b is closed, thus preventing fluid communication between the fluid passages 150a, 150b. In some embodiments, valve 280 is a stopcock.

The discussion above with reference to the first and second positions of the limiter 160, the first and second positions of the valve 180, and (at least) FIGS. 6A-7B is similarly applicable to valve 280. For example, the valve 280 (or a handle 284 thereof) can interact with the chamber 130 and the limiter 160 (or portions thereof) in a similar manner as that described above with reference to the valve 180.

As shown in FIGS. 9A-9C, the valve 280 can include a body 282 and a handle 284. With reference to FIG. 9B, a cross-section of the valve 280 can transition from a cross-section of the body 282 to a cross-section of the handle 284 at transition regions 283a, 283b. The transition regions 283a, 283b can reduce stress concentrations that may otherwise result at the interface between the cross-section of the handle 284 and the body 282. For example, where there is some level of resistance to rotation of the valve 280 within the chamber 130 (such as due to contact with the limiters or portions thereof discussed herein), the rotation of the handle 284 may cause shear and/or torsional stresses to be concentrated at the handle-body interface. The transition regions 283a, 283b, can have a cross-section that tapers from a cross-section of the body 282 to a cross-section of the handle 284. The transition regions 283a, 283b, can be conical, for example, where the body 282 has a cylindrical cross-section and the handle 284 has a cross-section that is at least partially rectangular (see FIGS. 9A-9B).

FIGS. 10A-10B illustrate how the fluid transfer device 100 can be secured to a source container, such as medical vial 155. As discussed above, the adapter 110 of the fluid transfer device 100 can include one or more latch arms 140 (such as two latch arms 140) having latch portions 143a, 143b including one or more chamfered regions 140a, 140b which facilitate a smooth transition when a vial cap 157 contacts and/or passes by the latch portions 143a, 143b (see FIG. 10A). As also discussed above, the latch portions 143a, 143b can include a recessed edge 140c that can have a curvature matching a curvature of the vial cap 157, which can also facilitate alignment of the vial cap 157 during securement. As previously discussed, the adapter 110 can include one or more guide arms 142 which can help to guide and/or align portions of the perimeter of cap 157 of vial 155 during securement.

Figure 10C:
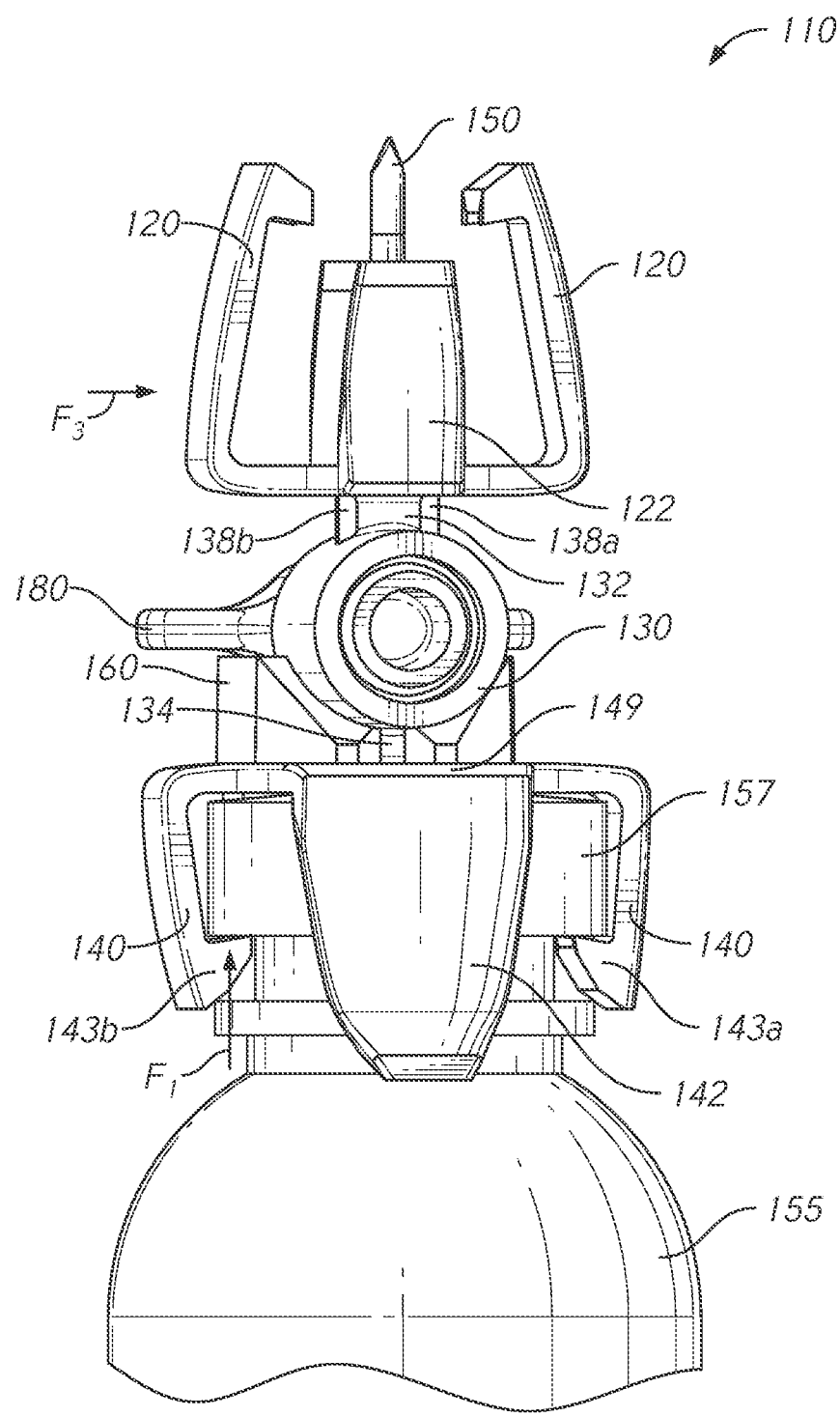
FIG. 10C illustrates the fluid transfer device of FIG. 2A secured to a medical vial and a force applied to a portion of the fluid transfer device in accordance with aspects of this disclosure.
Figure 10D:
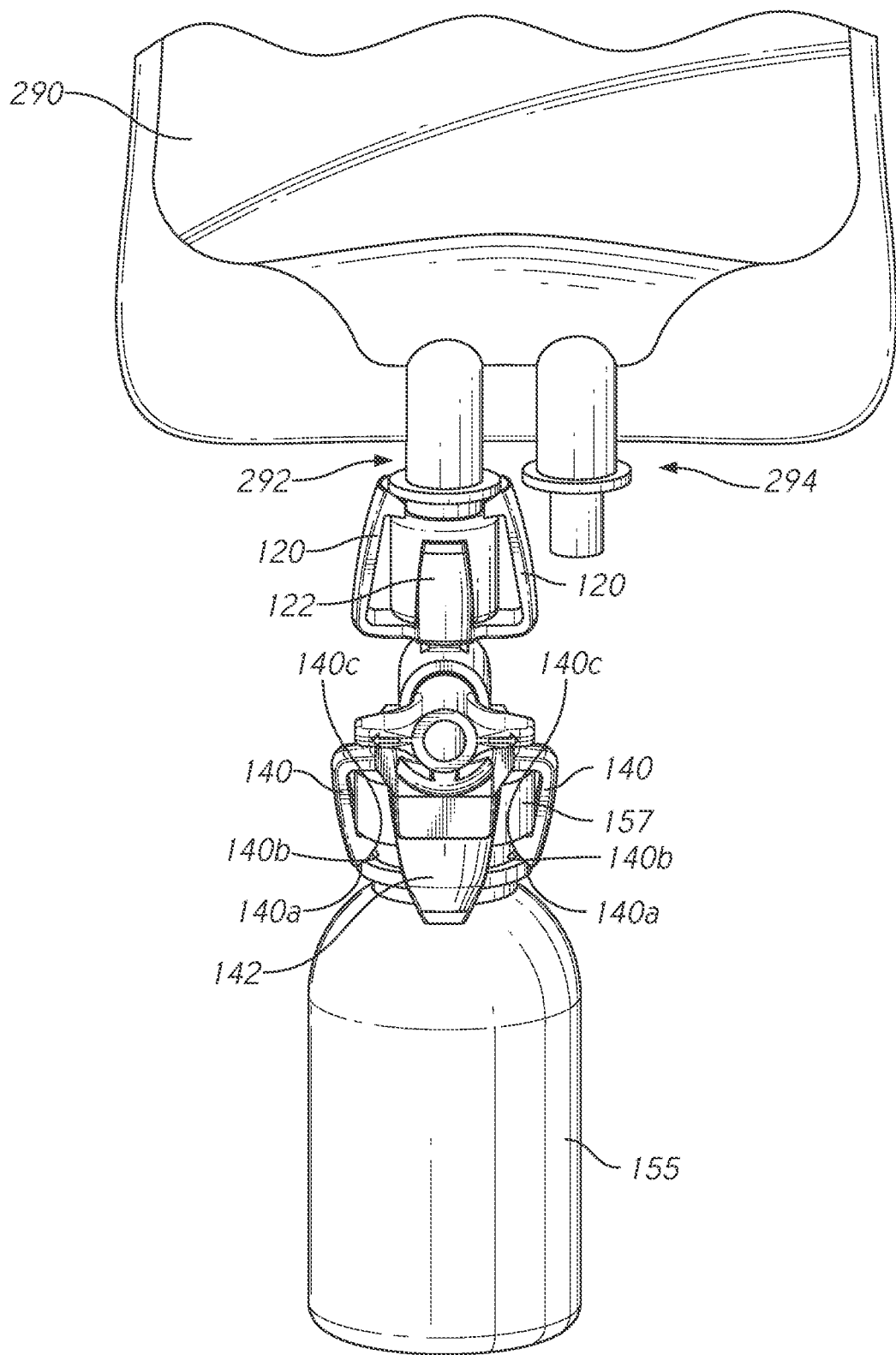
FIG. 10D illustrates the fluid transfer device of FIG. 2A secured to a portion of a medical vial and also secured to a portion of an IV fluid bag in accordance with aspects of this disclosure.

FIG. 10C illustrates behavior of the fluid transfer device 100 when forces are applied during or after securement to a source container, such as vial 155. As discussed above, the fluid transfer device 100 can be secured to a source container (such as a vial 155) via attachment of the second end 114 of the adapter 110. When a user secures the second end 114 of adapter 110 to a vial 155, the user may accidentally (or intentionally) apply various forces to the adapter 110 (or portions thereof). For example, FIG. 10C illustrates the second end 114 attached to a cap 157 of vial 155 and a force $F_1$ applied to one of the latch arms 120. Such force $F_1$ may occur when a user installs the fluid transfer device 100 on the vial 155 with one hand (and thus applies force $F_1$ with their thumb). Advantageously, portions of the fluid transfer device 100 can flex to accommodate such force $F_1$. Such flexure accommodation can be provided by the inclusion of one or both of the stems 132, 134. Moreover, such flexure accommodation of one or both of the stems 132, 134 and/or the base 149 can cause a force $F_2$ to be applied to an underside of the vial cap 157. For example, the latch portion 143b can apply such upward force $F_2$. Such resulting force $F_2$ advantageously acts to provide a stronger grip on the vial cap 157 (see FIG. 10C). In some embodiments, as the applied force $F_1$ increases, the resulting "clamping" force $F_2$ can increase proportionally. A similar scenario would result if the direction of force $F_1$ was reversed and applied to the latch arm 120 on an opposite side of the adapter 110.

Figure 10E:
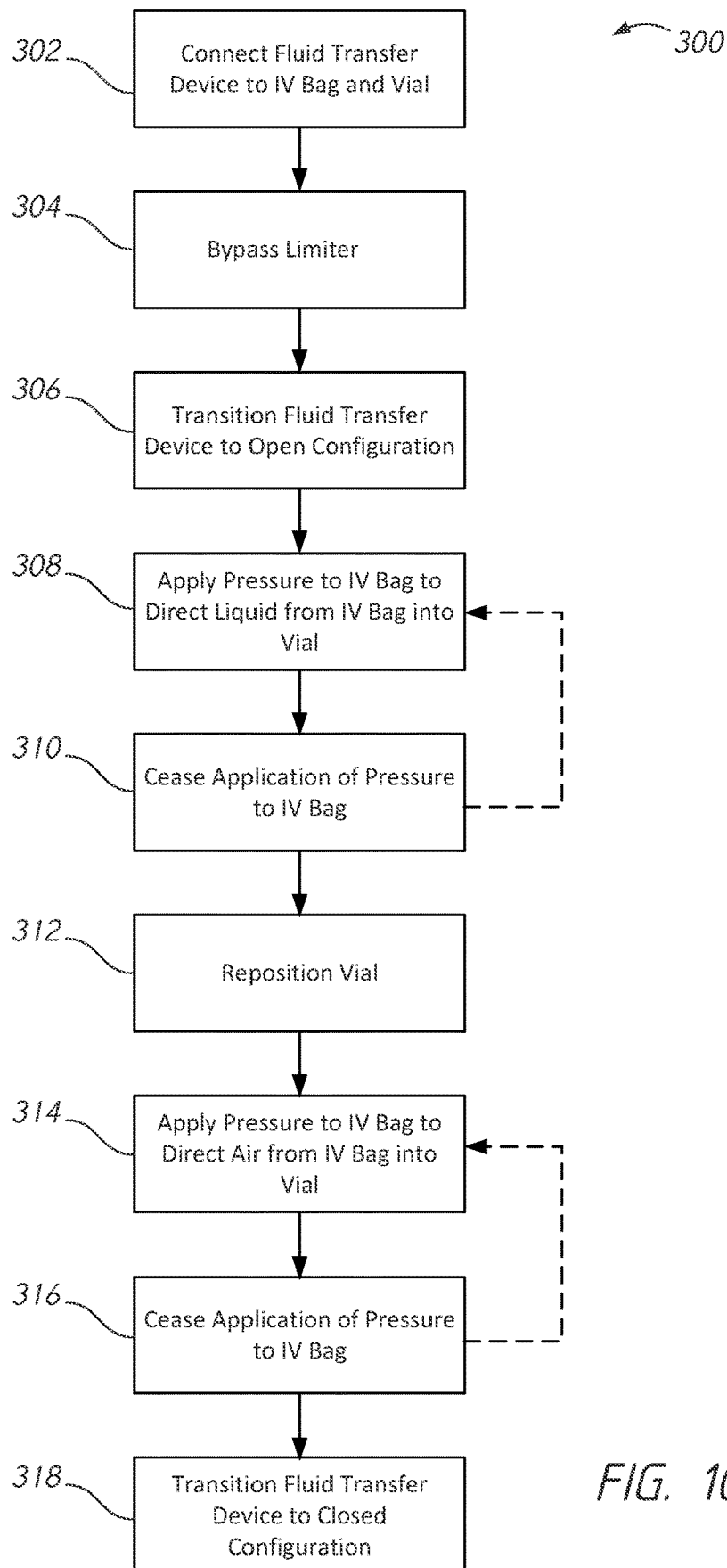
FIG. 10E illustrates a block diagram of a method of using a fluid transfer device in accordance with aspects of this disclosure.

The fluid transfer device 100 can be utilized in a variety of ways to accomplish fluid transfer between a source container and an intermediate container. FIG. 10E illustrates a block diagram of a method 300 of using the fluid transfer device 100. At step 302, the fluid transfer device 100 can be connected to a source container (for example, a medical vial) and an intermediate container (for example, an IV fluid bag). Where the fluid transfer device 100 includes a cap 177 that covers the projection 152 (see FIGS. 2B and 2G), such cap 177 can be removed, and subsequent to such removal, the second end 114 of the fluid transfer device 100 can be secured to an end or port of a medical vial, such as vial 155 (see FIGS. 10A-10D). Advantageously, the fluid transfer device 100 can additionally include a cap 175 that can cover projection 150 (see FIGS. 2B and 2G) and can provide a contact surface to aid a user in securing the second end 114 of the fluid transfer device 100 to the vial 155. Prior to or simultaneous with the securement of the second end 114 to the vial 155 (for example, in the manner discussed above), the projection 152 can penetrate a seal of the vial 155 such that the fluid passage 152a defined at least partially by the projection 152 is in fluid communication with an interior of the vial 155. Such seal of the vial 155 can be formed in the vial cap 157, for example, along an interior portion thereof, and can be penetrable by projection 152.

After the second end 114 is secured to the vial 155, the cap 175 can be removed so as to expose projection 150 and the first end 112 of the fluid transfer device 100 can be secured to a port of an IV fluid bag such as bag 290 illustrated in FIG. 10D. The IV bag 290 can include one or more ports. For example, with reference to FIG. 10D, the IV bag 290 can include a first port 292 and a second port 294, which can be spaced from the first port 292. As shown in FIG. 10D, the latch arms 120 and guide arms 122 of the fluid transfer device 100 can be secured to the first port 292 as discussed previously. While not illustrated, the second port 294 can connect to tubing (for example, an IV line) that connects to a catheter hub and/or catheter inserted into a patient's vasculature in order to provide fluid from the IV bag 290 to the patient. Such tubing is preferably connected to the second port 294 after the steps 302-318 of the method 300 are completed. Prior to or simultaneous with the securement of the first end 112 of the fluid transfer device 100 to the port 292 of the IV fluid bag 290, the projection 150 can penetrate a seal of the port 292 of the IV fluid bag 290 such that the fluid passage 150a defined at least partially by the projection 150 is in fluid communication with an interior of the IV fluid bag 290. Preferably, the fluid transfer device 100 is kept secured to the IV bag 290 until the method 300 described herein is carried out and even afterward.

With continued reference to FIGS. 10D-10E, after the fluid transfer device 100 is connected to the vial 155 and the IV fluid bag 290 (step 302), the limiter 160 can be bypassed at step 304 so as to allow the fluid transfer device 100 to be transitioned to an open configuration at step 306. The limiter 160 can be bypassed at step 304 by transitioning the limiter 160 from a first position to a second position, as described above with reference to FIGS. 6A-7B. Transitioning the limiter 160 at step 304 can allow the fluid transfer device 100 to itself be transitioned, at step 306, from a closed configuration in which fluid communication between the vial 155 and the IV bag 290 is inhibited (e.g., prevented), to an open configuration in which such fluid communication between the vial 155 and the IV bag 290 is allowed. For example, as described above, the fluid transfer device 100 can be transitioned from a closed configuration to an open configuration by movement (for example, rotation) of the valve 180, 280 within chamber 130 so as to open the flow path between the first and second apertures 130a, 130b and fluid passages 150a, 152a.

Pressure can be applied to the IV bag 290 in order to direct liquid from the IV bag 290 into the vial 155 at step 308. Such pressure can be applied to the IV bag 290 by squeezing the IV bag 290, for example. The relative position (e.g., vertical position) of the vial 155, fluid transfer device 100, and the IV bag 290 can be as illustrated in FIG. 10D during step 308 (for example, where the vial 155 is positioned vertically below the fluid transfer device 100 and the IV bag 290). At step 310, such application of pressure (e.g., squeezing) can be stopped, which can allow air within the vial 155 to move into the interior of the IV bag 290. Optionally, as illustrated in FIG. 10E, steps 308 and 310 can be repeated one or more times (such as one, two, three, four, five, six, seven, or eight or more times) in order to mix the contents of the vial 155 and the IV bag 290 as desired.

At step 312, the vial 155 can be repositioned with respect to the fluid transfer device 100 and/or the IV bag 290. For example, the vial 155, fluid transfer device 100, and the IV bag 290 can be flipped vertically such that the position and orientation of the vial 155, fluid transfer device 100, and the IV bag 290 is opposite as that shown in FIG. 10D. For example, the vial 155, fluid transfer device 100, and the IV bag 290 can be repositioned such that the vial 155 is positioned vertically above the fluid transfer device 100 and the IV bag 290.

After the vial 155 is repositioned (step 312), pressure can be applied to the IV bag 290 (e.g., by squeezing) in order to direct air from the IV bag 290 into the vial 155 at step 314. At step 316, such application of pressure (e.g., squeezing) can be stopped, which can allow liquid within the vial 155 to move into the interior of the IV bag 290. Optionally, as illustrated in FIG. 10E, steps 314 and 316 can be repeated one or more times (such as one, two, three, four, five, six, seven, or eight or more times) in order to mix the contents of the vial 155 and the IV bag 290 as desired.

At step 318, the fluid transfer device 100 can be transitioned from the open configuration, where fluid communication between the vial 155 and the IV bag 290 is allowed, to the closed configuration, where such fluid communication is inhibited (e.g., prevented). For example, as discussed above, the fluid transfer device 100 can be transitioned from the open configuration to the closed configuration by movement of the valve 180, 280 within chamber 130 so as to close the flow path between the first and second apertures 130a, 130b and fluid passages 150a, 152a. Accordingly, such transitioning of the fluid transfer device 100 to the closed configuration after steps 302-316 are completed can ensure that any additional pressure (e.g., squeezing) applied to the IV bag 290 (whether intentional or unintentional) will not cause liquid within the IV bag 290 to travel back into the vial 155. Such functionality provides a significant advantage over traditional fluid transfer devices connected to vials and IV bags in such manner where squeezing of the IV bag (whether intentional or unintentional) causes fluid to flow into the vial, resulting in waste and/or mismanagement of the fluid.

While method 300 has been described with reference to the fluid transfer device 100, such method can be employed with other fluid transfer devices, such as fluid transfer device 200 and/or 200' which are discussed in more detail below. Accordingly, while such method 300 has been described with reference to fluid transfer device 100 and/or features thereof, the method 300 is not so limited. For example, while step 304 was described above with respect to limiter 160 of fluid transfer device 100, step 304 can be equally applicable to describing limiter(s) 233a, 233b and/or stop(s) 235a, 235b of fluid transfer device 200. Accordingly, step 304 of method 300 can involve bypassing limiter(s) 233a, 233b such that the fluid transfer device 200 can be transitioned from the closed configuration to the open configuration. For example, step 304 can involve detaching, crushing, and/or otherwise bypassing limiter(s) 233a, 233b such that the fluid transfer device 200 can be transitioned from the closed configuration to the open configuration, as described in more detail below with respect to fluid transfer device 200.

Figure 11A:
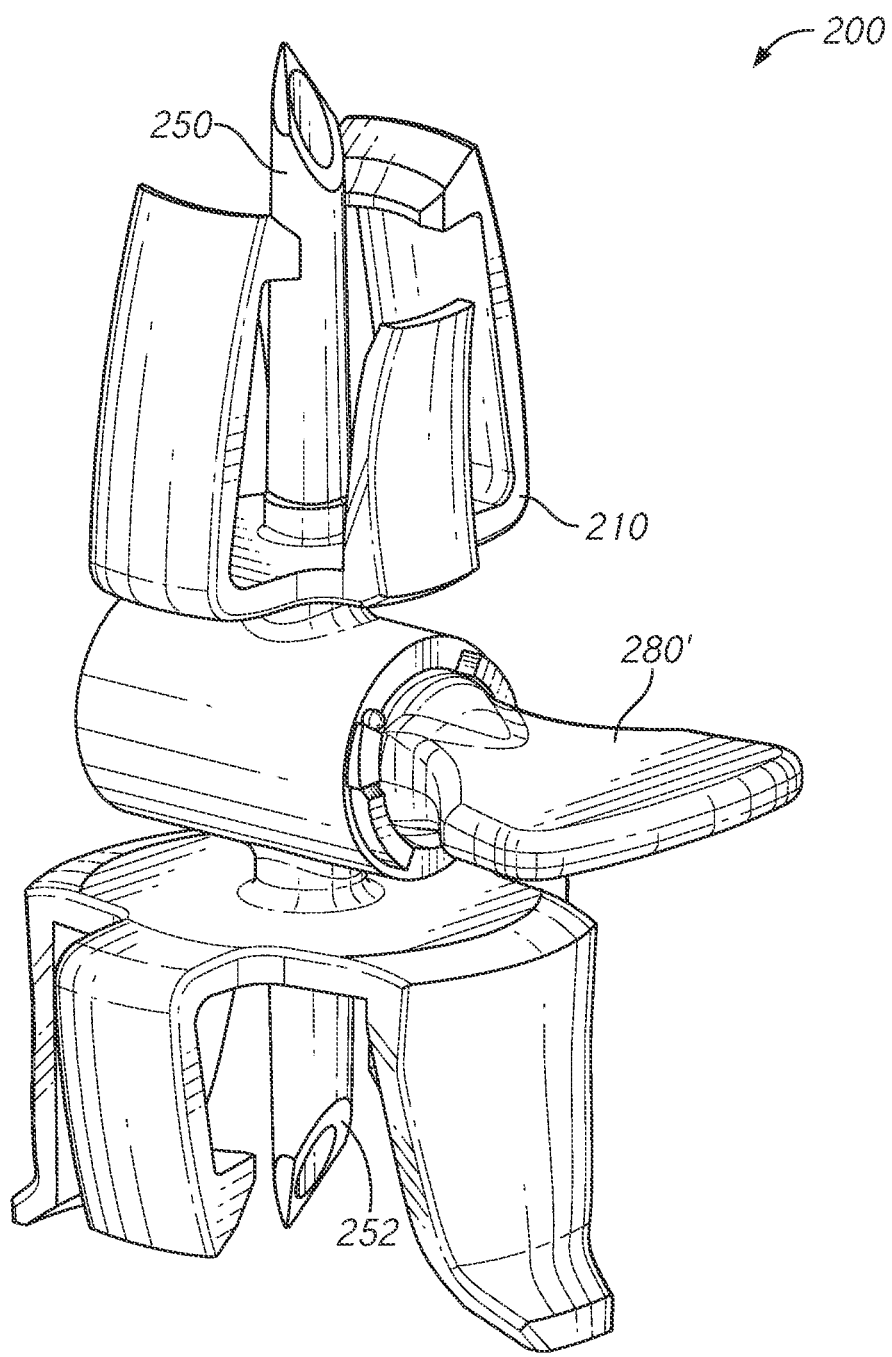
FIG. 11A illustrates another embodiment of a fluid transfer device for connecting a source container to an intermediate container in accordance with aspects of this disclosure.
Figure 11B:
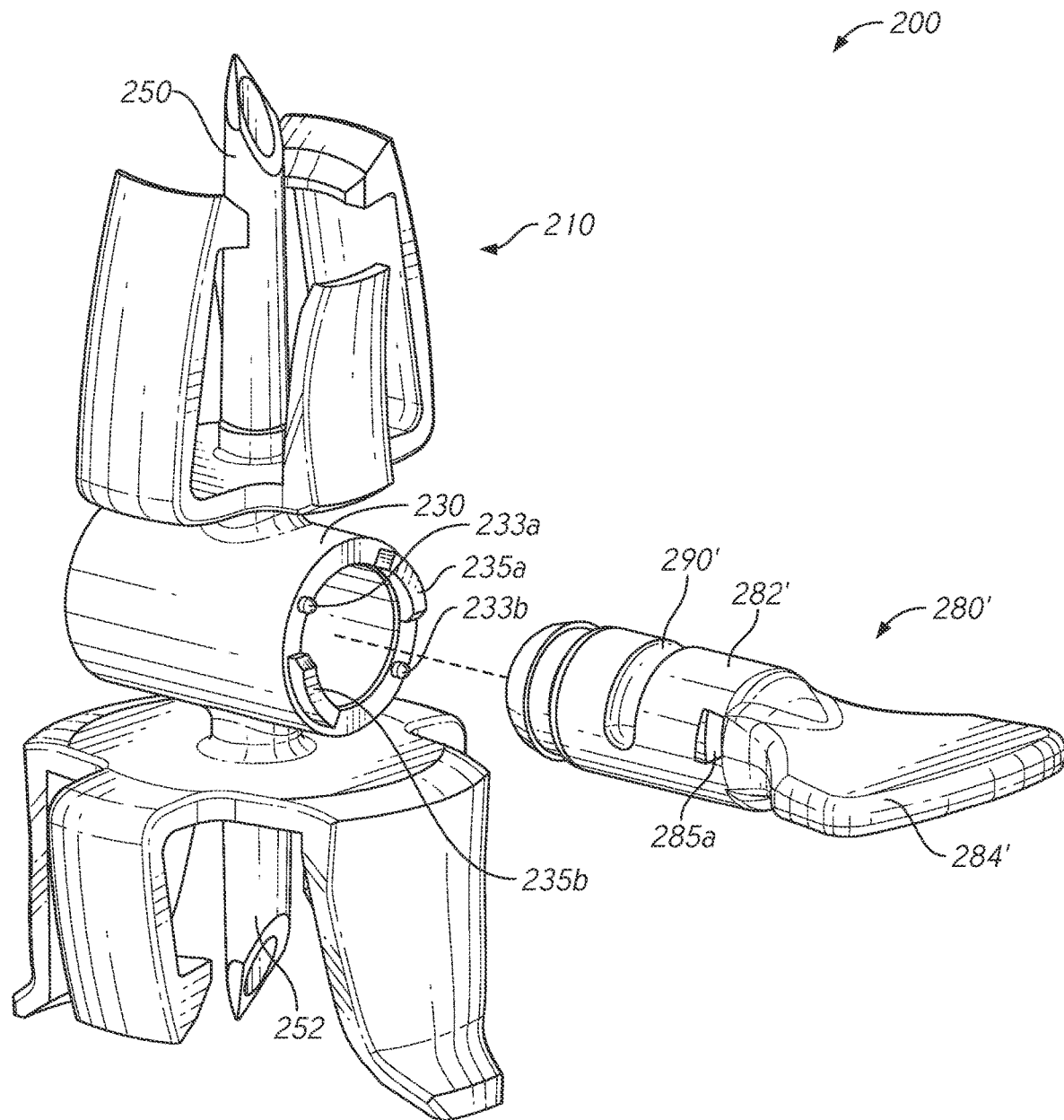
FIG. 11B illustrates an exploded view of the fluid transfer device of FIG. 11A.

FIGS. 11A-11D illustrate views of another embodiment of a fluid transfer device 200. The fluid transfer device 200 is the same as the fluid transfer device 100 in many respects. For example, the fluid transfer device 200 includes an adapter 210 which is identical to adapter 110 except with respect to the projections 250, 252 and the limiters 233a, 233b, 235a, 235b. Additionally, the fluid transfer device 200 includes a valve 280' which is identical to valve 280 except with respect to the tabs 285a, 285b. Additionally, as shown in FIGS. 11A-11B, the adapter 210 does not have protrusions 138a, 138b. Additionally, as also shown, the fluid transfer device 200 includes limiters 233a, 233b and/or limiters 235a, 235b instead of the limiter 160 described above with respect to fluid transfer device 100.

The projections 250, 252 can be identical to the projections 150, 152 except with respect to the height and/or cross-section. For example, with reference to FIGS. 2A, 2G, 8A-8B, and 11A-11B, the projection 250 can have a different height and/or cross-sectional area than the projection 150. Additionally or alternatively, the projection 252 can have a different height and/or cross-sectional area than the projection 152. The projection 250 can have a greater, equal, or smaller height and/or cross-sectional area than the projection 252 and/or projection 150. Similar to the projections 150, 152, the projections 250, 252 define a fluid passage therethrough that can align with the first and second apertures 130a, 130b of the chamber 130. In some embodiments, one or both of the projections 250, 252 have a tapered end.

As mentioned above, the fluid transfer device 200 can include limiters 233a, 233b and/or stops or usage indicators 235a, 235b instead of the limiter 160 described above with respect to fluid transfer device 100. Similar to the limiter 160, the limiters 233a, 233b can inhibit the fluid transfer device 200 from transitioning between a first configuration, where a flow path between apertures in chamber 230 (which can be identical to apertures 130a, 130b in chamber 130) and fluid passages defined within projections 250, 252 is open, and a second configuration, where such flow path is closed (for example, "blocked"). Additionally, similar to the protrusions 166a, 166b and the gap $G_1$ of the limiter 160, the stops 235a, 235b can help define a second (open) position of the fluid transfer device 200 (for example, an open position of the valve 280').

Figure 11C:
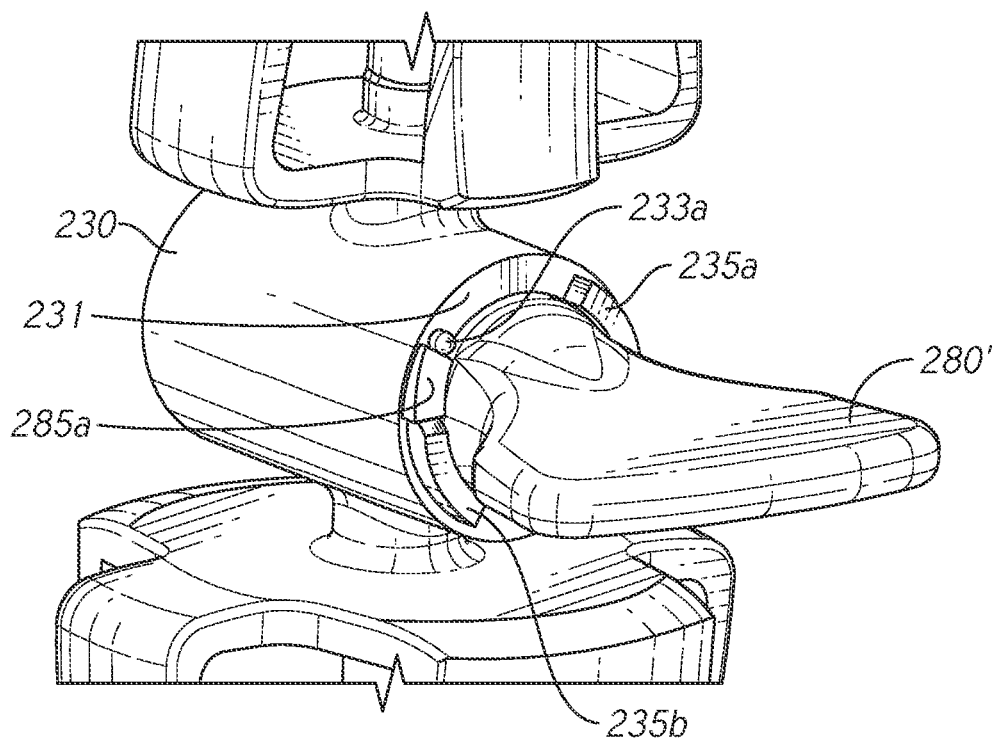
FIGS. 11C-11D illustrate enlarged views of portions of the fluid transfer device of FIG. 11A.
Figure 11D:
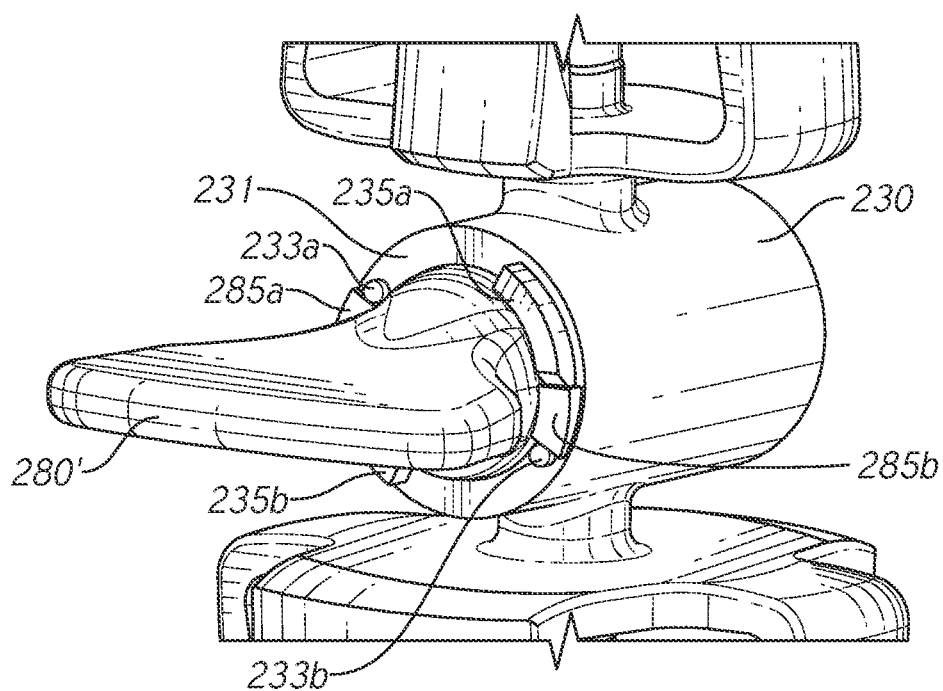

With reference to FIGS. 11B-11D, the fluid transfer device 200 can include one or more limiters 233a, 233b on a portion of the chamber 230 of the adapter 210 or on another portion of adapter 210. The chamber 230 can be identical to chamber 130 in every respect. The limiters 233a, 233b can be positioned on an end of chamber 130 and/or on an exterior surface of chamber 230. The chamber 230 can be sized and/or shaped to receive at least a portion of valve 180, 280, 280'. The chamber 130 can be, for example, cylindrical and have an annular end with one or more limiters 233a, 233b. The limiters 233a, 233b can protrude outward from a portion of the chamber 230, such as a portion of an annular end of the chamber 230. The limiters 233a, 233b can be integral or non-integral with the adapter 210 (for example, the chamber 230). The limiters 233a, 233b can have a variety of shapes and/or cross-sections. For example, the limiters 233a, 233b can have a circular, square, rectangular, pentagonal, hexagonal, heptagonal, octagonal, nonagonal, or decagonal cross-section. The limiters 233a, 233b can have a rounded tip at a free end thereof. In some embodiments, the limiters 233a, 233b protrude outward from a surface 231 of an end of the chamber 230. In some embodiments, the end defining such surface 231 is circular. The limiters 233a, 233b can be diametrically opposed from one another with respect to end surface 231. For example, the limiters 233a, 233b can be spaced 180 degrees from one another along surface 231. However, the limiters 233a, 233b can be spaced from one another at a different spacing, for example, 90 degrees, 60 degrees, 45 degrees, 30 degrees, or 15 degrees from one another along surface 231.

The limiters 233a, 233b can change shape, detach, or partially detach from a portion of the fluid transfer device 200 when the device 200 is transitioned between the open and closed positions. For example, movement of the valve 280' with respect to the chamber 230 can cause the limiters 233a, 233b to change shape, detach, and/or partially detach from a portion of the fluid transfer device 200. As another example, a portion of the valve 280' can engage and/or contact the limiters 233a, 233b and cause the limiters 233a, 233b to change shape, detach, or partially detach from a portion of the adapter 210. The portion of the valve 280' that engages and/or contacts the limiters 233a, 233b can be one or more tabs 285a, 285b of the valve 280', which are further described below.

As shown in FIGS. 11B-11D, the valve 280' can include one or more tabs 285a, 285b extending from a portion thereof. The tabs 285a, 285b can, for example, extend outward from a body 282' of the valve 280'. The tabs 285a, 285b can be diametrically opposed from one another with respect to a cross-section of a portion of the valve 280' (for example, with respect to a cross-section of the body 282' of valve 280'). For example, where the body portion 282' has a circular cross-section, the tabs 285a, 285b can be spaced 180 degrees from one another with respect to the circular cross-section of the body 282'. However, the tabs 285a, 285b can be spaced from one another at a different spacing, for example, 90 degrees, 60 degrees, 45 degrees, 30 degrees, or 15 degrees from one another with respect to a circular cross-section of the body 282'. The tabs 285a, 285b can be integral or non-integral with the valve 280'.

As shown in FIGS. 11C-11D, when the valve 280' is positioned at least partially within chamber 230, tabs 285a, 285b can be adjacent to a surface 231 of an end of chamber 230. When the valve 280' moves within chamber 230 (for example, via rotation), tabs 285a, 285b can move along and/or proximate to a surface 231 of an end of chamber 230. Where the limiters 233a, 233b are positioned on the surface 231 of the end of chamber 230 as shown, the tabs 285a, 285b can contact the limiters 233a, 233b when the valve 280' is rotated. If enough force is applied to the valve 280' (for example, via handle 284') the tabs 285a, 285b can detach, partially detach, damage, and/or change the shape of the limiters 233a, 233b. The chamber 230 can include a first limiter 233a positioned adjacent a forward end of a first tab 285a (see FIG. 11C) and a second limiter 233b positioned adjacent a forward end of a second tab 285b (see FIG. 11D), such that little or no rotation of the valve 280' is permitted within the chamber 230 unless sufficient force is applied by the tabs 285a, 285b to limiters 233a, 233b to detach, partially detach, damage, and/or change the shape of the limiters 233a, 233b. Use of the term "forward end" of the tabs 285a, 285b is intended to mean a leading end of the tabs 285a, 285b in a "clockwise" direction of rotation adjacent the end of chamber 230. However, such description is not intended to be limiting, as the valve 280' can be rotated in either a "clockwise" or "counter-clockwise" direction of rotation with respect to the chamber 230.

The limiters 233a, 233b can have a width or length extending along a portion of the chamber 230 (such as along surface 231 of the chamber 230) that is smaller than a width or length of the tabs 285a, 285b. The limiters 233a, 233b can have a cross-section that is smaller than a cross-section of the tabs 285a, 285b. A portion of the limiters 233a, 233b can be cut or scored so as to better effectuate detachment from the chamber 230. For example, an end of the limiters 233a, 233b that is adjacent to the surface 231 of the chamber 230 can be partially cut or partially detached. This can help aid detachment of the limiters 233a, 233b when engaged by the tabs 285a, 285b. As shown in FIGS. 11A-11D, the tabs 285a, 285b can include a tapering cross-section along a length or width thereof. For example, a first end of the tabs 285a, 285b can have a smaller thickness than a second end of the tabs 285a, 285b. Such configuration can help the tabs 285a, 285b better cut, shear, detach, partially detach, and/or damage the limiters 233a, 233b. While two limiters 233a, 233b and two tabs 285a, 285b are shown in the figures, a different amount of limiters and/or tabs is possible. Advantageously, the one or more limiters 233a, 233b can provide a visual indication that the fluid transfer device 100 has been used or tampered with. For example, similar to that discussed above with reference to limiter 160 and fluid transfer device 100, when the limiter(s) 233a, 233b are deformed and/or detached, this can indicate that the valve 280' has been moved to open and/or close the flow path between the fluid passages defined within the projections 250, 252.

The fluid transfer device 200 can include one or more stops or usage indicators 235a, 235b which can inhibit movement (for example, rotation) of the valve 280' with respect to the adapter 210 (for example, chamber 230). For example, the chamber 230 can include two stops 235a, 235b extending along and/or protruding from a portion thereof (such as surface 231). The stops 235a, 235b can extend along and protrude outward from an annular end of chamber 230 (FIGS. 11B-11D), for example, along surface 231. When the valve 280' is rotated within chamber 230 and the valve 280' includes one or more tabs 285a, 285b adjacent or proximate to the end of chamber 230, the stops 235a, 235b can limit rotation of the valve 280' via contact with the tabs 285a, 285b. In contrast to the limiters 233a, 233b described above, the stops 235a, 235b can be designed to withstand forces applied by the one or more tabs 285a, 285b so that the stops 235a, 235b do not deform and/or do not detach when contacted by the tabs 285a, 285b during rotation of the valve 280'. The stops 235a, 235b can extend along an end of chamber 230 (for example, along surface 231) and can have length that is greater than a length of the tabs 285a, 285b and/or a length of the limiters 233a, 233b. The stops 235a, 235b can extend from an end of the chamber 230 (for example, surface 231) and can have a height (with respect to surface 231 of chamber 230) that is greater than a height (and/or thickness) of the tabs 285a, 285b. The stops 235a, 235b can have a circular, square, rectangular, pentagonal, hexagonal, heptagonal, octagonal, nonagonal, or decagonal cross-section, for example. The stops 235a, 235b can have a cross-sectional area that is greater than the tabs 285a, 285b and/or the limiters 233a, 233b.

With reference to FIGS. 11C-11D, when the valve 280' is positioned at least partially within the chamber 230 and the tabs 285a, 285b are adjacent or proximate to surface 231 of chamber 230, the tabs 285a, 285b can be positioned between the stops 235a, 235b and the limiters 233a, 233b. For example, in some embodiments, the valve 280' includes a first tab 285a positioned between the stop 235b and limiter 233a (see FIG. 11C) when the valve 280' is in a first position (for example, in a closed position where the valve 280' prevents fluid communication between fluid passages in the projections 250, 252). When the valve 280' transitions to a second position (for example, in an open position where the valve 280' allows fluid communication between fluid passages in the projections 250, 252), the first tab 285a can detach the limiter 233a from the chamber 230, and/or can crush and/or otherwise bypass the limiter 233a. When the first tab 285a contacts stop 235a, the valve 280' is at the second position. In some embodiments, the chamber 230 also includes a second limiter 233b and the valve 280' can further include a second tab 285b (see FIG. 11D), which can function similar to the first limiter 233a and the first tab 285a described above. For example, when the valve 280' is in the first (closed) position, the second tab 285b can be positioned between the second limiter 233b and the second stop 235a. Simultaneous or nearly simultaneous with the first tab 285a detaching the limiter 233a from the chamber 230, crushing the first limiter 233a, and/or otherwise bypassing the first limiter 233a, the second tab 285b can detach the second limiter 233b from the chamber 230, crush the second limiter 233b, and/or otherwise bypass the second limiter 233b when the valve 280' transitions to the second position. The second tab 285b can contact the second stop 235b when the valve 280' is in the second position. In some variants, the limiters 233a, 233b are spaced from one another along surface 231 such that the interaction between tab 285a and limiter 233a does not happen at the same time that tab 285b interacts with limiter 233b, or vice versa.

Although the limiters 233a, 233b are described above in some embodiments as being configured to detach from a portion of the adapter 210, in some embodiments, the limiters 233a, 233b may be crushed and/or be otherwise bypassed by the tabs 285a, 285b to permit relative movement between the valve 280' and the adapter 210 (and/or the chamber 230 of the adapter 210) after overcoming an inhibiting force. In some embodiments, the tabs 285a, 285b, or portions thereof, can alternatively be configured to detach, crush, and/or otherwise deform relative to the valve 280' so as to indicate whether the fluid transfer device 200 has been used or tampered with.

While the limiters 233a, 233b and stops 235a, 235b are shown as extending from and/or along a portion of an end of chamber 230 (for example, from surface 231), the limiters 233a, 233b and stops 235a, 235b can alternatively extend from a different portion of adapter 210. For example, the limiters 233a, 233b and/or stops 235a, 235b can extend from and/or along a perimeter of an outer surface of the chamber 230. In such configuration, the tabs 285a, 285b of the valve 280' can extend outwards from the valve 280' and along the perimeter of the outer surface of the chamber 230 so as to engage the limiters 233a, 233b and/or stops 235a, 235b in a similar manner as that described above when the valve 280' is rotated with respect to the chamber 230. For example, in such configuration, the tabs 285a, 285b can extend in a first direction perpendicular or substantially perpendicular to body 282, and also in a second direction perpendicular or substantially perpendicular to such first direction. For example, the tabs 285a, 285b can extend and have an L-shape.

While valve 280' is illustrated in FIG. 11B as having a recess 290' along the body 282' (similar to valve 280), the valve 280' can alternatively have an opening extending through body 282', similar to opening 190 in valve 180. Moreover, the valve 180 described above or a modified version thereof could be used with the fluid transfer device 200 in place of valve 280. For example, the fluid transfer device 200 includes a modified version of valve 180 having tabs identical to tabs 285a and/or 285b instead of the valve 280'.

The one or more stops 235a, 235b can restrict or limit rotation of the valve 280' within the chamber 230. For example, the stops 235a, 235b can be positioned along the end of chamber 230 (such as along surface 231) so as to contact the tab(s) 285a, 285b if the valve 280' is rotated 180 degrees, 170 degrees, 160 degrees, 150 degrees, 140 degrees, 130 degrees, 120 degrees, 110 degrees, 100 degrees, 90 degrees, 80 degrees, 70 degrees, 60 degrees, 50 degrees, 40 degrees, 30 degrees, 20 degrees, or 10 degrees, although other values are possible. The stops 235a, 235b can be positioned along the end of chamber 230 (such as along surface 231) so as to limit rotation of the valve 280' to less than or equal to 180 degrees, less than or equal to 170 degrees, less than or equal to 160 degrees, less than or equal to 150 degrees, less than or equal to 140 degrees, less than or equal to 130 degrees, less than or equal to 120 degrees, less than or equal to 110 degrees, less than or equal to 100 degrees, less than or equal to 90 degrees, less than or equal to 80 degrees, less than or equal to 70 degrees, less than or equal to 60 degrees, less than or equal to 50 degrees, less than or equal to 40 degrees, less than or equal to 30 degrees, less than or equal to 20 degrees, or less than or equal to 10 degrees, although other values or ranges are possible. In some embodiments where the chamber 230 is cylindrical and includes two stops 235a, 235b positioned diametrically opposite one another along surface 231 of an end of the chamber 230 (FIGS. 11C-11D), the stops 235a, 235b can limit rotation of the valve 280' (via contact with tab 285a) to 90 degrees or less. As discussed above, the positioning and/or properties (for example, length, width, height) of the stops 235a, 235b can be selected so to define an open and closed position of the valve 280' and therefore, the fluid transfer device 200. The recess 290' of the valve 280' can be sized and/or shaped so that the open and closed positions of the valve 280' are defined by any of the degrees of rotation listed above.

Figure 12:
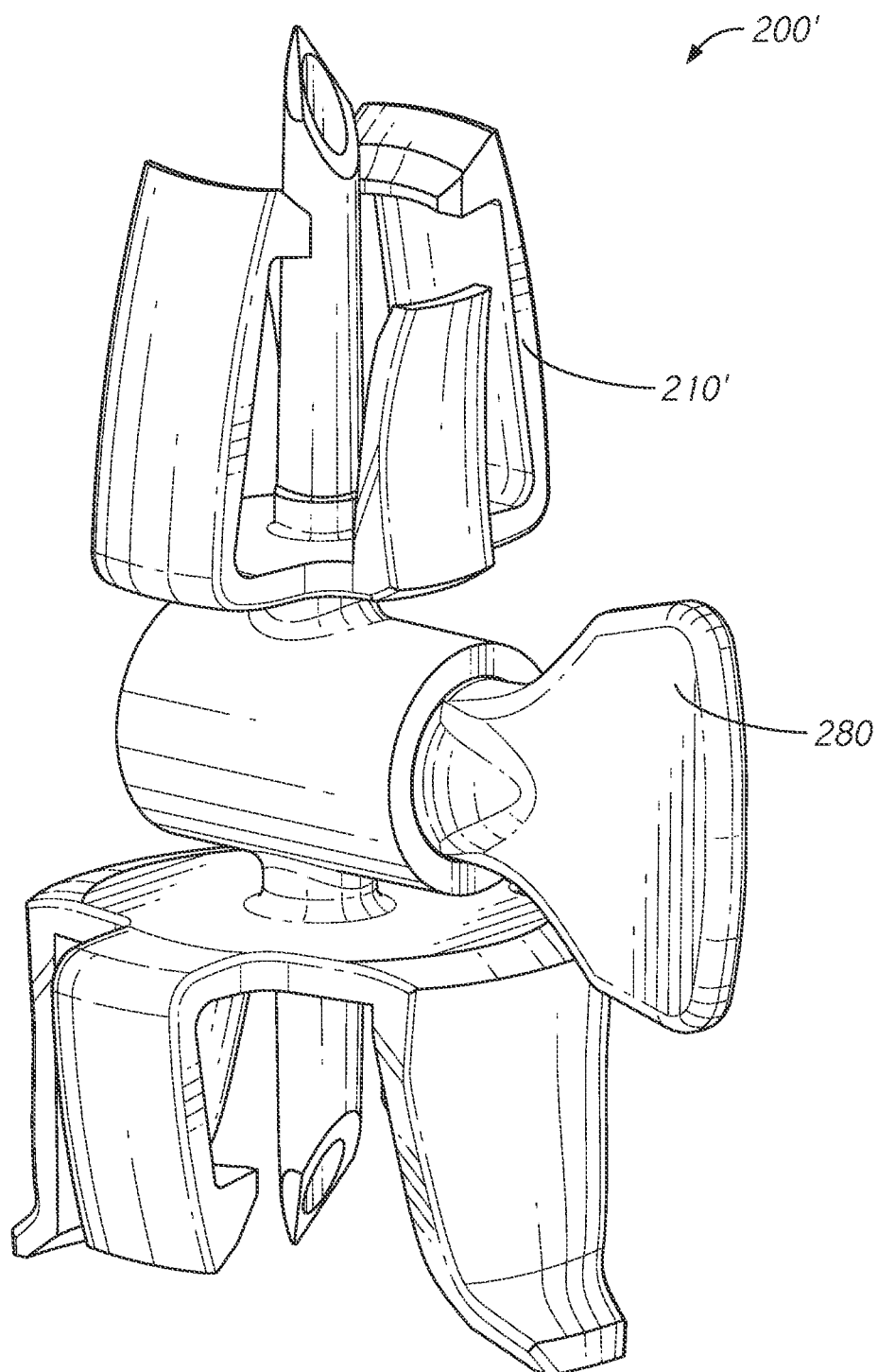
FIG. 12 illustrates another embodiment of a fluid transfer device for connecting a source container to an intermediate container in accordance with aspects of this disclosure.

FIG. 12 illustrates an alternative design for a fluid transfer device 200'. The fluid transfer device 200' is identical to the fluid transfer device 200 in every aspect except with respect to the fact that the adapter 210' does not include limiters 233a, 233b and/or stops 235a, 235b, and that the valve 280' of fluid transfer device 200 is replaced with the valve 280 which is shown and described with reference to FIGS. 9A-9C. However, valve 180 or a valve having a different configuration can be used with the adapter 210' in some variations.

Figures 13A, 13B:
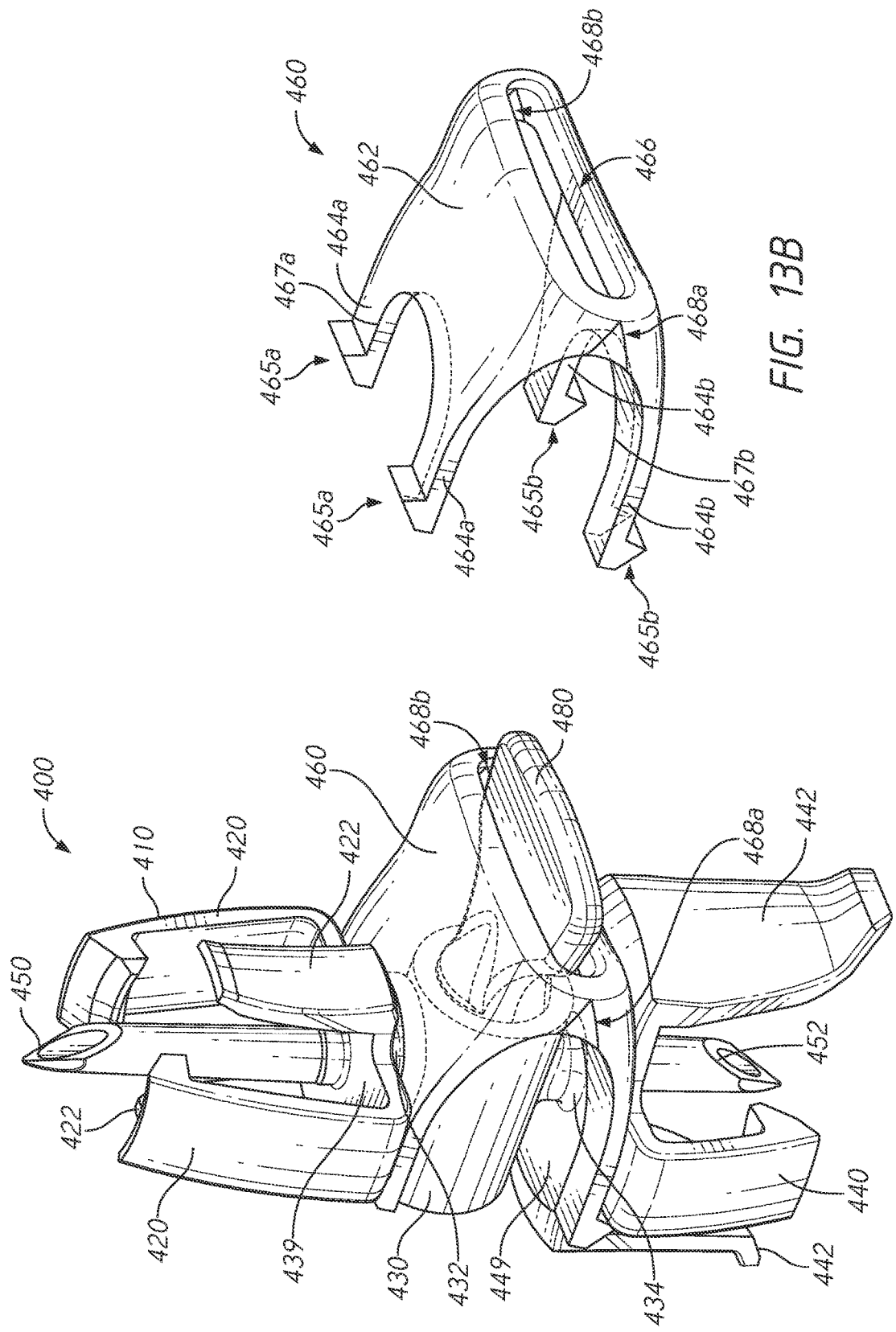
FIGS. 13A-13B illustrate another embodiment of a limiter in accordance with aspects of this disclosure.

FIGS. 13A-13B illustrate another embodiment of a fluid transfer device 400 including an adapter 410, a valve 480, and a limiter 460. The valve 480 can be the same in some or all respects to any of the valves discussed herein (such as valve 280). The adapter 410 can be identical to the adapter 110 discussed above except with respect to one or both of the projections 450, 452 (which can be identical to projections 250, 252 of adapter 210) and with respect to the fact that adapter 410 does not include the protrusions 138a, 138b. However, adapter 410 can be identical to adapter 110 in some variants. Accordingly, references numerals used in the discussion of the features of adapter 410 below are similar to reference numerals used for similar features of the adapter 110. For example, as shown in FIG. 13A, the adapter 410 can include arms 420, arms 422, arms 440, arms 442, stem 432, stem 434, chamber 430, base 439, and base 449, which can be respectively identical to arms 120, arms 122, arms 140, arms 142, stem 132, stem 134, chamber 130, base 139, and base 149, described above with reference to adapter 110. Although only a portion of one of the arms 422 is shown in FIG. 13A, it is to be understood that adapter 410 can include two of arms 422 similar to adapter 110. Similarly, although only one of arms 440 is shown in FIG. 13A, it is to be understood that adapter 410 can include two of arms 440 similar to adapter 110.

Similar to other limiters discussed herein (such as limiter 160), limiter 460 can inhibit (for example, prevent) the fluid transfer device 400 from transitioning between a first configuration, where fluid communication between fluids passageways defined in projections 450, 452 is blocked, to a second configuration, where fluid communication between fluid passageways defined in projections 450, 452 is open. The limiter 460 can secure to a portion of the fluid transfer device 400, and, while secured to such portion, can inhibit such transitioning of the fluid transfer device 400. For example, as discussed below, the limiter 460 can secure to a portion of the fluid transfer device 400 so as to inhibit the valve 480 from rotating to transition the fluid transfer device 400 to an open configuration.

FIG. 13B illustrates a perspective view of the limiter 460. As shown, the limiter 460 can include a body 462, one or more arms 464a, and one or more arms 464b. The one or more arms 464a and one or more arms 464b can extend from the body 462. The limiter 460 can include two arms 464a spaced apart from one another and/or can include two arms 464b spaced apart from one another. For example, the two arms 464a can be spaced apart from one another along a first axis and the two arms 464b can be spaced apart from one another along a second axis, which can be parallel to the first axis in some cases. Additionally, as shown, the two arms 464a can be spaced from the two arms 464b along a third axis that can be transverse (for example, perpendicular) to such first and/or second axes. The two arms 464a can be separated from one another by a gap. Similarly, the two arms 464b can be separated from one another by a gap. In some variations, the gaps and arms 464a, 464b can be defined by openings 467a, 467b in the body 462. Such openings 467a, 467b can be sized and/or shaped to receive the stems 432, 434 of the adapter 410, which allows the limiter 460 to secure to the adapter 410 around the stems 432, 434 and/or around the chamber 430 and/or valve 480 as shown.

One or more of arms 464a, 464b can be configured to engage portions of the adapter 410 so as to secure the limiter 460 to the adapter 410. For example, as shown in FIG. 13B, free ends of the arms 464a, 464b can include protrusions 465a, 465b which can be configured to engage portions of the adapter 410. The protrusions 465a, 465b can extend in a transverse direction with respect to a length of the arms 464a, 464b (and/or a portion of the length of the arms 464a, 464b). The protrusions 465a, 465b can include a tapered surface which allows the protrusions 465a, 465b to slide over portions of the adapter 410 prior to engagement. For example, the protrusions 465a, 465b can have tapered surfaces as shown in FIG. 13B which enable free ends of the arms 464a, 464b to slide over portions of the arms 420, 440 and/or bases 439, 449 of the adapter 410. Additionally, after sliding over such portions of the arms 420, 440 and/or bases 439, 449, the protrusions 465a, 465b can snap or otherwise lock into engagement with the arms 420, 440 and/or bases 439, 449 so as to inhibit (for example, prevent) removal of the limiter 460 from adapter 410. In some embodiments, the arms 464a, 464b of the limiter 460 are configured to secure to the arms 420, 440 and/or bases 439, 449 of the adapter 410 in a snap-fit engagement.

The body 462 of the limiter 460 can include an opening 466 which can be sized and/or shaped to receive the valve 480 or a portion thereof (such as a portion of a handle of the valve 480 such that such handle at least partially extends through opening 466). The opening 466 can be near a first end of the limiter 460 that is opposite a second end of the limiter 460 where the arms 464a, 464b are positioned (and/or where free ends of the arms 464a, 464b are positioned). As shown, the opening 466 can have a rounded shape, such as an oblong shape, among others. In some embodiments, the body 462 can be closed such that the end of the handle of the valve 480 is at least partially enclosed by the limiter 460.

With reference to FIGS. 13A-13B, the limiter 460 can be secured to the adapter 410 by positioning the valve 480 (or a portion of the valve 480 such as a handle of the valve 480) at least partially through the opening 466 and moving the arms 464a, 464b around the stems 432, 434 so that the stems 432, 434 are positioned at least partially within openings 467a, 467b. As discussed above, the arms 464a, 464b of the limiter 460 can engage portions of the arms 420, 440 and/or bases 439, 449 of the adapter 410 so as to secure the limiter 460 to the adapter 410. When secured to the adapter 410, the valve 480 (or a portion thereof) can be positioned within and/or at least partially through the opening 466. Such positioning can inhibit the valve 480 from moving (for example, rotating) a sufficient amount to effect transition of the fluid transfer device 400 so as to enable fluid communication between the projections 450, 452 (and/or fluid passageways defined therein).

In some embodiments, in order to remove the limiter 460 from the adapter 410, portions of the limiter 460 can be configured to break or otherwise detach. For example, as shown in FIGS. 13A-13B, the limiter 460 can include one or more notches 468a, 468b which can allow the limiter 460 (or portions thereof) to break so as to enable the limiter 460 to be removed from the adapter 410, thereby allowing the valve 480 to rotate to effectuate transitioning of the fluid transfer device 400 to an open configuration. The limiter 460 can include a notch 468a and/or a notch 468b. The notches 468a, 468b can be positioned along the body 462 near the opening 466 in some embodiments. In some variations, the notches 468a, 468b can define weak points or regions in the body 462 that are susceptible to fracture when encountering stress.

In some variations, when the limiter 460 is secured to the adapter 410, application of opposing forces (for example, vertical forces given the orientation shown in FIGS. 13A-13B) on the body 462 can cause the limiter 460 to break at or near the notches 468a, 468b. Such breakage can allow the limiter 460 to be removed from the adapter 410. The broken and removed limiter 460 can also serve as an indication that the fluid transfer device 400 has been used, which can provide evidence of tampering and/or prior use.

FIGS. 14A-14B illustrate another embodiment for a limiter 560 that can be used with the adapter 410. Limiter 560 can include a base 562 and a stem 564 that extends outward from the base 562. The stem 564 can extend transverse, for example, perpendicular to a surface of the base 562. Similar to other limiters discussed herein, limiter 560 can inhibit (for example, prevent) the fluid transfer device 400 from transitioning between a first configuration, where fluid communication between fluids passageways defined in projections 450, 452 is blocked, to a second configuration, where fluid communication between fluid passageways defined in projections 450, 452 is open. The limiter 560 can secure to a portion of the fluid transfer device 400 and, while secured to such portion, can inhibit such transitioning of the fluid transfer device 400. For example, as discussed below, the limiter 460 can secure to a portion of the adapter 410 and/or valve 480 so as to inhibit the valve 480 from rotating to transition the fluid transfer device 400 to an open configuration.

The limiter 560 can include an opening which can allow portions of the limiter 560 to bend or flex so that the limiter 560 can secure to and/or around the adapter 410 and/or valve 480 or portions thereof. For example, as illustrated, the limiter 560 can include an opening 563 that extends along a side of the limiter 560 and that divides portions of the base 562 and stem 563. The opening 563 can be sized and/or shaped to receive (for example, "mate" with) portions of the valve 480 or a handle of the valve 480 (or portions thereof). In some embodiments, the limiter 560 can be configured to snap around the valve 480 (or portions thereof).

As also illustrated, when the limiter 560 is secured to the valve 480, portions of the limiter 560 can be positioned to contact or otherwise interfere with portions of the adapter 410 when the valve 480 is rotated. For example, portions of the base 562 (such as surfaces 562a, 562b) can be positioned to contact or otherwise interfere with the base 439, base 449, arm 422, and/or arm 442 of the adapter 410 when the valve 480 is rotated. Such interference can inhibit (for example, prevent) the valve 480 from moving (for example, rotating) a sufficient amount to effect transition of the fluid transfer device 400 so as to enable fluid communication between the projections 450, 452 (and/or fluid passageways defined therein). In some embodiments, the limiter 560 includes a notch 567 which allows the limiter 560 to be removed (for example, "twisted off") the valve 480 and/or adapter 410. Once removed, the valve 480 can rotate to effectuate transitioning of the fluid transfer device 400 to an open configuration.

FIGS. 15A-15B illustrate another embodiment for a limiter 660 that can be used with the adapter 410 and valve 480. Similar to the other limiters discussed herein, limiter 660 can inhibit (for example, prevent) the fluid transfer device 400 from transitioning between a first configuration, where fluid communication between projections 450, 452 is blocked, to a second configuration, where fluid communication between projections 450, 452 is open. The limiter 660 can secure to portions of the adapter 410 and/or the valve 480, and while secured, can inhibit such transitioning of the fluid transfer device 400 (for example, can inhibit the valve 480 from rotating to transitioning the fluid transfer device 400 to an open configuration).

With reference to FIG. 15B, the limiter 660 can include a first portion 662a and a second portion 662b. The first and second portions 662a, 662b can be mirror images of one another in some embodiments. The first and second portions 662a, 662b can be connected to one another with one or more tabs 663, which are discussed more in detail below. The limiter 660 can be secured to the adapter 410 and/or valve 480 (or portions thereof) by moving the limiter 660 over a portion of the valve 480 and/or over a portion of the adapter 410. In some embodiments, the first and second portions 662a, 662b can be configured to bend and/or flex to accommodate such movement over the valve 480. In some embodiments, the first and second portions 662a, 662b are positioned around the valve 480 and/or chamber 430 and, subsequent to such positioning, the one or more tabs 663 are joined between the first and second portions 662a, 662b.

An interior of the limiter 660 (which can be defined by one or both of the first and second portions 662a, 662b and/or between the first and second portions 662a, 662b) can be sized and/or shaped to receive portions of the adapter 410 and/or valve 480. For example, the interior of the limiter 660 can be sized and/or shaped to receive (for example, match) a size and/or shape of the chamber 430 of the adapter 410 and/or the interior of the limiter 660 can be sized and/or shaped to receive (for example, match) a size and/or shape of a portion of the valve 480, such as a cylindrical portion of the valve 480 body proximate a handle of the valve 480. The first and second portions 662a, 662b can define an opening 666 into the interior of the limiter 600.

As shown in FIG. 15A, when the limiter 660 is secured to and/or around the chamber 430 and the valve 480 (or portions thereof), the limiter 660 can inhibit movement (for example, rotation) of the valve 480, thereby inhibiting the valve 480 from transitioning the fluid transfer device 400 from a close configuration to an open configuration as discussed above. In some variations, the one or more tabs 663 can be configured to break or otherwise detach from one or both of the first or second portions 662a, 662b, for example, when opposing forces are applied to the first and second portions 662a, 662b or, for example, when the first or second portions 662a, 662b are twisted with respect to one another. Once the one or more tabs 663 are broken or otherwise detached from one or both of the first and second portions 662a, 662b, the first and second portions 662a, 662b can be removed from each other (and/or the adapter 410 and valve 480) and the valve 480 can be moved to effectuate transitioning of the fluid transfer device 400 to an open configuration.

Figure 16B:
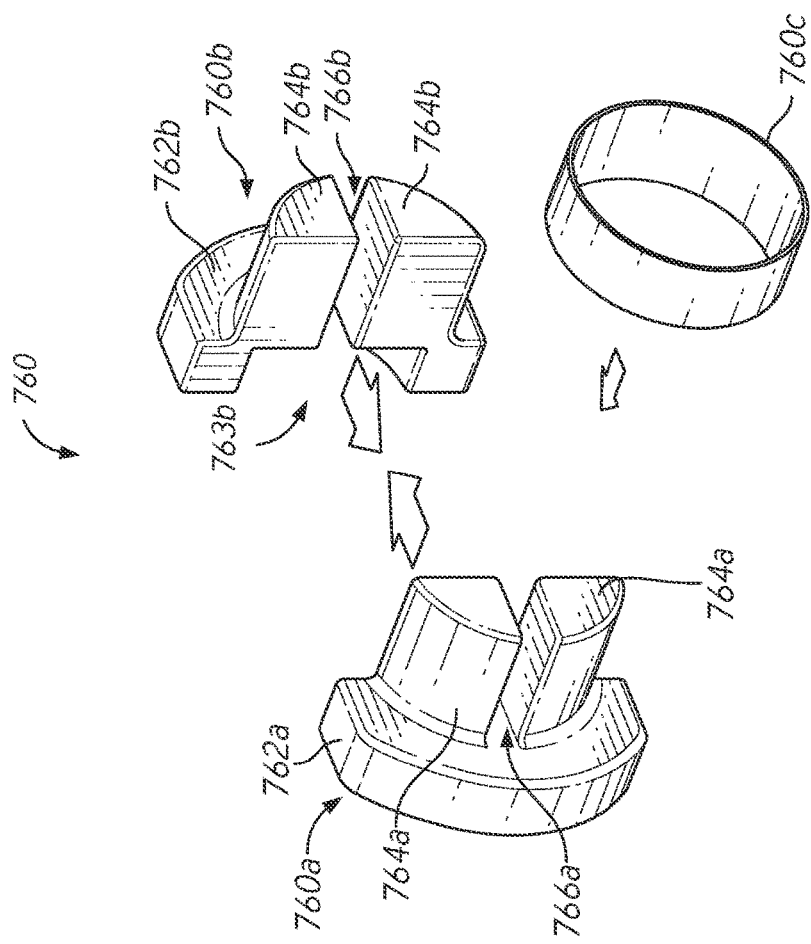
FIG. 16A-16B illustrates another embodiment of a limiter in accordance with aspects of this disclosure.
Figure 16A:
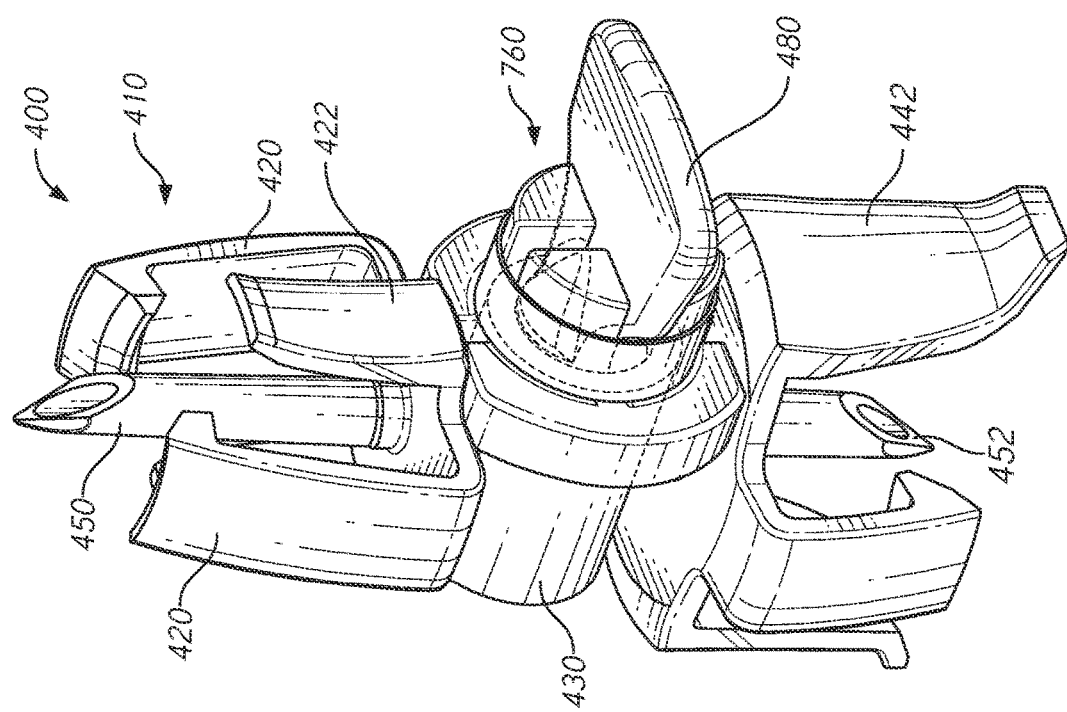

FIGS. 16A-16B illustrate another embodiment of a limiter 760 that can be used with the adapter 410 and valve 480. Similar to the other limiters discussed herein, limiter 760 can inhibit (for example, prevent) the fluid transfer device 400 from transitioning from a first configuration, where fluid communication between projections 450, 452 is blocked, to a second configuration, where fluid communication between projections 450, 452 is open. The limiter 660 can secure to portions of the adapter 410 and/or the valve 480, and while secured, can inhibit such transitioning of the fluid transfer device 400 (for example, can inhibit the valve 480 from rotating to transition the fluid transfer device 400 to an open configuration).

The limiter 760 can include a first portion 760a and a second portion 760b. The first and second portions 760a, 760b can be mirror images of one another in some embodiments. The first portion 760a can include a base 762a and one or more stems 764a extending outward from (for example, perpendicular to) the base 762a and/or a surface of the base 762a. As shown, the first portion 760a can include two stems 764a spaced apart from one another by a gap 766a. The gap 766a can be sized and/or shaped to receive a portion of the valve 480 (such as a handle of valve 480). The second portion 760b can include a base 762b and one or more stems 764b extending outward from (for example, perpendicular to) the base 762b and/or a surface of the base 762b. As shown, the second portion 760b can include two stems 764b spaced apart from one another by a gap 766b. the gap 766b can be sized and/or shaped to receive a portion of the valve 480 (such as a handle of valve 480). In some embodiments, the gaps 766a, 766b have the same size and/or shape. In some embodiments, portions of the bases 762a, 762b are shaped to conform to and/or receive a portion of the chamber 430 of the adapter 410 which can allow portions of the bases 762a, 762b to contact and/or surround a portion of the chamber 430, which can be cylindrical shaped in some embodiments. For example, as shown in FIG. 16B, base 762b can include a recessed portion 763b that is sized and/or shaped to conform to a size and/or shape of the chamber 430 (or a portion thereof). Recessed portion 763b can be sized and/or shaped to receive and/or surround a portion of the chamber 430 that can be cylindrical in some embodiments. Although not shown in FIG. 16B, base 762a can have a similar or identical recessed portion as recessed portion 763b.

The limiter 760 can be secured to the adapter 410 and/or the valve 480 by moving each of the first and second portions 760a, 760b as indicated by the arrows in FIG. 16B such that portions of the valve 480 (for example, portions of a handle of the valve 480) are positioned between the gaps 766a, 766b. To prevent the first and second portions 760a, 760b from moving (for example, separating from the adapter 410 and/or valve 480), a securement band 760c can be positioned over the stems 764a, 764b as shown in FIG. 16A. Such securement band 760c can be annular, for example, when outer surfaces of the stems 764a, 764b define a cylindrical outer surface when positioned near each other. However, the securement band 760c can be another shape, for example, where outer surfaces of the stems 764a, 764b define a different shape. In some embodiments, the first and second portions 760a, 760b can include other complementary elements configured to secure the portions together after placement similar to the tabs 663 shown in FIG. 15B.

When the limiter 760 is secured to and/or around the valve 480 and/or adapter 410 and portions of the valve 480 are positioned within the gaps 766a, 766b. Additionally, when the securement band 760c is positioned around the stems 764a, 764b, as shown, the stems 764a, 764b can inhibit the valve 480 from moving (for example, rotating) relative to the chamber 430. Once the securement band 760c is removed, the limiter 760 can also be removed, thereby allowing the valve 480 to be moved to effectuate transitioning of the fluid transfer device 400 to an open configuration. Removal of the band 760c can provide evidence of prior use or tampering of the fluid transfer device 400, similar to that described elsewhere herein.

As discussed above, the stems 764a can be separated from one another by a gap 766a and/or the stems 764b can be separated from each other by a gap 766b. In some embodiments, the stems 764a are separated from the stems 764b by a gap when the limiter 760 is secured to the adapter 410 and/or valve 480 (or portions thereof). Such gap is illustrated vertically in the orientation shown in FIG. 16A. Such gap can allow the securement band 760c to be removed (for example, cut) via insertion of a cutting tool (for example, scissors or a knife) in such gap. Such embodiments can be advantageous, for example, where securement band is permanently secured to the stems 764a, 764b.

Figure 17A:
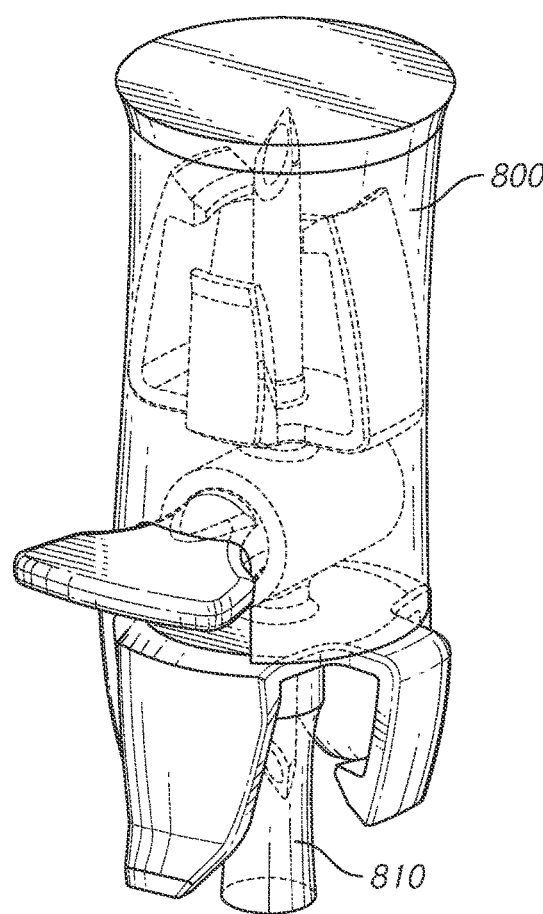
Figure 17B:
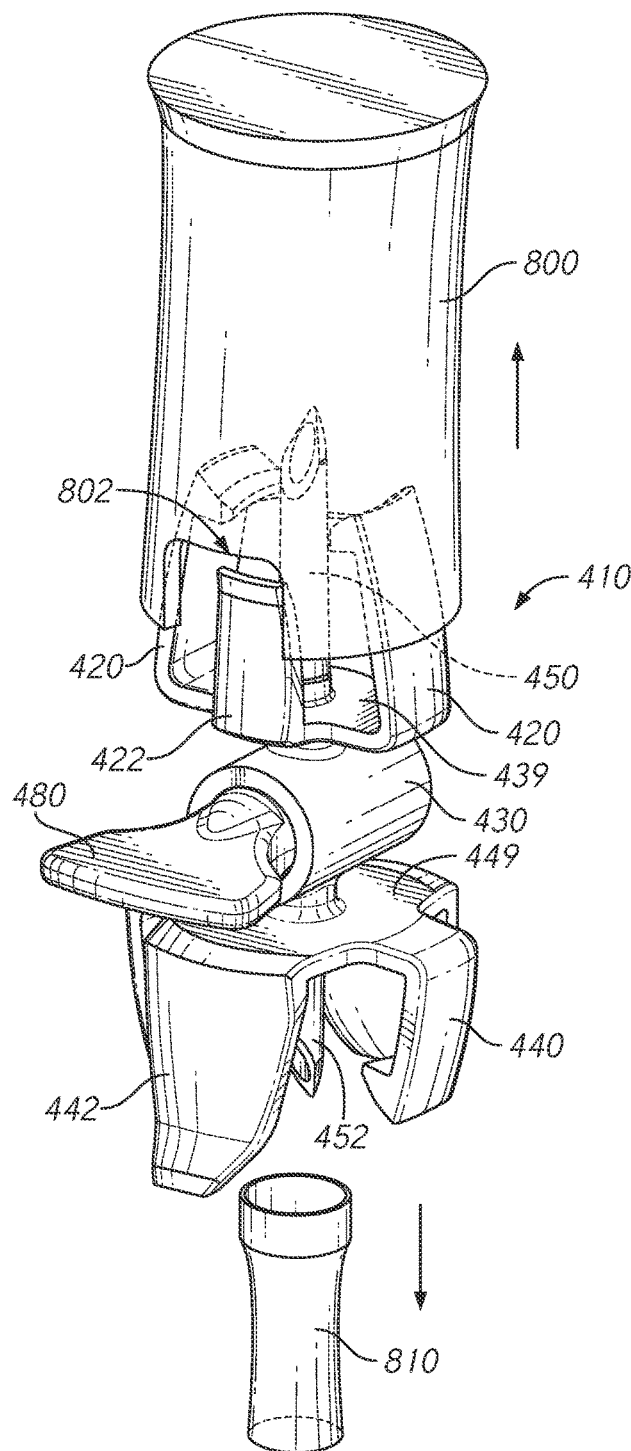
Figures 18A, 18B:
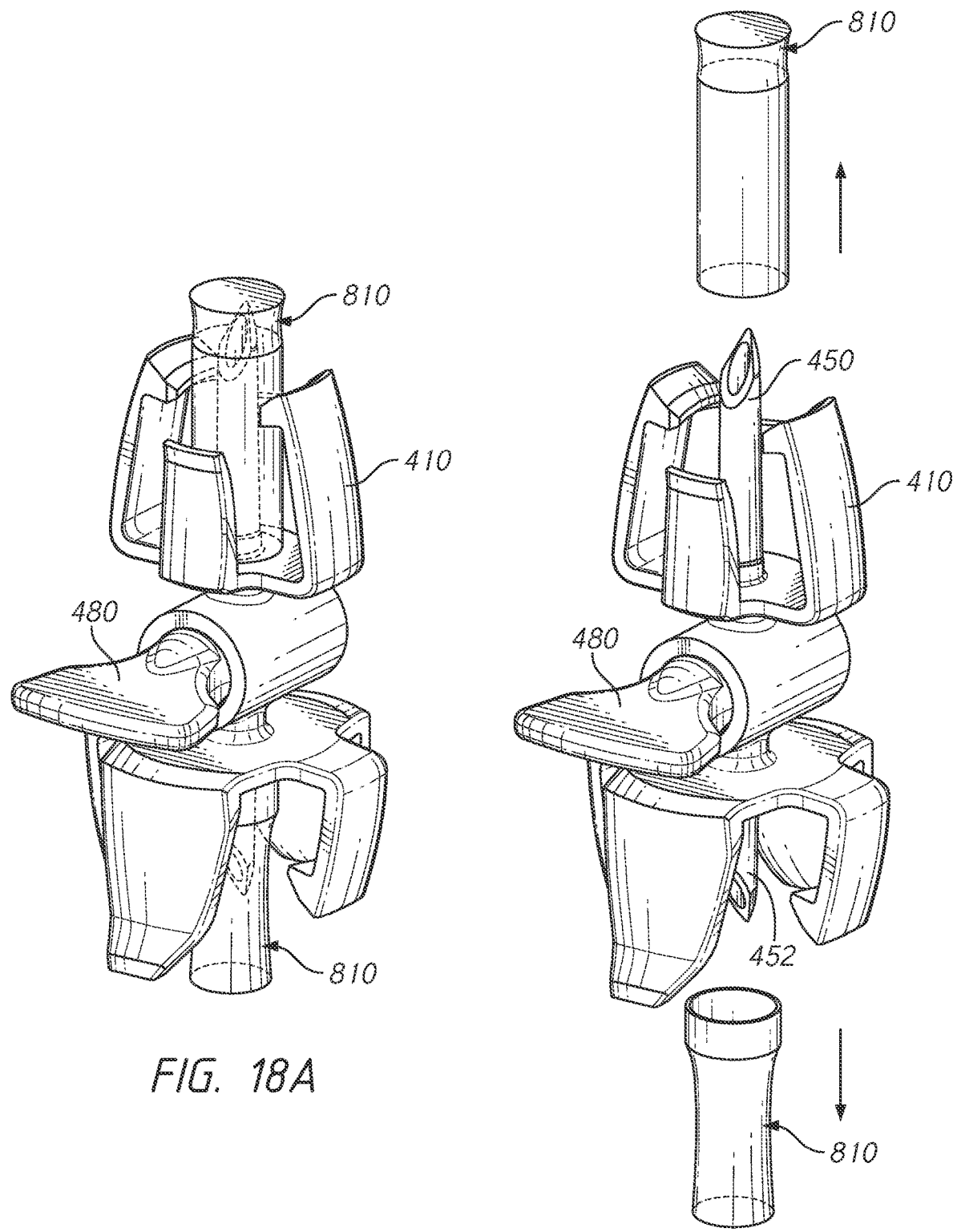

FIGS. 17A-17B illustrate caps 800, 810 that can be used with adapter 410. As shown, caps 800, 810 can secure to adapter 410 and cover projections 450, 452, for example, prior to use. As shown, cap 800 can be sized and/or shaped to surround arms 420, 422, base 439, chamber 430, and projection 450 of adapter 410 and, in some embodiments, can contact a portion of base 449 and/or arms 440, 442 when secured to adapter 410. Cap 800 can include an opening 802 extending through a wall defining an interior of the cap 800. The opening 802 can be positioned at or near an end of the cap 800 as shown. The opening 802 can be sized and/or shaped to receive a portion of the valve 480. When the valve 480 or a portion thereof is positioned within the opening 802, the cap 800 can at least partially inhibit the valve 480 from moving (for example, rotating) relative to the chamber 430. In some embodiments, valve 480 cannot be rotated until cap 800 is removed. In some variations, if sufficient force is applied to the valve 480, the valve 480 can break, deform, or otherwise detach the cap 800 (or portions of the cap 800) from the adapter 410, which can not only allow the valve 480 to transition the fluid transfer device 400 to an open configuration but can also provide an indication that the device 400 has been used. In some embodiments, cap 800 includes a stabilization end opposite the opening 802 that can provide a contact surface to facilitate attachment of the adapter 410 to a medicament container. For example, a user can remove cap 810 while cap 800 is secured to adapter 410 and can leave cap 800 on when securing arms 442, 440 of adapter 410 to a vial in a similar or identical manner as that described elsewhere herein with respect to adapter 110 and vial 155. Cap 800 can act as both a contamination protection device (by capturing portions of the valve 410 including projection 450) as well as a limiter that prevents undesired movement of the valve 480. It can also provide evidence of prior use or tampering as discussed herein. Caps 800, 810 can be removed as illustrated by the arrows in FIG. 17B. As shown in FIG. 18A-18B, in some cases, two caps 810 can be used with adapter 410 to cover projections 450, 452 (for example, instead of using one cap 810 and one cap 800). Caps 810 can be removed as illustrated by the arrows in FIG. 18B.

Figure 19:
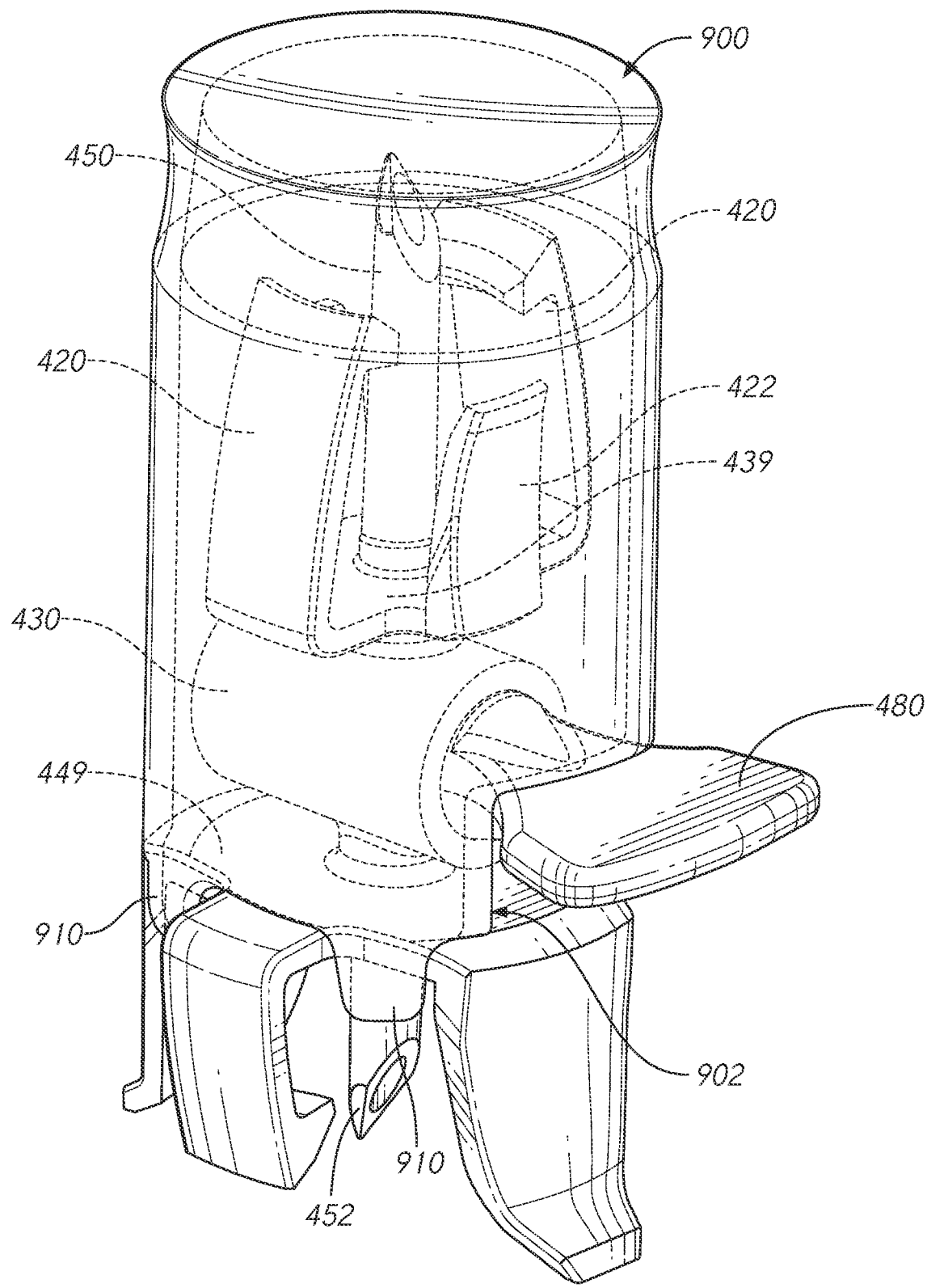
FIG. 19 illustrates another embodiment of a cap for the fluid transfer device in accordance with aspects of this disclosure.

FIG. 19 illustrates another embodiment for a cap 900 that can secure to the adapter 410 and/or the valve 480. Cap 900 can be sized and/or shaped to surround arms 420, 422, base 439, chamber 430, and projection 450 of the adapter 410. Cap 900 can include an opening 902 extending through a wall defining an interior of the cap 900. The opening 902 can be positioned at or near an end of the cap 900 as shown. The opening 902 can be sized and/or shaped to receive a portion of the valve 480. When the valve 480 or a portion thereof is positioned within the opening 902, the cap 900 can at least partially inhibit the valve 480 from moving (for example, rotating). In some embodiments, valve 480 cannot be rotated until cap 900 is removed. In some variations, if sufficient force is applied to the valve 480, the valve 480 can break or otherwise detach the cap 900 (or a portion of the cap 900) from the adapter 410, which can not only allow the valve 480 to transition the fluid transfer device 400 to an open configuration but can also provide an indication that the device 400 has been used. As shown, the cap 900 can include one or more arms 910 (for example, on an end of cap 900) which can secure and/or engage a portion of the adapter 410.

In some embodiments, arms 910 comprise latch portions configured to secure to portions of the base 449. Such securement can be via a snapping engagement, for example. The one or more arms 910 can, for example, secure around (for example, wrap around) base 449 (for example, portions of the base 449). In some variations, the one or more arms 910 are configured to break, deform, or otherwise detach from the cap 900 when sufficient force is applied to the cap 900 and/or valve 480 (for example, a twisting or a vertical pulling force), which can not only allow the valve 480 to transition the fluid transfer device 400 to an open configuration but can also provide an indication that the device 400 has been used. Cap 800 can act as both a contamination protection device (by capturing portions of the valve 410 including projection 450) as well as a limiter that prevents undesired movement of the valve 480. It can also provide evidence of prior use or tampering as discussed herein. Further, a user can grip and/or hold cap 900 when securing arms 442, 440 of adapter 410 to a vial in a similar or identical manner as that described elsewhere herein with respect to adapter 110 and vial 155.

FIGS. 20A-20F illustrate various views of a fluid transfer device 1000. Fluid transfer device 1000 can be similar or identical to any of the fluid transfer devices described herein. For example, fluid transfer device 1000 can be similar or identical to fluid transfer device 100 in some or many respects. Fluid transfer device 1000 can include an adapter 1010 and a valve 180'. Adapter 1010 can be similar or identical to adapter 110 discussed herein in some or many respects. For example, adapter 1010 can include latch arms 1020, guide arms 1022, a base 1039, a stem 1032, a chamber 1030, a stem 1034, a base 1049, latch arms 1040, and/or guide arms 1042, which can be similar or identical to latch arms 120, guide arms 122, base 139, stem 132, chamber 130, stem 134, base 149, latch arms 140, and/or guide arms 142 (respectively) described elsewhere herein with respect to adapter 110. Stem 1032 can include protrusions extending therefrom that are similar or identical to protrusions 138a, 138b of stem 132 described elsewhere herein. As shown, fluid transfer device 1000 can include projections 1050 and 1052 which can be similar or identical to projections 150, 152 (respectively). Projections 1050, 1052 can define fluid passages therein similar to projections 150, 152. Valve 180' can be similar or identical to any of the valves discussed herein. For example, valve 180' can be similar or identical to valve 180. The operation of valve 180' and/or the movement (for example, rotation) of valve 180' with respect to chamber 1030 can be similar or identical to the operation of valve 180' and/or the movement (for example, rotation) of valve 180 with respect to chamber 130 as described above with reference to fluid transfer device 100.

Although not shown in FIGS. 20A-20F, fluid transfer device 1000 can include a limiter that can inhibit the fluid transfer device 1000 from transitioning from a first configuration in which fluid communication between fluid passages within projections 1050, 1052 is prevented and a second configuration in which fluid communication between such fluid passages is allowed. For example, such limiter can be configured to inhibit (for example, prevent) the valve 180' from moving (for example, rotating) relative to chamber 1030 to open or close a flow path between apertures in chamber 1030 (which can be identical to apertures 130a, 130b) and fluid passages within projections 1050, 1052. Such limiter can be similar or identical to any of the limiters discussed herein, such as any of limiters 160, 233a, 233b, 460, 560, 660, or 760.

Figure 20A:
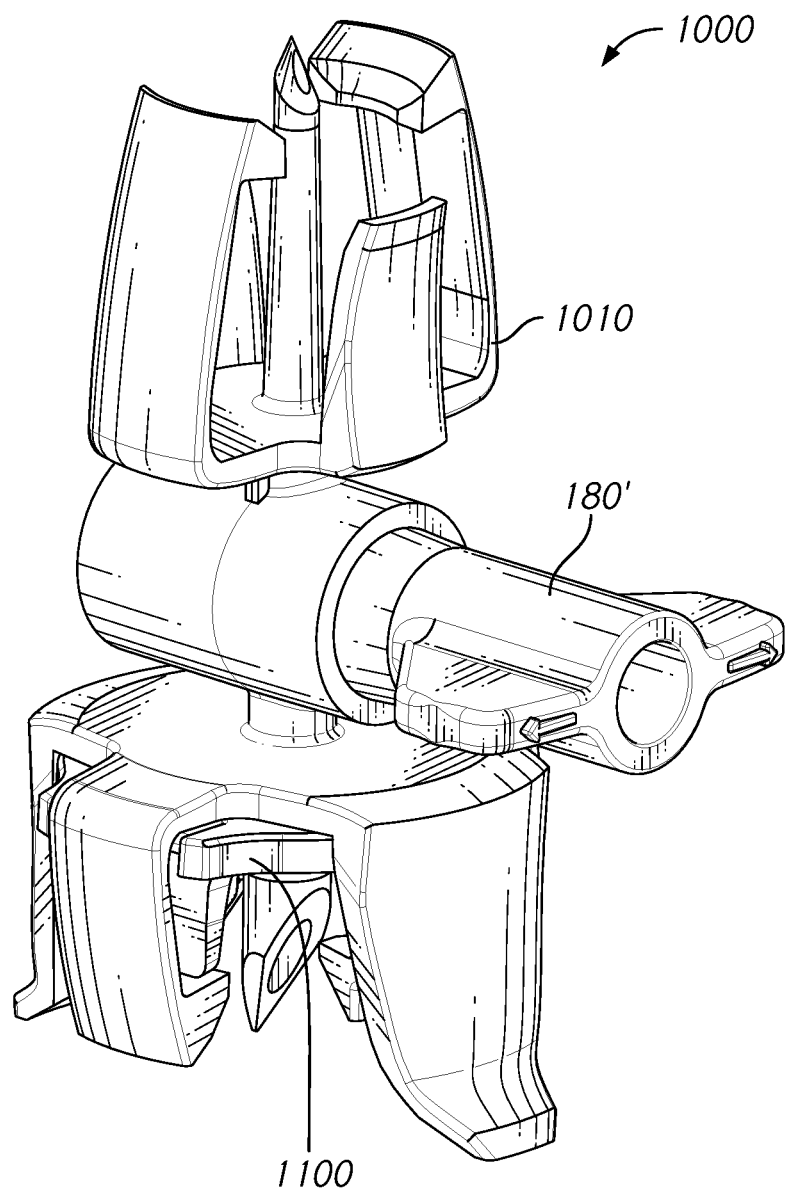
FIGS. 20A-20F illustrate embodiments of a fluid transfer device and an adapter in accordance with aspects of this disclosure.
Figure 20B:
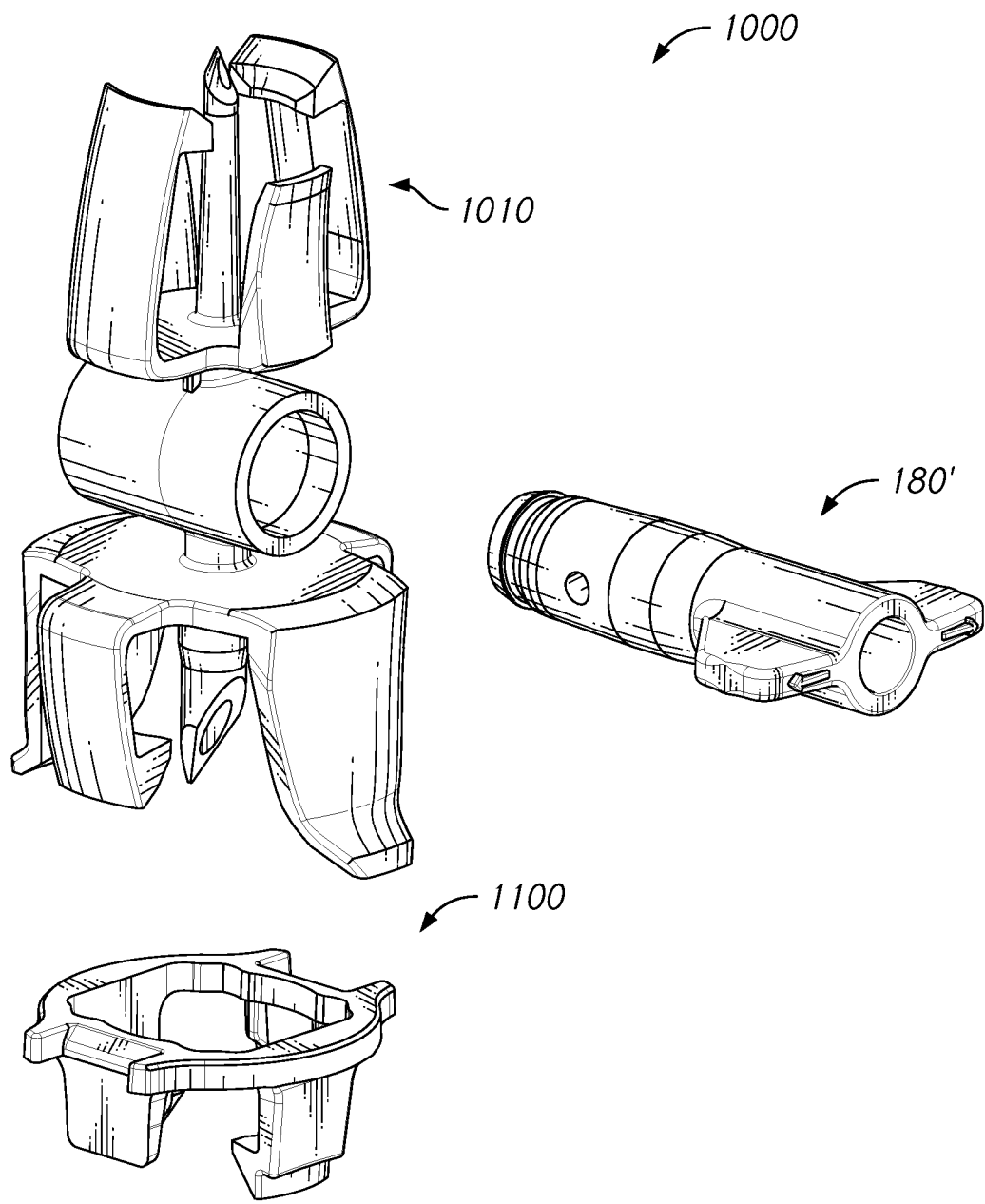
Figure 20C:
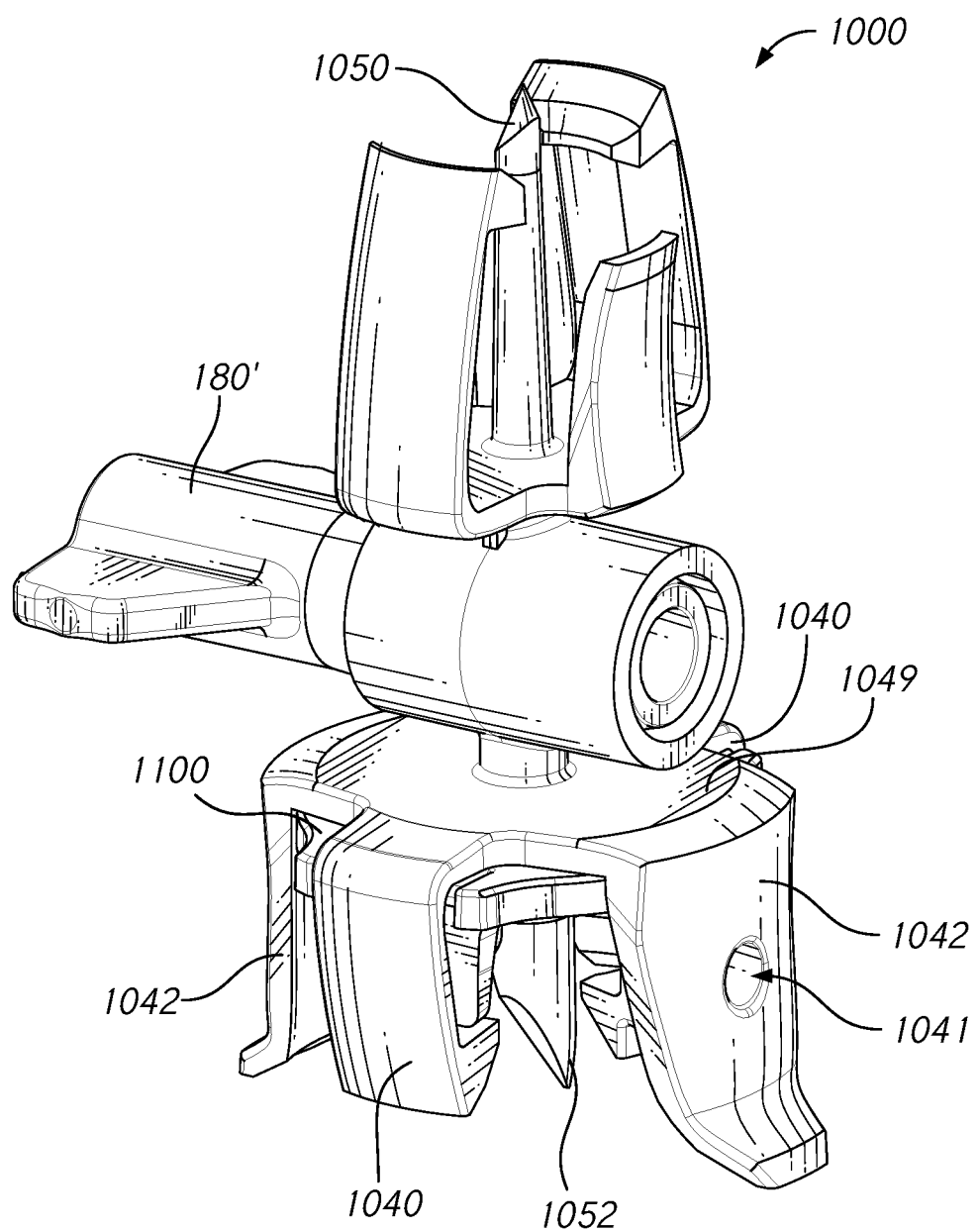
Figure 20E:
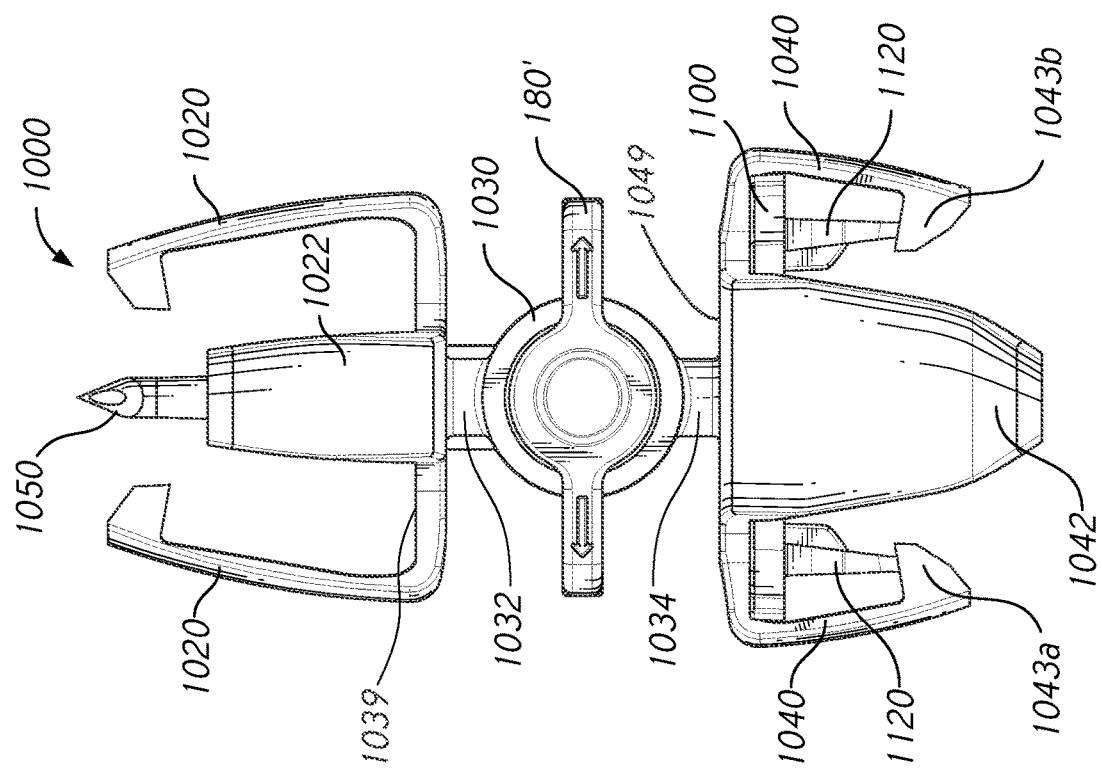
Figure 20D:
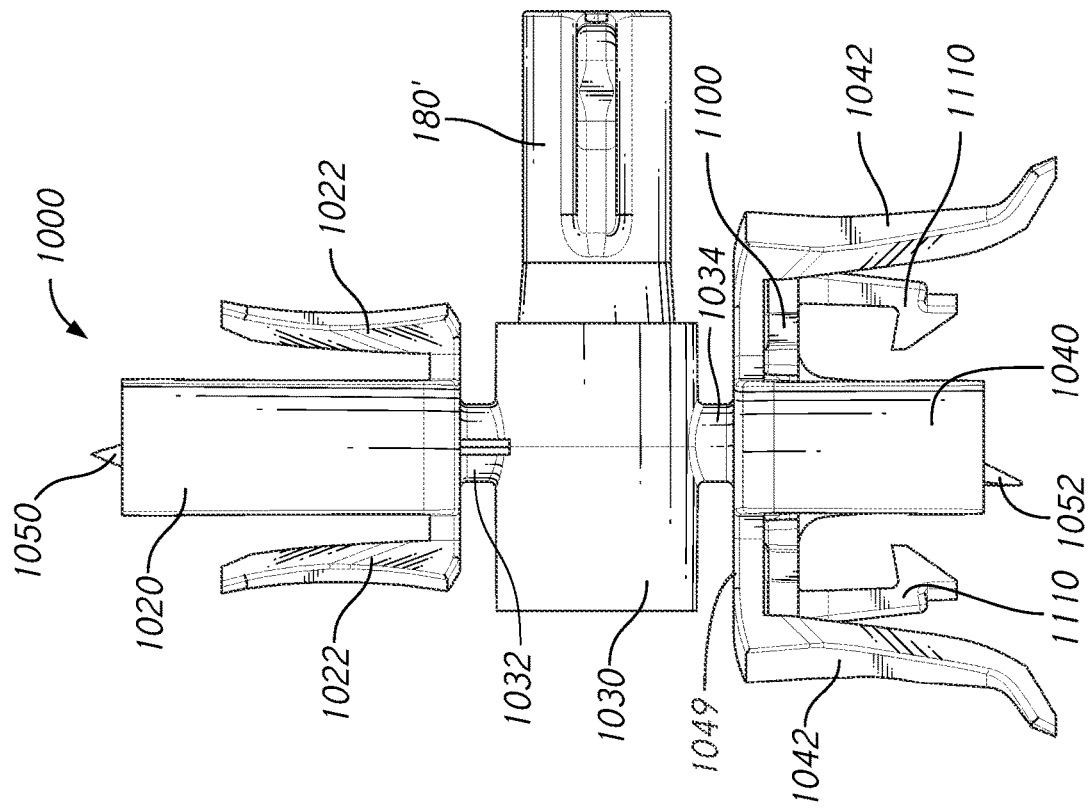

In some embodiments, a portion of one of the guide arms 1042 includes a recessed portion 1041 (see FIG. 20C). Such recessed portion 1041 can be recessed from a surface (for example, an outer surface) of one of the guide arms 1042. Such recessed portion 1041 can assist a user in gripping and/or holding the adapter 1010. In some embodiments, both of guide arms 1042 include a recessed portion 1041.

FIGS. 20A and 20C-20F illustrate an adapter 1100 secured to the fluid transfer device 100 and FIG. 20B illustrates an exploded view of the fluid transfer device 1000 (including adapter 1010 and valve 180') separated from adapter 1100. Adapter 1100 can be utilized with fluid transfer device 1000 to allow the fluid transfer device 1000 to accommodate and/or connect to different sizes of containers (for example, vials). For example, where fluid transfer device 1000 is configured to connect to a vial having a first size, adapter 1100 can be secured (permanently or removably) to a portion of fluid transfer device 1000 in order to allow fluid transfer device 1000 to connect to a vial having a second size that is different (for example, smaller) than the first size. In some embodiments, fluid transfer device 1000 is configured to connect to a 20 mm vial and adapter 1100 is configured to be secured to the fluid transfer device 1000, secure to a 13 mm vial, and thereby allow the fluid transfer device 1000 to connect to the 13 mm vial such that fluid communication between projection 1052 and an interior of the 13 mm vial can be achieved. Adapter 1100 can be secured to an attachment portion of fluid transfer device 1000, and such attachment portion can include base 1049, latch arms 1040, and/or guide arms 1042. Adapter 1100 can be secured to any of such components as described in more detail below. Although adapter 1100 is described and illustrated with respect to fluid transfer device 1000, adapter 1100 can be utilized with (for example, secured to) any of the fluid transfer devices discussed herein (for example, fluid transfer device 100, 200, 200', 400).

Figure 20F:
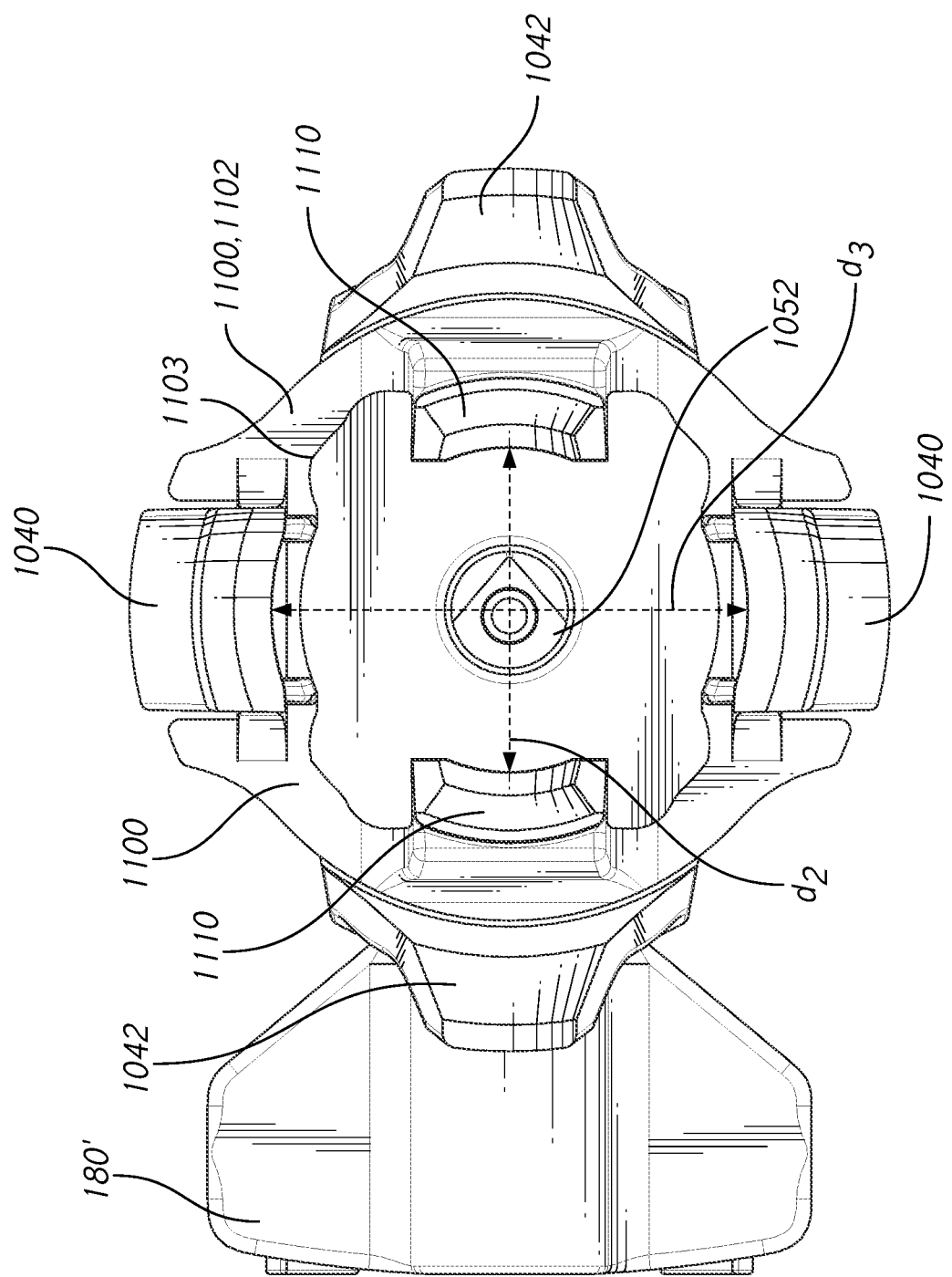
Figure 21A:
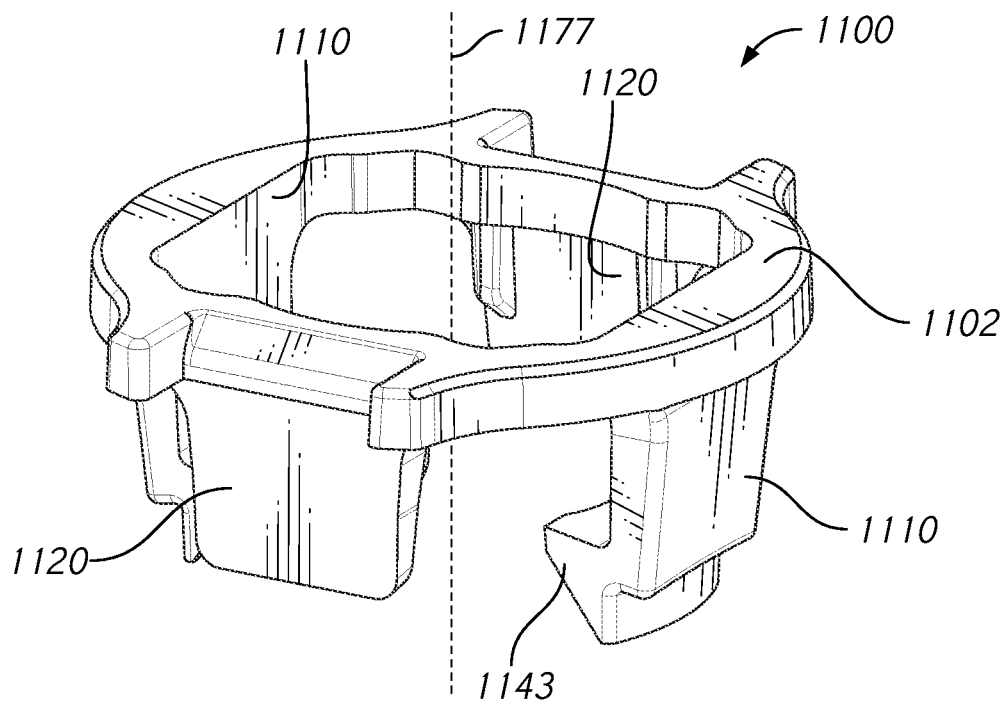
FIGS. 21A-21B illustrate top perspective views of the adapter of FIGS. 20A-20F in accordance with aspects of this disclosure.
Figure 21B:
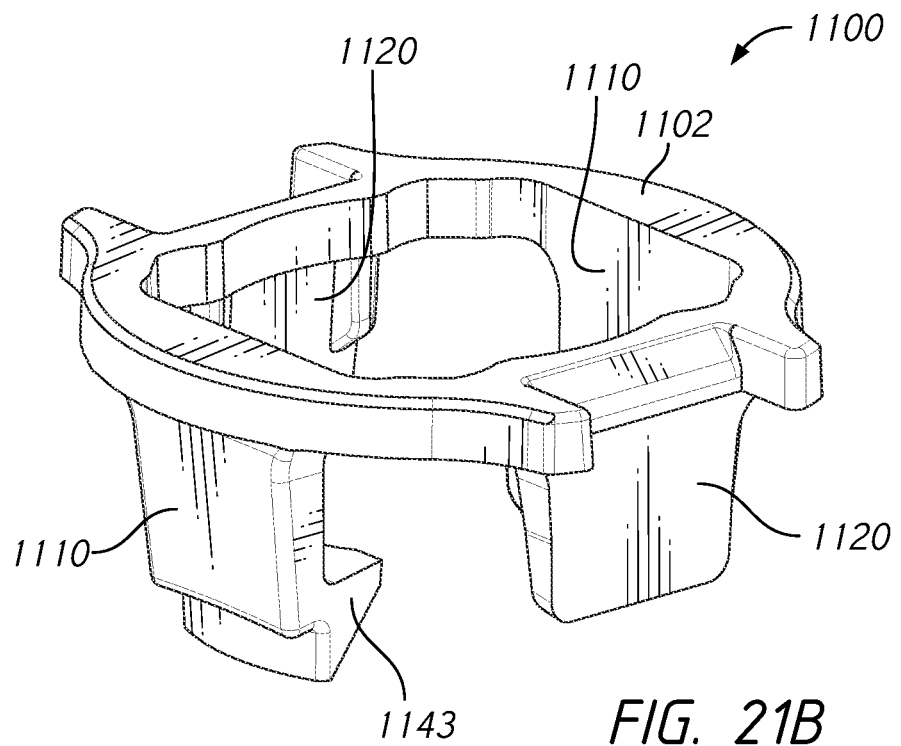
Figure 21C:
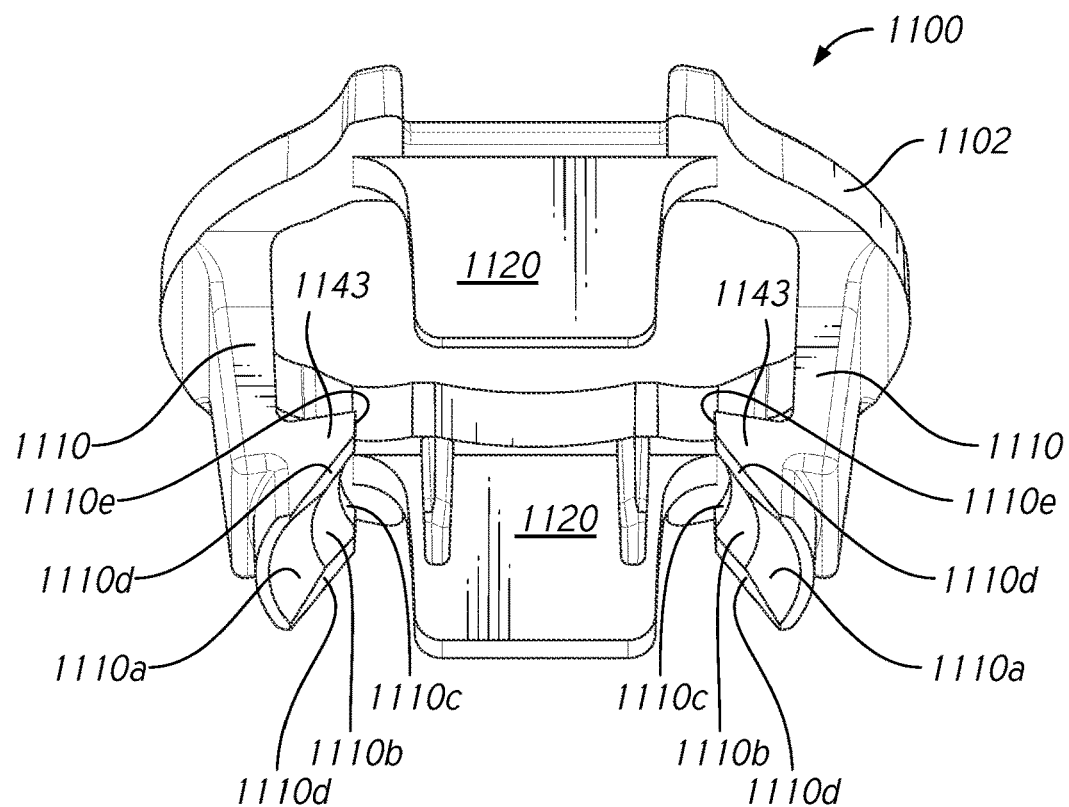
FIGS. 21C-21D illustrate bottom perspective views of the adapter of FIGS. 20A-20F in accordance with aspects of this disclosure.
Figure 21D:
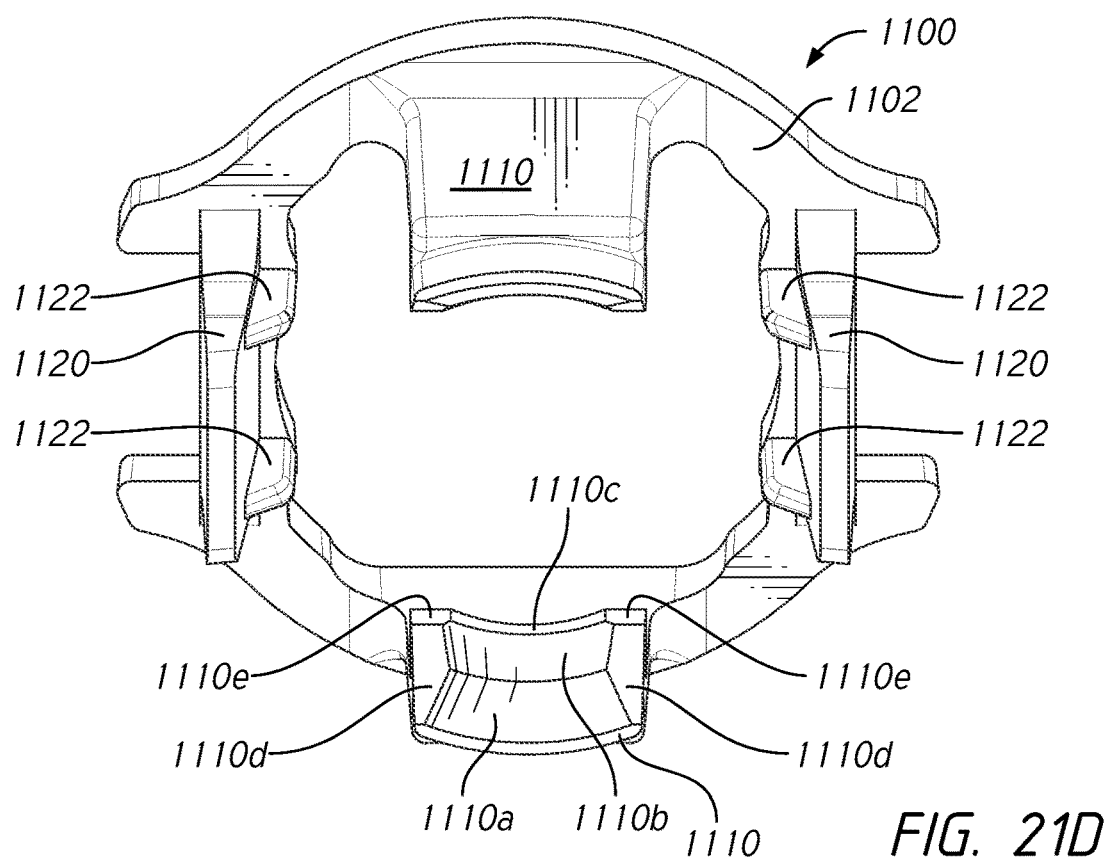

FIGS. 21A-21B illustrate top perspective views of adapter 1100, and FIGS. 21C-21D illustrate bottom perspective views of adapter 1100. FIGS. 21E-21F illustrate top and bottom views (respectively) of adapter 1100. FIG. 21G illustrates a side view of adapter 1100 (which can be a mirror image of an opposite side view of adapter 110) and FIG. 21H illustrates a front view of adapter 1100 (which can be a mirror image of a back view of adapter 1100). Adapter 110 can include a base 1102, an opening 1103 extending through base 1102, one or more latch arms 1110 extending outward from base 1102, and one or more support arms 1120 extending outward from base 1102. In some embodiments, base 1102 comprises a ring-shaped structure, which is at least partially defined by the opening 1103. Opening 1103 can be spaced inward from a perimeter of base 1102. Opening 1103 can be positioned around projection 1052 and projection 1052 can extend through opening 1103 when adapter 1100 is secured to fluid transfer device 1000 (see FIGS. 20C and 20F). In some embodiments, when adapter 1100 is secured to fluid transfer device 1000, an axis extending through a center of projection 1052 is parallel to and/or aligned with an axis 1177 extending through a center of opening 1103.

In some embodiments, adapter 1100 includes a pair of latch arms 1110 and/or a pair of support arms 1120. Latch arms 1110 and support arms 1120 can extend transverse (for example, perpendicular) relative to base 1102. Latch arms 1110 and support arms 1120 can extend from base 1102 in the same direction, for example. The pair of latch arms 1110 can be spaced from one another and from one or both of support arms 1120, and vice versa. In some embodiments, the pair of latch arms 1110 are positioned opposite one another relative to axis 1177 extending through opening 1103 (which can also extend through a center of adapter 1100). In some embodiments, the pair of support arms 1120 are positioned opposite one another relative to axis 1177. In some embodiments, adapter 1100 includes two latch arms 1110 and two support arms 1120, each of which is spaced approximately 90 degrees from one another relative to axis 1177. Each of latch arms 1110 and support arms 1120 can be spaced from one another by a gap, as shown. In some embodiments, support arms 1120 are shorter than latch arms 1110. Alternatively, in some embodiments, support arms 1120 are longer than latch arms 1110.

Latch arms 1110 can include a first end connected to the base 1102 and a second end (which can be referred to as a "free end") opposite the first end. Such second end can include latch portions 1143 that extend inward (for example, toward axis 1177) and which are configured to secure to a portion of a vial, as described further below with reference to FIG. 22. Similar to latch arms 120 (which can be identical to latch arms 1020 as discussed above), latch portions 1143 can include one or more chamfered regions that can help allow portions of a container (for example, a vial) to smoothly pass over when the adapter 1100 is secured thereto. For example, with reference to FIGS. 21C-21D and 21F, latch portions 1143 can have chamfered regions 1110a and/or 1110b. Region 1110a can be chamfered at a first angle with respect to, for example, axis 1177 and/or a plane defined along end surfaces 1110e of latch portion 1143. Region 1110b can be chamfered at a second angle with respect to, for example, axis 1177 and/or a plane defined along end surfaces 1110e of latch portion 1143. In some embodiments, the first and second angles are different. For example, the first angle can be smaller or greater than the second angle. In some embodiments, chamfered regions 1110a, 110b are adjacent to one another. One or both of chamfered regions 1110a, 1110b can have a curved chamfer. In some embodiments, chamfered regions 1110a, 1110b extend along a portion of a width of latch portion 1143 (the width of latch portion 1143 extending horizontally in the view shown in FIG. 21D). In some embodiments, latch portions 1143 comprises flat end surfaces 1110d and chamfered regions 1110a, 1110b are positioned between such end surfaces 1110d. Latch portions 1143 can have a recessed edge 1110c that is curved to accommodate a portion of a perimeter of a source container. For example, the recessed edge 140c can have a curvature that matches a curvature of a perimeter of a port for vial (or portion thereof) similar to as described with reference to recessed edge 140c.

Including one or more of chamfered regions 1110a, 1110b on the latch portions 1143 can advantageously facilitate a smooth securement of the adapter 1100 to a source container when a portion of the source container engages and passes by and/or through the latch arms 1110. The chamfered regions 1110a, 1110b can direct forces laterally to pivot (for example, flex) the arms 1110 to allow movement onto the source container. Further, such chamfered regions 1110a, 1110b keep installation forces relatively constant when the adapter 1100 is secured to the source container, which can help reduce possibility of leakage or excessive puncturing to seals of the source container. Because these chamfered regions 1110a, 1110b provide such smooth, controlled securement, the securement of the adapter 1100 (and fluid transfer device 1000 when secured thereto) to a source container can be performed with one hand in some situations.

With reference to at least FIG. 21G, in some embodiments, latch arms 1110 include a notch 1112 at or near a free end of the latch arms 1110 and/or adjacent to latch portions 1143. In some embodiments, notch 1112 can allow a user to more access the adapter 1100 when adapter 1100 is secured to fluid transfer device 1000. For example, with reference to FIG. 20D, such notch 1112 can allow a user's finger to fit between a portion of the latch arms 1110 and a portion of the guide arms 1042. Such configuration can allow the adapter 1100 to be adjusted and/or removed with respect to fluid transfer device 1000 in some embodiments.

As discussed above, the adapter 1100 can include one or more support arms 1120. In some embodiments, support arms 1120 can configured to engage a portion of latch arms 1040 when adapter 1100 is secured to fluid transfer device 1000. For example, with reference to FIG. 20E, in some embodiments, support arms 1120 engage latch portions 1043a, 1043b of latch arms 1040 when adapter 110 and fluid transfer device 100 are secured. As another example, support arms 1120 (for example, free ends thereof) can contact and/or rest atop latch portions 1043a, 1043b when adapter 110 and fluid transfer device 100 are secured. In some embodiments, such engagement between support arms 1120 and latch portions 1043a, 1043b inhibits (for example, prevents) adapter 1100 from being removed from fluid transfer device 1000. For example, such engagement between support arms 1120 and latch portions 1043a, 1043b can inhibit (for example, prevent) adapter 110 from being removed from fluid transfer device 100 in a direction along an axis extending through projection 1052 and/or axis 1177 and/or in a direction along an axis parallel to any of such axes. In some embodiments, when adapter 1100 is secured to fluid transfer device 1000, support arms 1120 occupy a space between latch portions 1043a, 1043b and base 1049. In some embodiments, adapter 1100 can be removed from fluid transfer device 1000 by movement (for example, flexing) of latch arms 1040 outward, thereby removing physical interference of latch portions 1043a, 1043b so support arms 1120 can move relative to fluid transfer device 1000.

In some embodiments, adapter 1100 is permanently secured (for example, via an adhesive) to fluid transfer device 100. For example, support arms 1120 can be permanently secured to latch arms 1040. For example, free ends of support arms 1120 can be permanently secured to latch portions 1043a, 1043b. Additionally or alternatively, base 1102 can be permanently secured to base 1049 and/or latch arms 1110 of adapter 1100 can be permanently secured to guide arms 1042.

With reference to at least FIGS. 21D and 21H, in some embodiments adapter 1100 includes protrusions 1122 extending outward from a surface of support arms 1122, for example, toward axis 1177. In some embodiments, adapter 1100 includes a pair of protrusions 1122 extending from a surface of each of two support arms 1122 as shown. Protrusions 1122 can extend along a portion of a length of support arms 1122, for example, less than an entire length of support arms 1122. In some embodiments, protrusions 1122 can help position and/or align portions of a source container when adapter 1100 is secured therewith.

With reference to at least FIGS. 21E-21F, adapter 1100 can include one or more slots 1106 in base 1102. For example, adapter 1100 can include two slots 1106, as shown, which are positioned opposite one another relative to opening 1103 and/or axis 1177. Slots 1106 can be positioned above and/or adjacent ends of support arms 1120 that connect to base 1102. In some embodiments, slots 1106 have a width (extending "up" and "down" given the orientation shown in FIGS. 21E-21F) that is sized to correspond with a width of latch arms 1040 of fluid transfer device 1000. For example, such width of slots 1106 can be equal to or greater than the width of the latch arms 1040. Such configurations can advantageously allow the base 1102 to accommodate latch arms 1040 when adapter 1100 is secured to fluid transfer device 1000. For example, portions of latch arms 1040 can be positioned in the space defined by slots 1106. In some embodiments, portions 1104 of the base 1102 that are at least partially defined by slots 1106 can be positioned on sides of latch arms 1040 and can inhibit movement of latch arms 1040, for example, in a direction between such portions 1104.

Figure 22:
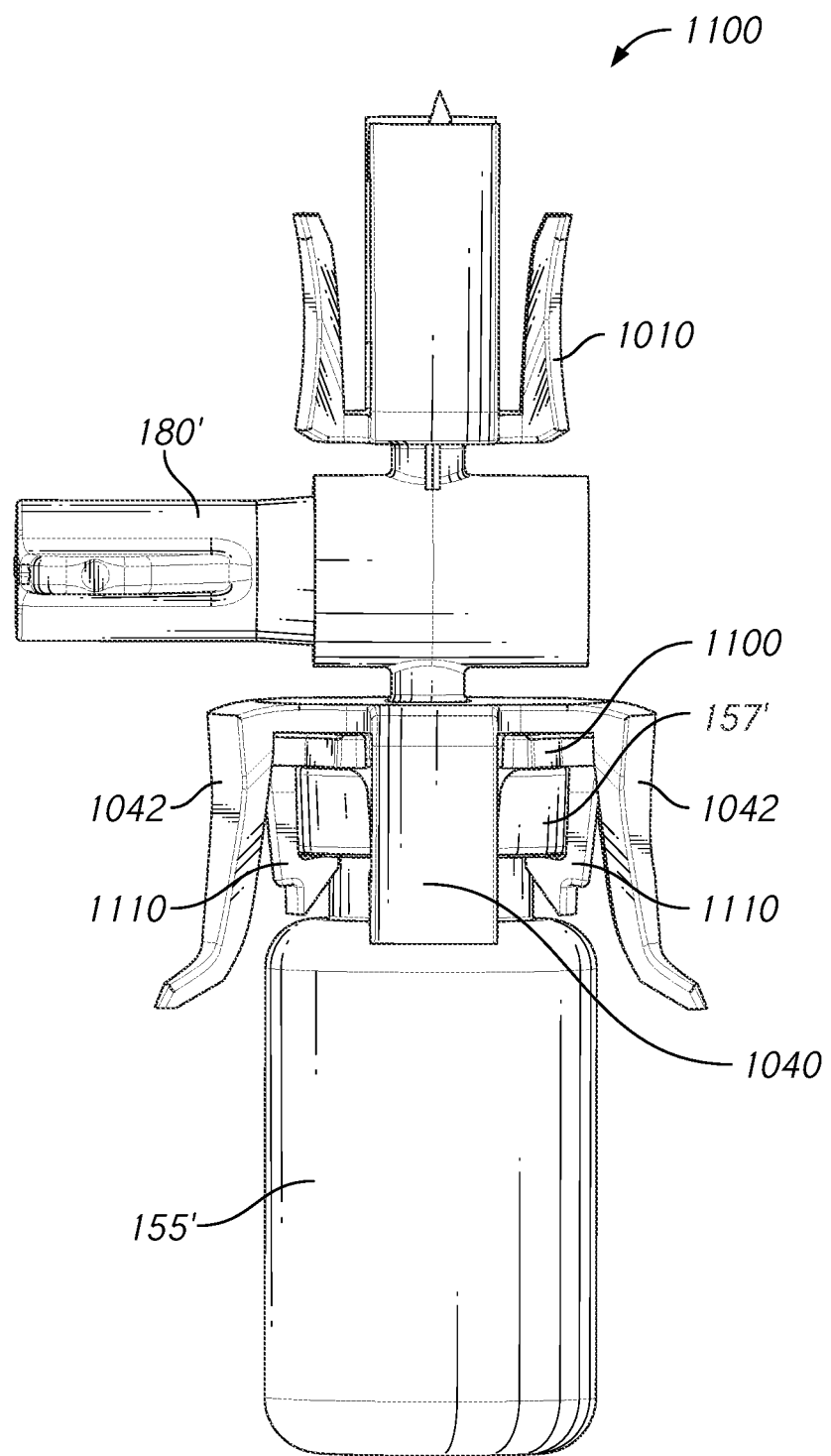
FIG. 22 illustrates the fluid transfer device and adapter of FIGS. 20A-20F secured to a portion of a medical vial in accordance with aspects of this disclosure.

FIG. 22 illustrates a side view of fluid transfer device 1000 and adapter 1100 secured to each other and to a vial 155'. More specifically, FIG. 22 illustrates latch arms 1100 of adapter 1100 secured to a cap 157' of vial 155', and also illustrates fluid transfer device 1000 connected to vial 155' via adapter 1100. Such securement can be similar to that described above with respect to fluid transfer device 100, vial 155, port 157, and FIGS. 10A-10C. Vial 155 (and port 157) can have a different size than vial 155' (and cap 157'). For example, vial 155 (and port 157) can be larger than vial 155' (and cap 157'). Fluid transfer device 1000 (which can be similar or identical to fluid transfer device 100 as discussed above) can be configured to connect to vial 155 (and port 157) without the use of adapter 1100 as shown in FIGS. 10A-10C, and can be configured to connect to vial 155' (and cap 157') with the user of adapter 1100 as shown in FIG. 22.

Fluid transfer device 1000 and adapter 1100 can be utilized in a method similar in some or many respects to method 300 described above with respect to FIG. 10E. For example, in some embodiments where adapter 1100 and fluid transfer device 100 are not permanently secured together (for example, an some point in the manufacturing process), step 302 of such method can involve securing adapter 1100 to fluid transfer device 1000 prior to securing to a vial and to a port of an IV bag (for example, step 302) and/or prior to any of steps 304-318. In some embodiments where adapter 1100 and fluid transfer device 100 are permanently secured to one another (for example, during manufacturing), a first attachment portion of fluid transfer device 1000 can be secured (via adapter 1100) to a vial (for example, vial 155') and a second attachment portion of fluid transfer device 100 can be secured to a port of an IV bag (for example, port 292). Thereafter, the method can involve bypassing a limiter at step 304 (described above) where fluid transfer device 1000 includes a limiter such as any of the limiters described herein (for example, limiters 160, 233a, 233b, 460, 560, 660, 760). Thereafter, the method can include any of steps 306-318 described above.

With reference to FIG. 20F, free ends of latch arms 1110 (or portions thereof) of adapter 1100 can be spaced from one another by a distance $d_2$ and latch arms 1040 of fluid transfer device 1000 can be spaced from one another by a distance $d_3$. $D_2$ can be smaller than $d_3$, for example, where adapter 1100 is configured to connect to a smaller vial size than fluid transfer device 1000. $D_2$ can be between approximately 0.2 inch and approximately 0.6 inch, for example, between approximately 0.3 inch and approximately 0.5 inch. $D_3$ can be between approximately 0.4 inch and approximately 1 inch, for example, between approximately 0.5 inch and approximately 0.7 inch. A ratio between $d_3$ and $d_2$ can be between approximately 1 and approximately 4, for example, between approximately 1 and approximately 3.5, between approximately 1 and approximately 3, between approximately 1 and approximately 2.5, between approximately 1 and approximately 2, between approximately 1.1 and approximately 1.9, between approximately 1.2 and approximately 1.8, between approximately 1.3 and approximately 1.7, or between approximately 1.4 and approximately 1.6, or any value or range between any of these values or ranges or any value or range bounded by any combination of these values. In some embodiments where $d_3$ is larger than $d_2$, latch arms 1040 do not contact a vial and/or a port of the vial when adapter 1100 and fluid transfer device 1000 are secured to the vial and/or port.

Certain Terminology

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

Similarly, this method of disclosure is not to be interpreted as reflecting an intention that any claim require more features than are expressly recited in that claim. Rather, inventive aspects may lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A fluid transfer device for connecting a source container to an intermediate container, the fluid transfer device comprising:
   a first attachment portion configured to engage a first port of the source container, the first attachment portion comprising a first projection defining a first fluid passage;
   a second attachment portion configured to engage a second port of the intermediate container, the second attachment portion comprising a second projection defining a second fluid passage;
   a selector portion for selectively transitioning the fluid transfer device from a first configuration in which a flow path between the first and second fluid passages is closed to a second configuration in which the flow path between the first and second fluid passages is open; and
   a limiter configured to inhibit the selector portion from selectively transitioning the fluid transfer device from the first configuration to the second configuration, wherein the limiter is moveable from a first position to a second position, wherein, in the first position, the limiter inhibits the selector portion from transitioning the fluid transfer device from the first configuration to the second configuration, and wherein, in the second position, the limiter allows the selector portion to transition the fluid transfer device from the first configuration to the second configuration, wherein the limiter is moveable from the second position to the first position, and wherein a smaller force is required to transition the limiter from the first position to the second position than from the second position to the first position.

2. The fluid transfer device of claim 1, wherein the selector portion comprises a chamber and a valve configured to fit at least partially within the chamber, and wherein, when the limiter is in the first position, the limiter inhibits the valve from moving relative to the chamber to selectively transition the fluid transfer device from the first configuration to the second configuration.

3. The fluid transfer device of claim 2, wherein the valve is configured to rotate within the chamber to open and close the flow path.

4. The fluid transfer device of claim 2, wherein the chamber comprises a first aperture aligned with the first fluid passage and a second aperture aligned with the second fluid passage, and wherein, when the valve is in a closed position, the valve blocks at least one of the first and second apertures.

5. The fluid transfer device of claim 4, wherein the valve comprises a body and an opening extending through the body, and wherein, when the valve is in the closed position, the opening does not align with the first and second apertures of the chamber.

6. The fluid transfer device of claim 2, further comprising a first stem connected to the chamber and to one of the first or second attachment portions, the first stem providing fluid communication between one of the first and second fluid passages and an interior of the chamber, and wherein the limiter is configured to secure to the first stem when in the first and second positions.

7. The fluid transfer device of claim 6, wherein the limiter comprises an opening, the opening comprising a first portion and a second portion spaced from the first portion, the first and second portions sized and shaped to match a size and shape of the first stem, and wherein:
when the limiter is in the first position, the first stem is positioned within the first portion of the opening; and
when the limiter is in the second position, the first stem is positioned within the second portion of the opening.

8. The fluid transfer device of claim 7, wherein the limiter comprises a first end and a second end opposite the first end, wherein the first portion of the opening is near the second end of the limiter.

9. The fluid transfer device of claim 8, wherein the second end of the limiter comprises one or more tapered surfaces proximate the first portion of the opening.

10. The fluid transfer device of claim 7, wherein the opening of the limiter further comprises a third portion positioned between the first and second portions and having a different size and shape than the first and second portions, wherein, when the limiter is moved from the first position to the second position, the first stem passes through the third portion.

11. The fluid transfer device of claim 10, wherein the third portion of the opening comprises a width that is smaller than a width of the first stem such that the first stem contacts portions of the limiter when passing through the third portion of the opening.

12. The fluid transfer device of claim 7, wherein the first stem connects the chamber to the first attachment portion and provides fluid communication between the first fluid passage and the interior of the chamber, and wherein the fluid transfer device further comprises a second stem connecting the chamber to the second attachment portion and providing fluid communication between the second fluid passage and the interior of the chamber, the second stem comprising one or more protrusions configured to prevent the second stem from securing within the opening of the limiter.

13. The fluid transfer device of claim 6, wherein the limiter at least partially conforms to a shape of an outer surface of the chamber such that, when the limiter is secured to the first stem in the second position, the limiter surrounds at least a portion of a perimeter of the chamber.

14. The fluid transfer device of claim 1, wherein the first attachment portion comprises a first plurality of arms spaced from each other and configured to secure to the first port of the source container.

15. The fluid transfer device of claim 14, wherein the first plurality of arms comprises a first arm having a free end configured to secure to a portion of the first port of the source container, the free end comprising a latch portion extending towards the first projection in a first direction and having a first chamfered region and a second chamfered region, the first and second chamfered regions comprising different chamfer angles.

16. The fluid transfer device of claim 15, each of the first and second chamfered regions are curved.

17. The fluid transfer device of claim 1, wherein the first projection of the first attachment portion comprises a spike.

18. The fluid transfer device of claim 1, wherein the source container comprises a medicine vial and the intermediate container comprises an intravenous (IV) fluid bag.

19. A fluid transfer device for connecting a source container to an intermediate container, the fluid transfer device comprising:
a first attachment portion configured to engage a first port of the source container, the first attachment portion comprising a first projection defining a first fluid passage;
a second attachment portion configured to engage a second port of the intermediate container, the second attachment portion comprising a second projection defining a second fluid passage;
a selector portion for selectively transitioning the fluid transfer device from a first configuration in which a flow path between the first and second fluid passages is closed to a second configuration in which the flow path between the first and second fluid passages is open, wherein the selector portion comprises a chamber and a valve configured to fit at least partially within the chamber;
a limiter, the limiter moveable from a first position to a second position, wherein, in the first position, the limiter inhibits the valve from moving relative to the chamber to selectively transition the fluid transfer device from the first configuration to the second configuration, and wherein, in the second position, the limiter allows the valve to move relative to the chamber to selectively transition the fluid transfer device from the first configuration to the second configuration; and a first stem connected to the chamber and to one of the first or second attachment portions, the first stem providing fluid communication between one of the first and second fluid passages and an interior of the chamber, wherein the limiter is configured to secure to the first stem when in the first and second positions.

20. The fluid transfer device of claim 19, wherein the limiter comprises an opening, the opening comprising a first portion and a second portion spaced from the first portion, the first and second portions sized and shaped to match a size and shape of the first stem, and wherein:
when the limiter is in the first position, the first stem is positioned within the first portion of the opening; and
when the limiter is in the second position, the first stem is positioned within the second portion of the opening.

21. The fluid transfer device of claim 20, wherein the limiter comprises a first end and a second end opposite the first end, wherein the first portion of the opening is near the second end of the limiter.

22. The fluid transfer device of claim 21, wherein the second end of the limiter comprises one or more tapered surfaces proximate the first portion of the opening.

23. The fluid transfer device of claim 20, wherein the opening of the limiter further comprises a third portion positioned between the first and second portions and having a different size and shape than the first and second portions, wherein, when the limiter is moved from the first position to the second position, the first stem passes through the third portion.

24. The fluid transfer device of claim 23, wherein the third portion of the opening comprises a width that is smaller than a width of the first stem such that the first stem contacts portions of the limiter when passing through the third portion of the opening.

25. The fluid transfer device of claim 20, wherein the first stem connects the chamber to the first attachment portion and provides fluid communication between the first fluid passage and the interior of the chamber, and wherein the fluid transfer device further comprises a second stem connecting the chamber to the second attachment portion and providing fluid communication between the second fluid passage and the interior of the chamber, the second stem comprising one or more protrusions configured to prevent the second stem from securing within the opening of the limiter.

26. The fluid transfer device of claim 19, wherein the limiter at least partially conforms to a shape of an outer surface of the chamber such that, when the limiter is secured to the first stem in the second position, the limiter surrounds at least a portion of a perimeter of the chamber.

27. The fluid transfer device of claim 19, wherein the first attachment portion comprises a first plurality of arms spaced from each other and configured to secure to the first port of the source container.

28. The fluid transfer device of claim 27, wherein the first plurality of arms comprises a first arm having a free end configured to secure to a portion of the first port of the source container, the free end comprising a latch portion extending towards the first projection in a first direction and having a first chamfered region and a second chamfered region, the first and second chamfered regions comprising different chamfer angles.

29. The fluid transfer device of claim 28, each of the first and second chamfered regions are curved.

30. The fluid transfer device of claim 19, wherein the first projection of the first attachment portion comprises a spike.

31. The fluid transfer device of claim 19, wherein the source container comprises a medicine vial and the intermediate container comprises an intravenous (IV) fluid bag.

* * * * *